US012744751B2

(12) United States Patent
Roy et al.

(10) Patent No.: US 12,744,751 B2
(45) Date of Patent: Sep. 22, 2026

(54) SYSTEM AND METHOD FOR PROCESSING MESSAGES FROM AN EXTERNAL COMMUNICATION PLATFORM

(71) Applicant: Global Relay Communications Inc., Vancouver (CA)

(72) Inventors: Warren Roy, London (GB); Xavier Jover Segura, London (GB); Alfred Scholldorf, New York, NY (US); Philip Persad, Vancouver (CA)

(73) Assignee: GLOBAL RELAY COMMUNICATIONS INC., Vancouver (CA)

(*) Notice: Subject to any disclaimer, the term of this patent is extended or adjusted under 35 U.S.C. 154(b) by 354 days.

(21) Appl. No.: 18/230,502

(22) Filed: Aug. 4, 2023

(65) Prior Publication Data

US 2023/0379276 A1 Nov. 23, 2023

Related U.S. Application Data

(63) Continuation-in-part of application No. 17/853,615, filed on Jun. 29, 2022, now Pat. No. 11,757,811, which is a continuation of application No. 16/909,883, filed on Jun. 23, 2020, now Pat. No. 11,418,464, which is a continuation of application No. 15/946,317, filed on Apr. 5, 2018, now Pat. No. 10,728,187.

(51) Int. Cl.

| | |
|---|---|
| ***H04L 51/04*** | (2022.01) |
| ***H04L 51/56*** | (2022.01) |
| ***H04L 67/306*** | (2022.01) |

(52) U.S. Cl.

CPC .............. *H04L 51/04* (2013.01); *H04L 51/56* (2022.05); *H04L 67/306* (2013.01)

(58) Field of Classification Search

CPC ........ H04L 51/04; H04L 51/56; H04L 67/306

See application file for complete search history.

(56) References Cited

U.S. PATENT DOCUMENTS

| | | | | |
|---|---|---|---|---|
| 10,728,187 B2 * | 7/2020 | Roy | ........................ | H04M 15/00 |
| 11,418,464 B2 * | 8/2022 | Roy | ........................ | H04M 15/00 |
| 11,757,811 B2 * | 9/2023 | Roy | ........................ | H04L 67/306<br>709/206 |

(Continued)

*Primary Examiner* — Jeong S Park

(57) ABSTRACT

A system and method for managing third-party electronic messages for an organization having a regulatory requirement to retain business-related electronic messages is disclosed. For a user account for a user associated with the organization, a message space accessible through electronic devices is defined, the space accommodating peer-to-peer administration and providing facilities for identifying an owner for the space, retaining messages based on the organization's retention parameters, and creating a message channel in the space for messages between users in the organization and additional organizations. A third-party communication system may be accessed by the user by creating a third-party user account for the third-party communication system. For a validated the third-party user account, a third-party communication system message sent between the user and an external user of the third-party communication system can be processed.

18 Claims, 37 Drawing Sheets

(56) References Cited

U.S. PATENT DOCUMENTS

| | | | | |
|---|---|---|---|---|
| 2005/0273510 | A1* | 12/2005 | Schuh | H04L 12/1813<br>709/204 |
| 2008/0034040 | A1* | 2/2008 | Wherry | G06Q 10/107<br>709/204 |
| 2012/0317208 | A1* | 12/2012 | Sousa | G06Q 10/107<br>709/206 |
| 2013/0198296 | A1* | 8/2013 | Roy | G06Q 10/107<br>709/206 |
| 2014/0310365 | A1* | 10/2014 | Sample | G06Q 10/107<br>709/206 |
| 2015/0244684 | A1* | 8/2015 | Ng | H04L 63/0428<br>713/168 |
| 2015/0350250 | A1* | 12/2015 | Brander | H04W 12/04<br>726/1 |
| 2016/0307286 | A1* | 10/2016 | Miasnik | H04W 4/029 |
| 2018/0047123 | A1* | 2/2018 | Miasnik | G06Q 10/00 |

* cited by examiner

300

2000 many interaction spaces of different types arranged in a grid layout
each of space is identified by an icon and metadata in the header

2200 a) User clicks on a timestamp b) Dual timestamp is presented for that chat bubble "sent timestamp"

Figure 24:
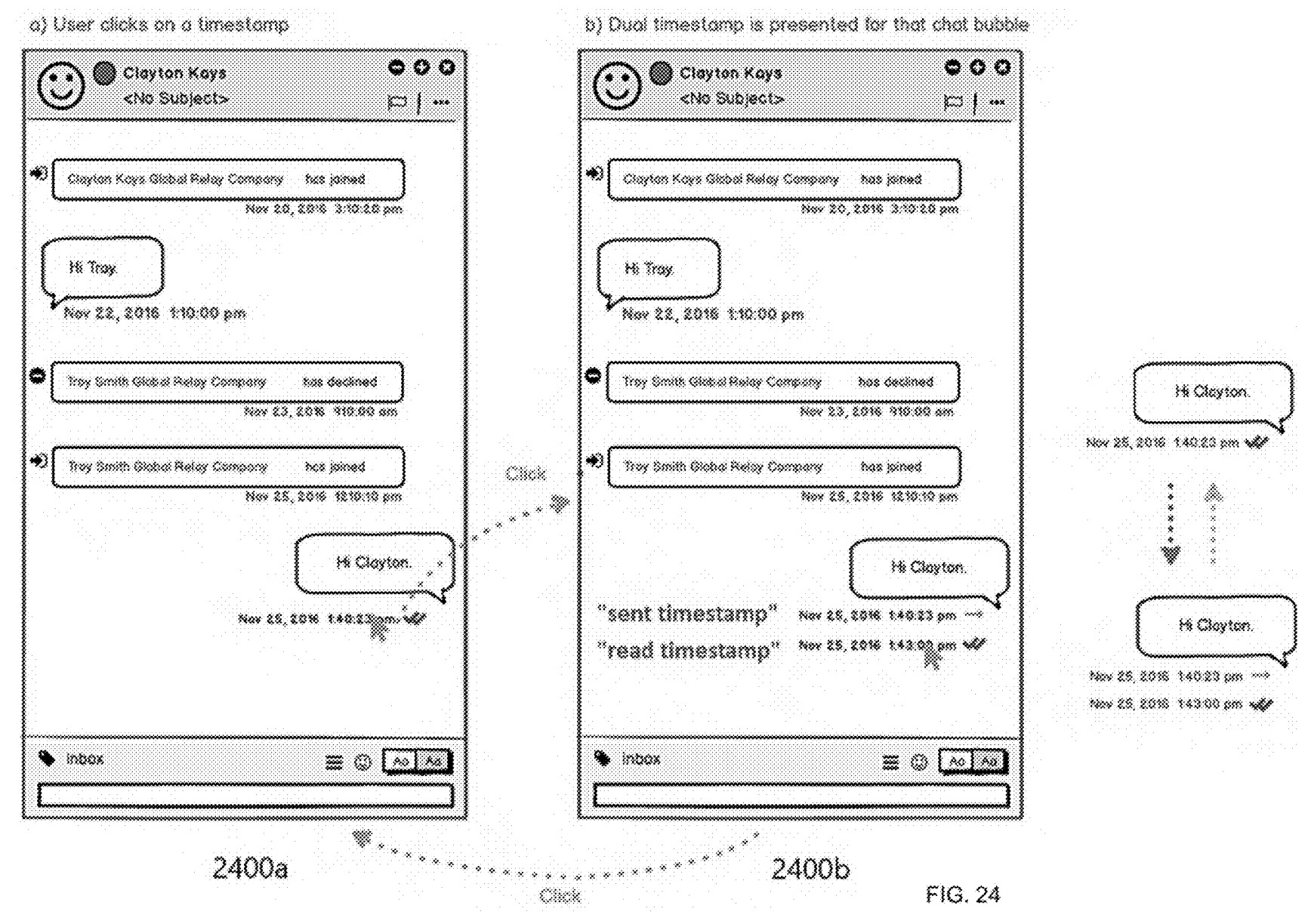

"read timestamp"

Click

Click

Ext. Platform
Ext. Plat. Portal
2
messaging
1,4
3100
5
3
SMS Gateway
App Gateway
App Business Manager
App Business onboarding service
Organizations, Users & External Accounts 106

Figure 32:
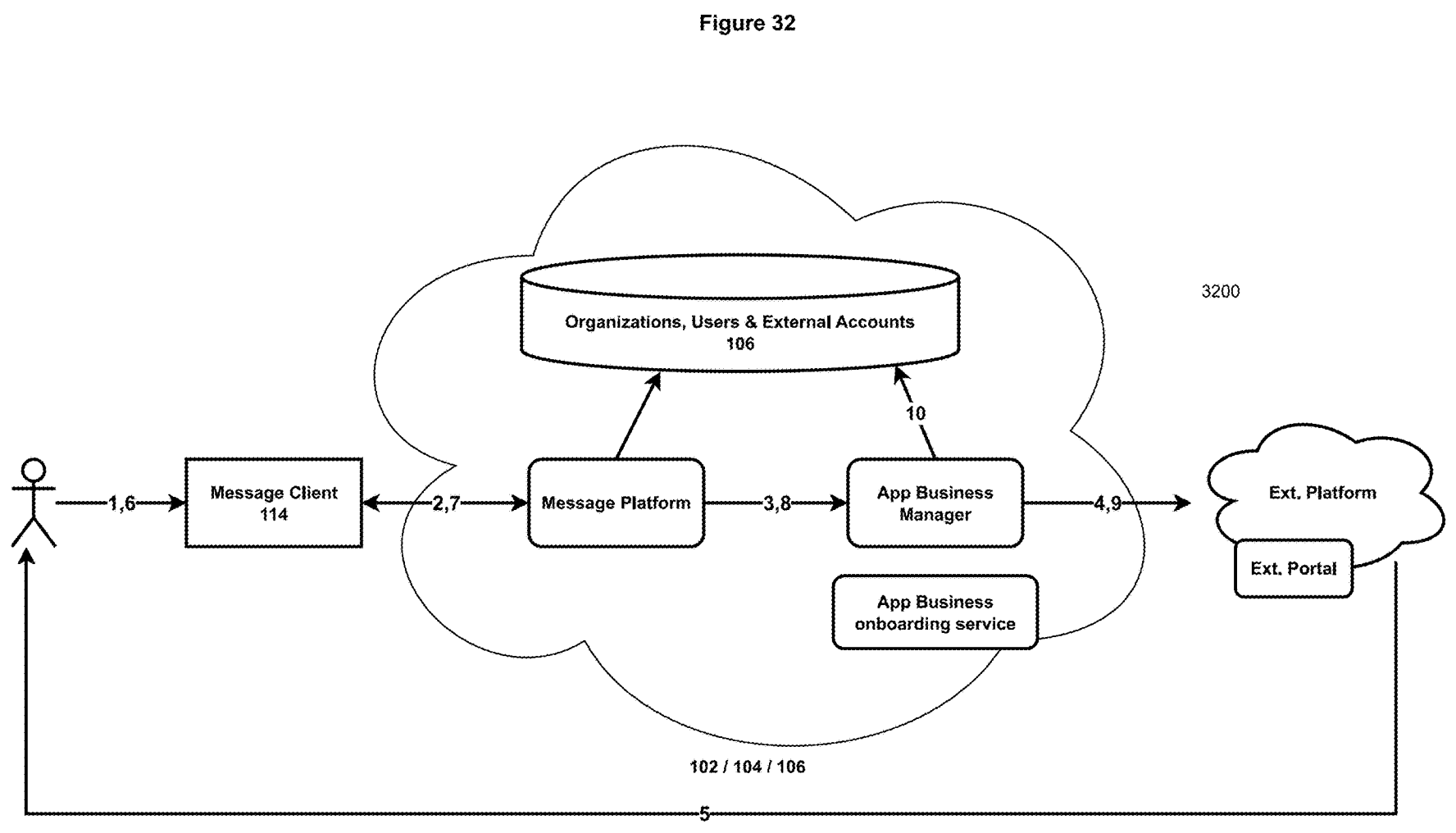

Ext. Platform

Ext. Portal 4,9

App Business Manager

App Business onboarding service

10

Organizations, Users & External Accounts 106

3,8

Message Platform

102 / 104 / 106

5

2,7

Message Client 114

Figure 33:
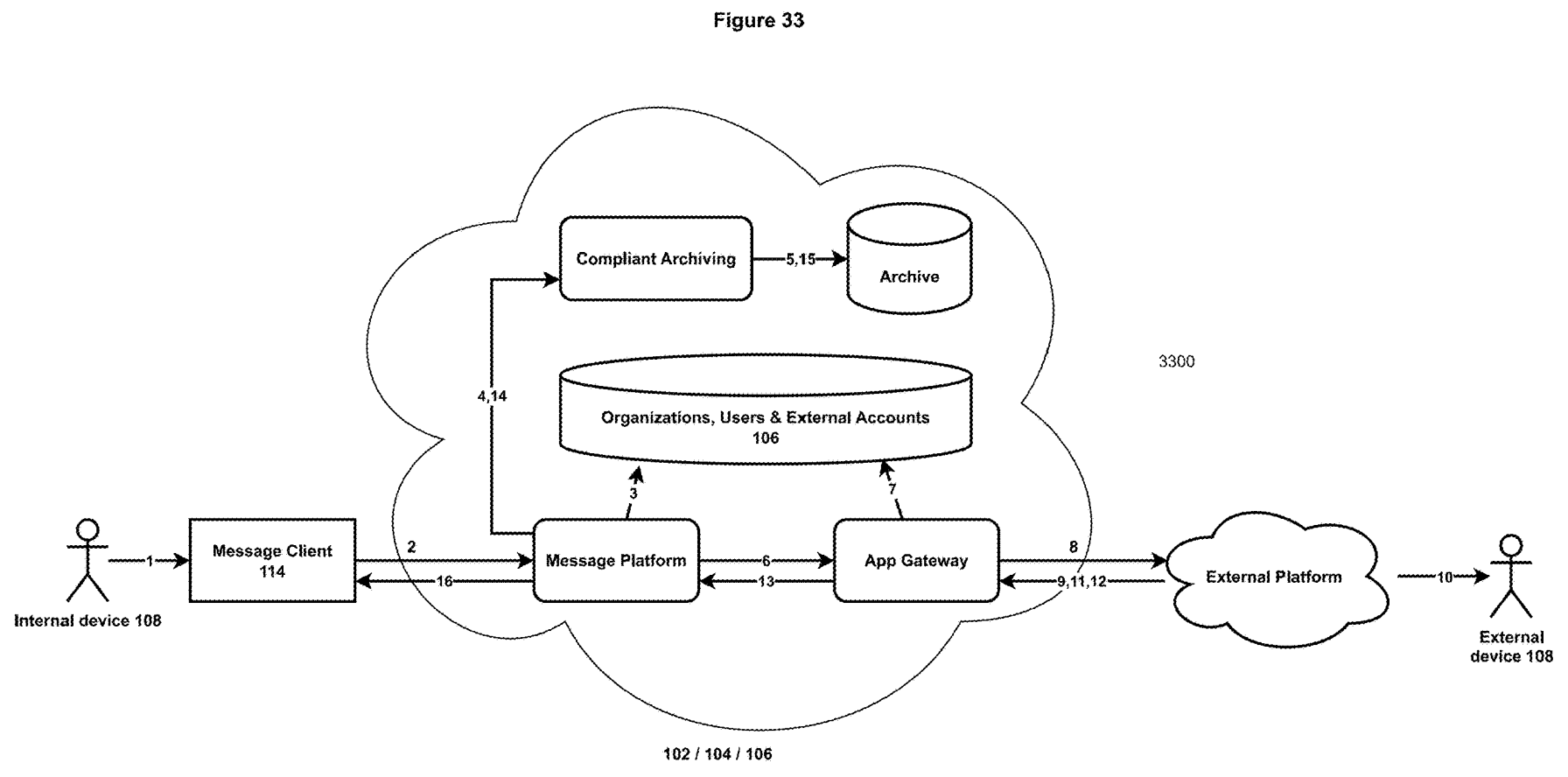

Internal device 108

1

Message Client
114

2

16

4,14

Message Platform

3

Compliant Archiving 5,15

Archive

Organizations, Users & External Accounts
106

6

13

App Gateway

7

8

9,11,12

102 / 104 / 106

External Platform

10

External
device 108

3600
Compliant Archiving
7
Archive
106
Organizations, Users & External Accounts
106
6
4
Client 114
App Gateway
3
2
Ext. Platform
1
5
Broadcast API
8
External
device 108
External
device 108
External
device 108
102 / 104 / 106

SYSTEM AND METHOD FOR PROCESSING MESSAGES FROM AN EXTERNAL COMMUNICATION PLATFORM

RELATED APPLICATIONS

This application is a continuation in part application of U.S. patent application Ser. No. 17/853,615 filed on Jun. 29, 2022 (now U.S. Pat. No. 11,757,811), which itself is a continuation application of U.S. patent application Ser. No. 16/909,883 filed on Jun. 23, 2020 (now U.S. Pat. No. 11,418,464), which itself is a continuation application of U.S. patent application Ser. No. 15/946,317 filed on Apr. 5, 2018 (now U.S. Pat. No. 10,728,187).

FIELD OF THE DISCLOSURE

The present disclosure relates to the field of electronic messaging systems and methods of processing and archiving electronic messages. In particular, the disclosure relates to systems and methods for activating access to third-party communications from third-party communication systems.

DESCRIPTION OF THE BACKGROUND

Prior art electronic messaging platforms provide virtual interaction spaces where users may both post content and view content from others over an extended period of time. Individuals that subscribe to various electronic messaging systems use often use such messaging systems for personal and work-related matters.

When a user on a typical prior art platform creates and posts electronic messages as a representative of an organization (e.g. an employee of a company) to a community in the platform, often policy rules and regulations are applicable that need to be followed in managing the postings. For example, the organization may have a policy that restricts access to certain third-party communication applications ("apps") and/or restricts participation of the individual in a specific forum on that platform.

Additionally, there may be regulatory obligations applicable to the organization to properly manage access to such third-party apps and to store such postings. For example, in the financial services industry, several jurisdictions have imposed rules and regulations governing management and storage of electronic communications. For example, in the United States, its Securities and Exchange Commission (SEC) Rules 17a-3 and 17a-4 require preservation and retention of all business-related electronic correspondence. In the European Union (EU), the General Data Protection Regulation (GDPR) imposes standards governing privacy rights of EU citizens over personal data held and processed by companies providing electronic services. In the health services industry, in the United States, the Health Insurance Portability and Accountability Act (HIPAA) and the Health Information Technology Act (HITA) impose restrictions on use and disclosure of protected health information and mandate privacy and security obligations on electronic health information.

Third-party communication systems, such as Twitter and WhatsApp provide additional end-to-end third-party communication systems. There are issues with integrating such third-party communication systems into existing platforms, for example in view of encrypted messages created by such third-party communication systems. There is a need to address deficiencies in the prior art.

SUMMARY OF THE DISCLOSURE

In a first aspect, a method for managing third-party electronic messages for an organization having a regulatory requirement to retain business-related electronic messages is provided. The method comprises executing instructions on a processor at a server that: for a first user account for a first user associated to the organization, define a first message space accessible through electronic devices in communication with the server, the first message space accommodating peer-to-peer administration by users in the organization and providing facilities for identifying an owner for the first message space, retaining and preserving messages in a manner based on retention parameters associated with the organization, and creating a message channel in the first message space for messages between one or more users in the organization and one or more additional organizations. The method further comprises executing instructions on the processor that for a third-party communication system accessed by the server for communications with the first user: create for the first user a third-party user account for the third-party communication system; and for a validated the third-party user account for the first user, process a third-party communication system message sent between the first user and an external user of the third-party communication system. For the method, the owner privileges follow an organization policy for the organization and provide the first user with privileges in managing the first message space reflecting the organization policy; and the additional organizations associated to the first message space are peers with respect to the first organization and to each other.

The method may further comprise executing further instructions on the processor that upon receipt of the third-party communication system message, archive the third-party communication system message, wherein the third-party communication system message received by the processor is not encrypted.

In the method, the third-party communication system may be a WhatsApp communication system.

In the method, the third-party communication system message may be an outbound message from the first user account being sent to the third-party communication system that is first encrypted at the first device. Also, the method may further comprise executing further instructions on the processor that: decrypt the outbound message; archive contents of the outbound message; then encrypt again the outbound message; and then send the outbound message to the third-party communication system.

In the method, the outbound message may be a bulk message addressed to multiple user accounts of the third-party communication system.

In the method, archiving the bulk message may utilize a template of the bulk message and a list of placeholder fields for addressees.

In the method, the third-party communication system message may be an inbound message being sent to the first account from the third-party communication system. The method may further comprise executing further instructions on the processor that: decrypt the inbound message; archive contents of the inbound message; then encrypt the inbound message again; and send the inbound message the first user account.

The method may comprise executing instructions on the processor that: check for an opt-out status for messages sent from the external user to the third-party user account; and do not send the inbound message to the first user account if the opt-out status indicates that the first user account opts-out from receiving messages from the external user.

The method may further comprise executing instructions on the processor that: check for an opt-out status for messages sent from the external user to the third-party user account; and send a message to the first user account about the inbound message from the external user.

The method may further comprise executing instructions on the processor that: check for an opt-out status for messages sent from the external user to the third-party user account; and record data about the inbound message from the external user and the opt-out status of the third-party user account.

In the method, the first user account may be part of a group of accounts for the organization for the third-party communication system.

In the method, a virtual phone number may be associated with the third-party user account, which is used to validate the third-party user account.

In the method, a real phone number may be associated with the third-party user account, which is used to validate the third-party user account.

In another aspect, a server for managing electronic messages associated with an organization having a regulatory requirement to retain business-related electronic messages is provided. The server comprises: a memory storage device; a communication link to an electronic device; and a processor executing instructions from the memory storage device. For a first user account for a first user associated to the organization, the instructions define a first message space accessible through electronic devices in communication with the server, the first message space accommodating peer-to-peer administration by users in the organization and providing facilities for identifying an owner for the first message space, retaining and preserving messages in a manner based on retention parameters associated with the organization, and creating a message channel in the first message space for messages between one or more users in the organization and one or more additional organizations. For a third-party communication system accessed by the server for communications with the first user, the instructions further: create for the first user a third-party user account for the third-party communication system; and for a validated the third-party user account for the first user, process a third-party communication system message sent between the first user and an external user of the third-party communication system. In the system, the owner privileges follow an organization policy for the organization and provide the first user with privileges in managing the first message space reflecting the organization policy; and the additional organizations associated to the first message space are peers with respect to the first organization and to each other.

In the server, the processor may further execute instructions that upon receipt of the third-party communication system message, archive the third-party communication system message, wherein the third-party communication system message received by the processor is not encrypted.

In the server, the third-party communication system may be a WhatsApp communication system.

In the server, the third-party communication system message may be an outbound message from the first user account being sent to the third-party communication system that is first encrypted at the first device. In the server, the processor may further execute instructions that: decrypt the outbound message; archive contents of the outbound message; then encrypt again the outbound message; and then send the outbound message to the third-party communication system.

In the server, the outbound message may be a bulk message addressed to multiple user accounts of the third-party communication system.

In another aspect, a method for managing electronic messaging accounts for an organization having a regulatory requirement to retain business-related electronic messages is provided. The method comprises executing instructions on a processor at a server that for a first user account for a first user associated to the organization, define a first message space accessible through electronic devices in communication with the server, where the first message space accommodates peer-to-peer administration by users in the organization, and the first message space providing facilities for: identifying an owner for the first message space; retaining and preserving messages in a manner based on retention parameters associated with the organization; and creating a message channel in the first message space for messages between one or more users in the organization and one or more additional organizations. In the method, the owner privileges follow an organization policy for the organization and provide the first user with privileges in managing the first message space reflecting the organization policy; and the additional organizations associated to the first message space are peers with respect to the first organization and to each other.

The method may further comprise executing instructions on the processor that if the owner has not been assigned to a message channel in the first message space, upon receiving a request from the first user to be recognized as the owner, identify the first user to be the owner if no other user has submitted an earlier active request to be recognized as the owner.

The method may further comprise executing instructions on the processor that identify when the first user has vacated as being the owner of the message channel; and upon receiving a request from the second user to be recognized as the owner, assign the owner privileges to the second user if the second user has an appropriate entitlement setting its privileges, and no other user has submitted an earlier active request to be recognized as the owner.

In the method, a second message space may be associated with the organization and an entity in a second organization; and the method may further comprise executing instructions on the processor at the server that provide access to a message channel in the first message space for messages between users in the organization and users in a second organization. In the method, the second message space may be accessible through an electronic device; the second message space may provide electronic conversations regulated on a peer-to-peer basis between the first user and the entity; and the second message space may have a second set of access privileges following a second organization policy for the second organization.

In the method, entitlement to use the second message space by the first user may be established by the organization; and use of the second message space by the first user may indicate that communications from the first user have been authorized on behalf of the organization.

The method may further comprise executing instructions on the processor that process inputs accepted through a user interface to control and grant entitlements to the first user enabling the first user to make decisions for the first message space for the organization.

Upon receiving a request to leave the first message space, the method may further comprise executing instructions on the processor that deactivate the first user account; dissolve the account link in the federated account; and retain contact information in the second user account in the federated account.

In another aspect, a method for managing electronic messaging accounts for an organization having a regulatory requirement to retain business-related electronic messages is provided. The method comprises executing instructions on a processor at a server that: for a first user account for a first user associated to the organization, define a first message space accessible through electronic devices in communication with the server, where the first message space accommodates peer-to-peer administration by users in the organization, and the first message space provides facilities for identifying an owner for the first message space; and creating a message channel in the first message space for messages between users in the organization and users in a second organization. The method also provides a second message space accessible through the electronic devices, where the second message space provides facilities for creating a second message for the first user in a second account for processing by the second message space providing private electronic conversations. The method also receives an access request to the first message space and if the access request is a first access to the first message space, then the method federates the first account to the second account by aggregating profile attributes of the first and second accounts into a single user profile for the first user and records the federation in an account link. In the method, the owner privileges follow an organization policy for the organization and provide the first user with additional privileges in managing the first message space reflecting the organization policy; the first user account has a first set of access privileges associated with the first message space; the second user account has a second set of access privileges associated with the second message space for private messages; the second set of access privileges are maintained independently to the first set of access privileges; and the second message space provides private messages that are not regulated by the first message space.

In another aspect, a server for managing electronic messaging accounts associated with an organization having a regulatory requirement to retain business-related electronic messages is provided. The server comprises: a memory storage device; a communication link to an electronic device; and a processor executing instructions from the memory storage device. The processor executes instructions that: for a first user account for a first user associated the organization, define a first message space accessible through electronic devices, the first message space accommodating peer-to-peer administration by users in the organization, where the first message space provides facilities for identifying an owner for the first message space; retaining messages following retention parameters associated with the organization; and creating a message channel in the first message space for messages between users in the organization and users in a second organization. In the server, the owner privileges follow an organization policy for the organization and provide the first user with privileges in managing the first message space reflecting the organization policy.

In the server, the processor may further execute instructions from the memory storage device that manage data relating to a message directory providing a searchable database comprising the organization and first user. For the server, entitlement to use the second message space by the first user may be established by the organization; and use of the second message space by the first user may indicate that communications from the first user have been authorized on behalf the organization.

In the server, the processor may further execute instructions from the memory storage device that: provide a second message space accessible through the electronic devices, the second message space providing facilities for creating a second message for the first user in a second account for processing by the second message space providing private electronic conversations; receive an access request to the first message space; and if the access request is a first access to the first message space, then federate the first account to the second account by aggregating profile attributes of the first and second accounts into a single user profile for the first user, and record the federation in an account link. In the server, the first set of access privileges may be associated with the first message space; the second user account may have a second set of access privileges associated with the second message space for private messages; the second set of access privileges may be maintained independently to the first set of access privileges; the second message space may provide private messages that are not regulated by the first message space; and federating may be established when the first user launches the first message space on behalf of the organization to be used for the exchange of messages with a second organization.

In the server, federating may be established when the first user launches the message space on behalf of the organization to be used for the exchange of messages with a second organization; the user may have a third message space associated with the second entity and a third entity; and the processor may further execute instructions from the memory storage device that provide a third message service accessible through the electronic device, where the third message service provides regulated electronic conversations between the user and a third entity in a second organization. For the server, the third message space may have a third set of access privileges and message controls following an organization policy incorporating the business policy for the first organization and a second business policy for the second organization; an entitlement to use the second message service by the user may be established by the organization; use of the second message service by the user may indicate that communications from the user have been authorized on behalf the organization; and a second entitlement to claim ownership of the second message service by the user may be established by the second organization.

In the server, federating may be established when the first user launches the first message space on behalf of the organization to be used for the exchange of messages with a second organization; and upon receiving a request to leave the second message space, the processor may further execute instructions from the memory storage device that deactivate the second user account; dissolve the account link in the federated account; and retain contact information in the first user account in the federated account.

Upon receiving a request to leave the second message space, the processor may further execute instructions from the memory storage device that: change notifications and visibilities associated with the second user account for the second messaging space; create a business channel for the second message service by accepting inputs through a user interface operating on a device remotely in communication with the processor to add an authorized member for an organization associated with the second message service;

and process inputs accepted through the user interface to define ownership rights for the organization for the user.

In another aspect, a method for managing electronic messaging accounts for an organization of a plurality of organizations is provided. The method comprises executing instructions on a processor at a server that: for a first user account for a first user associated to the organization, define a message space accessible through electronic devices in communication with the server. The message space accommodates peer-to-peer administration by users in the organization. The message space also provides facilities for: identifying an owner for the message space; assigning owner privileges for the owner; selectively identifying the first user account as the owner for the message space; and creating a message channel in the message space for messages between users in the organization and users in a second organization. In the method, the owner privileges follow an organization policy for the organization and provide the first user with additional privileges in managing the message space reflecting the organization policy.

In another aspect, a server for managing electronic messaging accounts associated with an organization of a plurality of organizations is provided. The server comprises: a memory storage device; a communication link to an electronic device; and a processor. The processor executes instructions from the memory storage device that: for a first user account for a first user associated the organization, define a message space accessible through electronic devices, where the message space accommodates peer-to-peer administration by users in the organization. The message space provides facilities for identifying an owner for the message space; assigning owner privileges for the owner; selectively identifying the first user account as the owner for the message space; and creating a message channel in the message space for messages between users in the organization and users in a second organization. In the message space, the owner privileges follow an organization policy for the organization and provide the first user with additional privileges in managing the message space reflecting the organization policy.

In another aspect, a method for managing electronic messaging accounts for an organization of a plurality of organizations is provided, where administration of a message space for the accounts is provided on a peer-to-peer basis among the accounts. The method comprises executing instructions on a processor at a server that: store data on a memory storage device relating to the message space, an owner among the accounts for the message space, and owner privileges for the owner; upon receiving a request from a first user in a first account in the accounts to be recognized as the owner, update data relating to the ownership privileges to identify the first user to be the owner if no other user has submitted an earlier active request to be recognized as the owner; identify when the first user has vacated as being the owner of the message channel; and upon receiving a request from a second user to be recognized as the owner, update data relating to the ownership privileges by assigning the owner privileges to the second user if the second user has an appropriate entitlement setting its privileges, and no other user has submitted an earlier active request to be recognized as the owner. For the organization, the owner privileges follow an organization policy for the organization and provide the first user with additional privileges in managing the message space reflecting the organization policy.

In another aspect of an embodiment for this disclosure, a method for managing electronic messaging accounts for a user having a first user account for a first message space associated with a first entity and a second user account associated with a second message space is provided. The method comprises executing instructions on a processor at a server that: provide a first message service accessible through an electronic device in communication with the server, the first message service providing facilities for creating a first message for the first user account for processing by the first message space providing private electronic conversations; provide a second message service accessible through the electronic device, the second message service providing facilities for creating a second message for the second user account for processing by the second message space providing regulated electronic conversations; and receive an access request to the second message service and if the access request is a first access to the second message service, federate the second account to the first account and record the federation in an account link. In the method, the first user account has a first set of access privileges associated with the first message space; the second user account has a second set of access privileges associated with the second message space; and the access privileges to the first user account are maintained independently to the access privileges to the second access privileges.

In another aspect, the method may comprise for the second message service, executing instructions on the processor to create a business channel for the second message service by accepting inputs through a user interface operating on a device remotely in communication with the processor to add an authorized member for an organization associated with the second message service.

The method may further comprise for the business channel, executing instructions on the processor to process inputs accepted through the user interface to define ownership rights for the organization for the user.

The method may further comprise for the business channel, executing instructions on the processor to process inputs accepted through the user interface to control and grant entitlements to the user to make decisions for the organization.

The method may further comprise for the business channel, executing instructions on the processor to selectively permit generate timestamp information about messages shown in the user interface.

In the method, federating the second account to the first account may aggregate profile attributes of the first and second accounts into a single user profile for the user.

In another aspect, a server for managing electronic messaging accounts for a user having a first user account for a first message space associated with a first entity and a second user account associated with a second message space is provided. The server comprises: a memory storage device; a communication link to an electronic device; and a processor executing instructions. The instructions include: providing a first message service accessible through the electronic device, the first message service providing facilities for creating a first message for the first user account for processing by the first message space providing private electronic conversations; providing a second message service accessible through the electronic device, the second message service providing facilities for creating a second message for the second user account for processing by the second message space providing regulated electronic conversations; and receiving an access request to the second message service and if the access request is a first access to the second message service, federating the second account to the first account and record the federation in an account link. For the server, the first user account has a first set of access privileges associated with the first message space; the second user account has a second set of access privileges associated with the second message space; and the access privileges to the first user account are maintained independently to the access privileges to the second access privileges.

For the server an entitlement to use the second message service by the user may be established by an organization controlling the entitlement for the second message service; and use of the second message service by the user indicates that communications from the user may be authorized on behalf of the organization.

For the server, a second entitlement to invite additional users to the second message service by the user may be established by the organization.

For the server a second entitlement to claim ownership of the second message service by the user may be established by the organization.

For the server, messages in the second message service may be archived following a regulatory requirement.

For the server, upon receiving a request to leave the second message space, the processor may execute further instructions to: deactivate the second user account; dissolve the account link in the federated account; and retain contact information in the first user account in the federated account.

A server and/or a device may be provided to implement any aspects of the methods described.

In other aspects various combinations of sets and subsets of the above aspects are provided.

BRIEF DESCRIPTION OF THE DRAWINGS

Embodiments of the disclosure will now be described, by way of example only, with reference to the accompanying drawings, in which:

FIG. 24 is a schematic diagram illustrating exemplary user interface screens of a conversation in progress on a device as processed by the message platform for an embodiment of FIG. 1;

FIGS. 31-36 are schematics diagrams of various message processing processes as implemented by the message platform for an embodiment of FIG. 27.

DETAILED DESCRIPTION OF EMBODIMENTS

Figure 1:
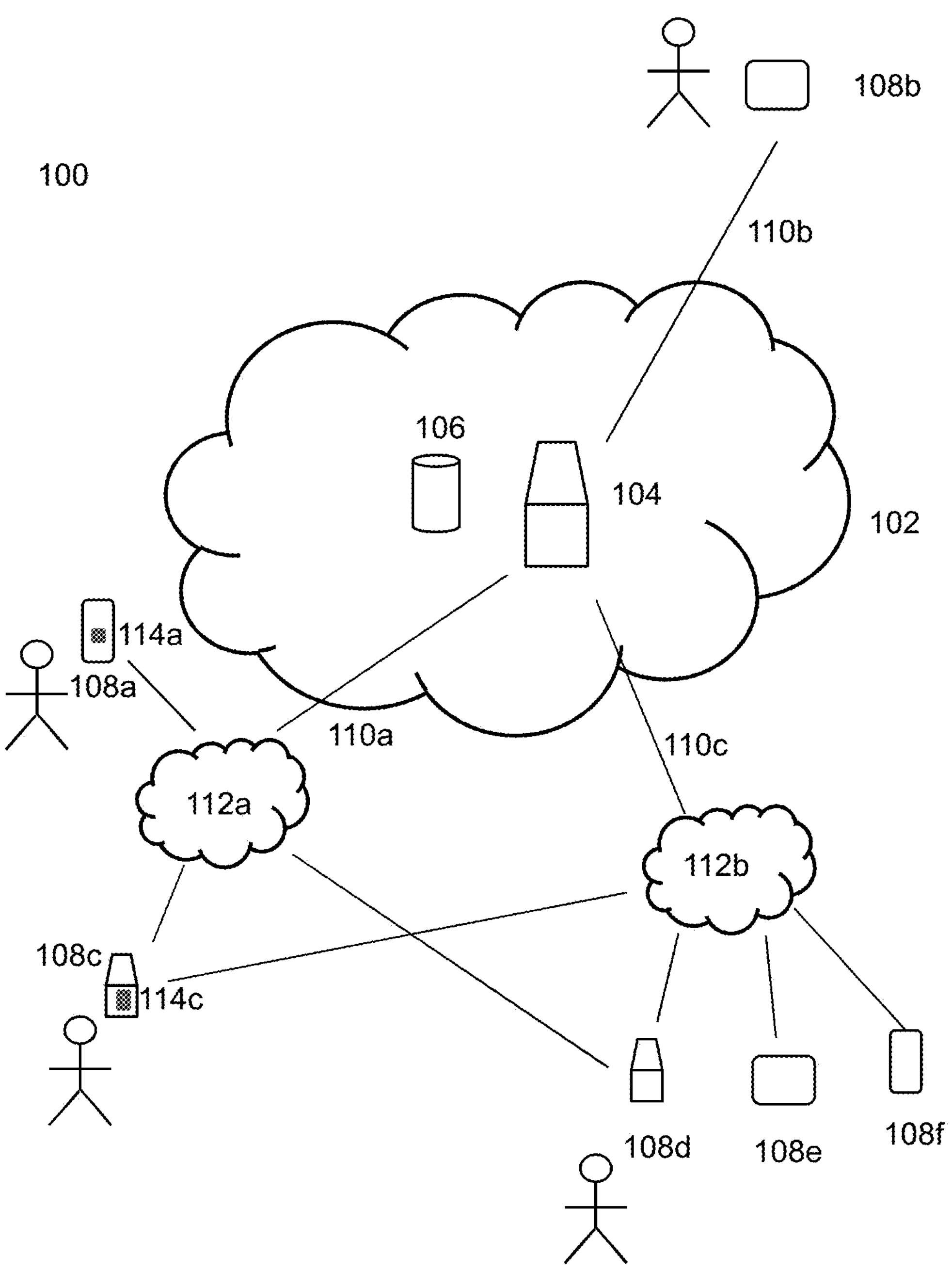
FIG. 1 is a schematic block diagram of an electronic message processing network having a message platform (as a server) and an archiving service accessed by devices (as clients) processing and archiving electronic messages and related postings and conversations among message accounts according to an embodiment.

Exemplary details of embodiments are provided herein. The description which follows and embodiments described therein are provided by way of illustration of an example or examples of particular embodiments of principles of the present disclosure. These examples are provided for the purposes of explanation and not limitation of those principles and of the disclosure. In the description which follows, like parts are marked throughout the specification and the drawings with the same respective reference numerals.

First, for context, structural components of an embodiment and its features are described in view of FIG. 1. An embodiment of the disclosed system and method is depicted in environment 100. At its core, system 102 has message platform 104 (as a message processing server) with database 106 that communicate with devices 108 through various communication links 110. Each device 108, may have installed thereon local client software 114, providing an application program interface (API) and a communication interface to system 102. Devices 108 include wireless mobile devices 108*a*, computing tablets 108*b* and computers/laptops 108*c*. Communication links 110 may be wireless or wired. A user of exemplary device 108 has one or more message accounts managed by platform 104. Sets of message accounts may be associated with specific entities or organizations 112 (e.g. individual companies). A user account may have associations with multiple organizations 112. Messages processed by platform 104 are electronic messages. Various formats and transmission protocols may be used for communicating the messages, such as forms akin to email messages, text messages, and others known in the art. For an embodiment, messages are tracked and processed in a format resembling text message streams, where message conversations are generated on a sender's (and recipient's) device(s) 108 as individual messages are added to a particular conversation. Some users with their devices 108 may belong to an organization that manages accounts for platform 104; for the sake of identification, such users are identified herein as "internal" users, where such identification is useful. Meanwhile other users with their devices 108 may not belong to that organization; such users are identified herein as "external" users, where such identification is useful.

Figure 2:
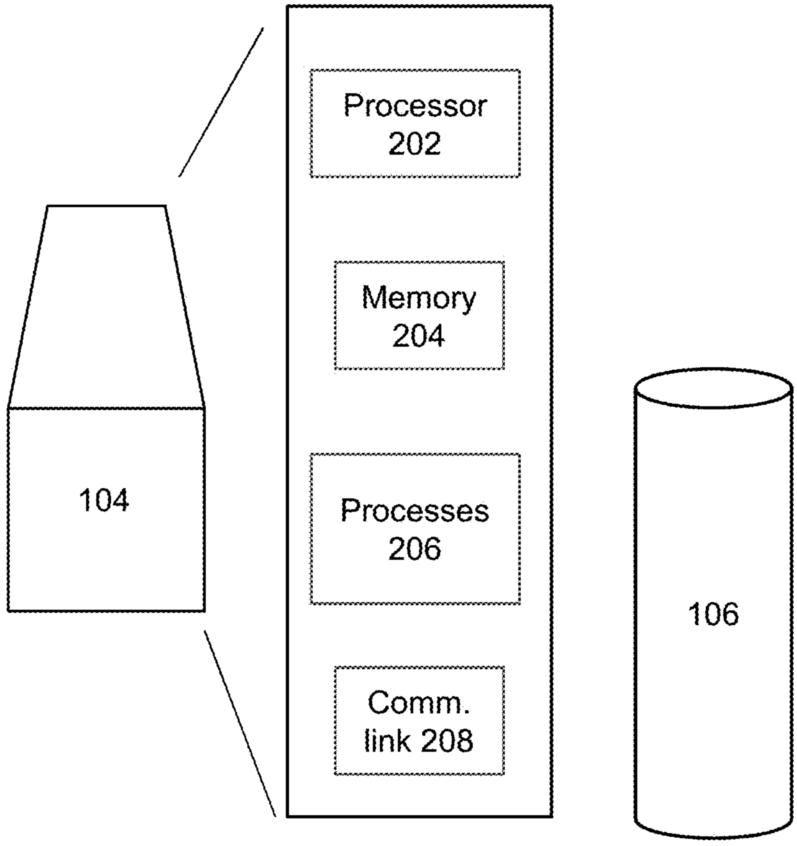
FIG. 2 is a block diagram of the message platform and archiving service of FIG. 1 and a database of the message processing network for an embodiment.

FIG. 2 shows components of platform 104 as provided by an embodiment. Platform 104 may be implemented as a server having a typical processor and as such may be a stand-alone computer, a laptop, a tablet, a server, or other computing devices. Platform 104 may be accessed directly at its terminal or remotely through a communication network. Platform 104 has processor 202, memory 204, access to database 106 and communication link module 208. Software accessing database 106, accepts data and processes it for storage into database 106, accepts input for queries from graphical user interfaces (GUIs), user interfaces (UIs), and other sources, generates database results based on same and generates reports and results as described above. Database 106 stores records accessed by platform 104 and may be contained within system 102 or may be accessed remotely. Database 106 stores records and data relating associations for accounts, organizations, contact information and other data as described herein. One or more functions of platform 104 may be distributed among several devices. It will be appreciated that devices 108 and clients 114 may have similar corresponding components and structures to comparable components shown for platform 104.

Briefly, an embodiment provides systems, methods, devices and processes for managing and processing electronic messages generated from one or more message accounts of a user.

A feature of an embodiment provides multiple communication "spaces" in which a user may post messages. A space is a logical construct that is defined for use in a message system, where the space has some defined common topic, goal or feature (e.g. a "Science Fiction Lovers" space). For a given space, protocols may be defined that govern how messages are processed, marked, distributed and retained. Such protocols may be encoded as a set of individual logical privileges that are attributes to message accounts associated with a space. The privileges may be set, reset or revoked as needed for an account. A space manager may have an account that is authorized to manage these privileges and the accounts. Privileges and rights defined for a space and for a user's account for that space collectively determine how an electronic message made by that user in that space is processed. Such processing parameters may include the scope and timing of distribution of the message to other users in the space, augmentation of additional information, labels or tags on the message, vetting of comments or content from the message and message archiving parameters (such as whether to archive the message or not, retention policy for archived messages, etc.). For a given space, a particular message format may be used (e.g. a text message-based format) that may or may not be the same message format as used in other spaces. However, for an embodiment as described herein, spaces within platform 104 use a text message-based format.

An embodiment provides tools and processes to define and use a private space, which is useful for distribution of personal messages from a user. In an embodiment, private messages are messages that the user has almost exclusive paramount control over content and distribution scope. The full privileges for such private messages are ultimately designed and controlled by a system administrator. Features relating to message and account processing that access, update and assess these privileges may be provided by processes and systems operating in platform 104. Such privileges may provide the user with more/full control of how messages are sent (or more perhaps more accurately, providing less/no control or supervision by the system administrator as to how private messages are sent, etc.).

An embodiment also provides tools and processes to define and use an organization space, which is useful for distribution of "professional" messages from a user. For example, an organization space may be utilized when a user wishes to send a message as an agent of an organization, e.g.

as an employee of a corporation. An organizational space typically may be subject to additional restrictions as to how the user's electronic messages are processed and vetted. These restrictions may be imposed to conform to internal policies of the organization or to external rules and laws (e.g. the US SEC Rules 17a-3 and a-4, the EU GDPR, and the US HIPAA and HITA). For example, an organization space may impose: restrictions on which its users may distribute messages in that space; validation requirements of identity, business purpose or roles for the message or user; restrictions on roles and actions that may be executed by its users; requirements for data and message logging of actions for its users; encryption standards for data, both for active live actions and actions executed when a previously off-line device re-connects to the space (e.g. a mobile phone in an airplane); access requirements to message and records for users in the space.

It will be appreciated that an embodiment's private/organization space constructs align with decisions made by people and organizations in ordinary professional circumstances. For example, a person and a company make daily decisions that mix professional and non-professional subjects (whether to join a company, whether to hire a person, what to have for lunch, etc.) and use of an appropriate space for a message will inherently align with that context.

As noted earlier, an embodiment permits logical spaces to be created that convey intent to its users. For example, a user may create a professional space if he wishes to communicate in a B2B (business-to-business) and B2C (business-to-consumer) context with other users. A private space may be created if the user wishes to have private communications with other users. At a message session level, a user enters either social message process (sometimes referred to herein as simply "personal message") or professional message process (sometimes referred to herein as simply "professional message") and is authenticated according to the constructs of the selected space. A user entering professional message may be provided with more communication options since he may be entitled to communicate on behalf of an organization. Once inside professional message a user may interleave private and professional communications if desired. It will be appreciated that constructs and operations of Spaces and their implementations may operate independently of other features of an embodiment.

Once a set of spaces have been defined, an embodiment provides different services (i.e. processes) through platform 104 that may be accessed through client 114 on device 108, where each service provides access to a message processing platform to process messages being generated and sent from client 114 to that space.

Before additional features of an embodiment are described, some terms are defined below that are used to describe various operational, functional and structural aspects of logical records, spaces, entities, accounts and processes for messages and message accounts processed by an embodiment:

"Message Platform" An electronic messaging system/server that implements message processing features an embodiment. It is represented generally as platform 104.

"Message Client" A device accessing the message platform according to requests issued from a person.

"Common Platform" A multi-tenanted platform supporting enterprise applications such as message compliance archival and review (and Professional Message), which may be subscribed to by Organizations.

"Message Account" A record maintained by the Message Platform of a person who uses the Message Platform to communicate with other persons. A Message Account includes attributes such as first name and last name as well as a Message Platform logon identity and credentials.

Figure 3:
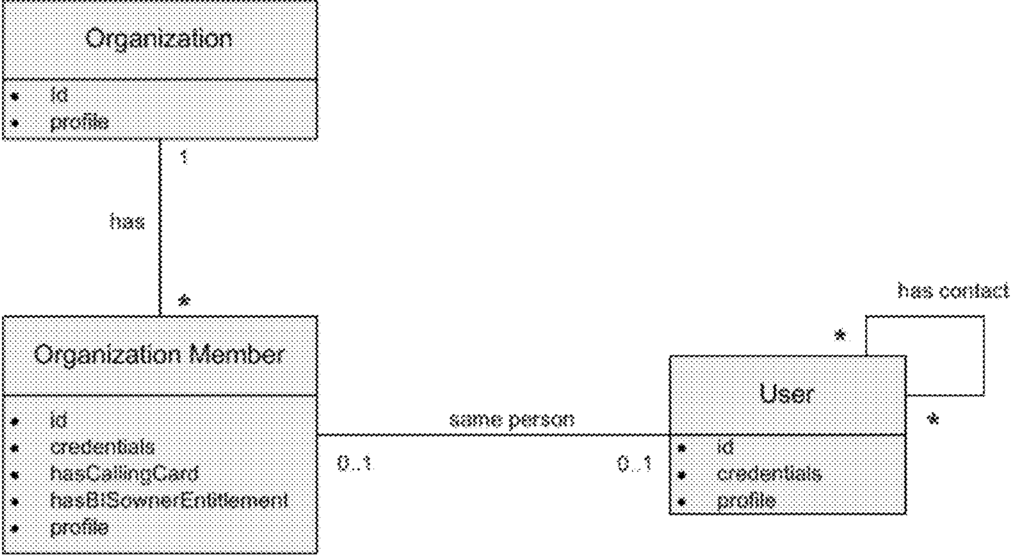
FIG. 3 is a schematic diagram of a data model showing exemplary relationships among a user (account), an organization member and an organization as implemented by the message platform for an embodiment of FIG. 1.

"User" The person associated with a Message Account. A User establishes and controls a Message Account in order to use the Message Platform. As illustrated in FIG. 3, a user maintains a list of other Users that he communicates with frequently (i.e. contacts).

"Member Account" A record in the Common Platform of a person who uses applications on behalf of an Organization for which that that person is a member. A Member Account may include contextualized attributes for the person, e.g. role(s) within the organization, office location as well as a Common Platform logon identity and associated credentials.

"Organization Member"

A person associated with a Member Account. An Organization establishes and controls Member Accounts for members of its organization relating in part to logon permissions to Common Platform services.

"Logon Session" A computing session that begins when a user authentication is successful and ends when the user either logs off of the system or the session times out for security reasons.

"Social Message" A Message Platform entry point for a User. A User who launches Social Message is authenticated against his Message Account.

"Professional Message"

A Message Platform entry point provided to an Organization in the Common Platform. An Organization may subscribe to Professional Message so that it may designate members entitled to use the Message Platform for communications on behalf of the Organization. An entitled Organization Member who launches Professional Message is authenticated against the Member Account representing his membership with a particular Organization. Access may be provided on a subscription basis.

"Social Message Session"

A Logon Session established for Social Message. A User's entitlements and privileges in a Social Message Session are determined by verification of his identity to a personally managed account rather than an account associated with an Organization. As such, in one embodiment a Social Message Session only permits a User to communicate with other Users on the User's personal behalf.

"Federated Business Session"

A Federated Business Session is a session established in a third-party federated system and exists in relation to a corresponding business account in the federated system. Increasingly, messaging systems are designed to accommodate two or more types of users for example, individuals acting on their own behalf as a first type and business users acting on behalf of an organization as a second type. When two such messaging systems are federated together it is then possible to align the business account in the first messaging system with a corresponding business account in the second federated messaging system such that when a business user establishes a logon session in the first messaging system a corresponding business session is established in the second messaging system. This second business session is designated a Federated Business Session.

"Calling Card" An entitlement designation attributable to an Organization Member by an Organization. The bearer of a Calling Card is entitled to enter Professional Message on behalf of the associated Organization. This entitlement mechanism gives an Organization control over which of its members are entitled to communicate on behalf of the Organization. Granting of a Calling Card (and its privileges) is controlled by settings in the Platform.

"Account Federation"

An association created between a Member Account and a Message Account for the same person. The first time a person enters Professional Message on behalf of a particular Organization, the associated Member Account is federated with the Message Account. Account Federation requires the person to verify that he can authenticate against both accounts, thereby establishing the existence of a trust relationship (e.g. an employed-by relationship) with that Organization.

"Professional Message Session"

A logon Session established for Professional Message on behalf of an Organization. A person may not initiate a Professional Message Session on behalf of that Organization until it is determined that his Member Account is for the same person having has an established Message Account identity. Successful Account Federation establishes that both of these Accounts are for the same person. A Professional Message Session enables a User to communicate with other Users on behalf of the User's Organization or on the User's personal behalf.

"Message-entitled Organization Member"

An Organization Member having been assigned a Calling Card and who has successfully federated his Member and Message accounts. As such, this person is entitled to enter Professional Message for communications on behalf of his Organization or on his personal behalf.

The following terms define various relationships for spaces and records containing data and relationships for electronic messages processed by embodiment:

"Interaction Space" (short form "IS" or "Space") A logical space in which users may post content and electronic messages and view content posted by others belonging to that space. A Space may be referred to as a Message Space "IS Participant" A User that views and posts content for a particular Interaction Space.

"IS Posting" (synonym to a "message") Content posted into an Interaction Space.

"Interaction Space Type"

A type of Interaction Space. Each Interaction Space is typed according to a defined governing social context(s).

"Private Interaction Space"

An IS providing private communications by users and that is not affiliated with any Organizations.

"Professional Interaction Space"

An IS providing professional communications for at least one user acting on behalf of his Organization; this IS may involve B2B and B2C communications.

"Business Interaction Space" (short form "BIS")

An IS providing controlled communications between Organizations. Control of a BIS (e.g., membership control, privilege control) is decentralized among participating Organizations (i.e. peer-to-peer control). Control may determine access and privileges for a related User (e.g. levels of rights to post and view IS content).

"Company Channel"

A Business Interaction Spaces with one BIS Partner. This represents a case where a single Organization exercises access control over sensitive communications.

"Business Channel" A Business Interaction Space with two or more BIS Partners. This represents a more-expected case where multiple Organizations collaborate in peer-to-peer fashion with each Organization exercising access control for its respective members.

"BIS Partner" A participating Organization for a particular BIS. Each BIS Partner has a BIS Owner that controls which of the Organization's Message-entitled Organization Members have access to the BIS.

"BIS Owner" A Message-entitled Organization Member having control of privilege and access granting rights for a particular BIS, on behalf of the Organization. Effectively, a BIS Owner is a proxy for a BIS Partner. This reflects an organization-centered accountability for Business Interaction Spaces. By definition, a BIS Owner has complete access to the BIS (i.e. unrestricted message posting and unfettered message viewing capabilities within the BIS) as well as control privileges.

"BIS Owner Entitlement"

An entitlement awarded by an Organization to an Organization Member. The bearer is provided with privileges to create and/or claim ownership of Business Interaction Spaces. By controlling the privileges to the User, an Organization is able to control how many Organization Members are entitled to negotiate with other Organizations to establish BISes.

"Message Directory"

A Message Platform service for finding Organizations, Users and Business Interaction Spaces.

The above terms and definitions are provided for brevity and convenience and do not limit their scope or the scope of this disclosure. The disclosure may use other terms not listed above that have a similar meaning to a comparably defined term, which will be clear in context of the usage. Although the terms above are capitalized, whether or not a defined word when used below is capitalized does not detract from its meaning and scope, which will be clear in context of its usage.

Another feature of an embodiment provides federation of a person's member account with his message account. Account federation requires the person to verify that he can authenticate both accounts, thereby establishing the existence of a trust relationship (e.g. an employed-by relationship) with that organization.

Figure 4:
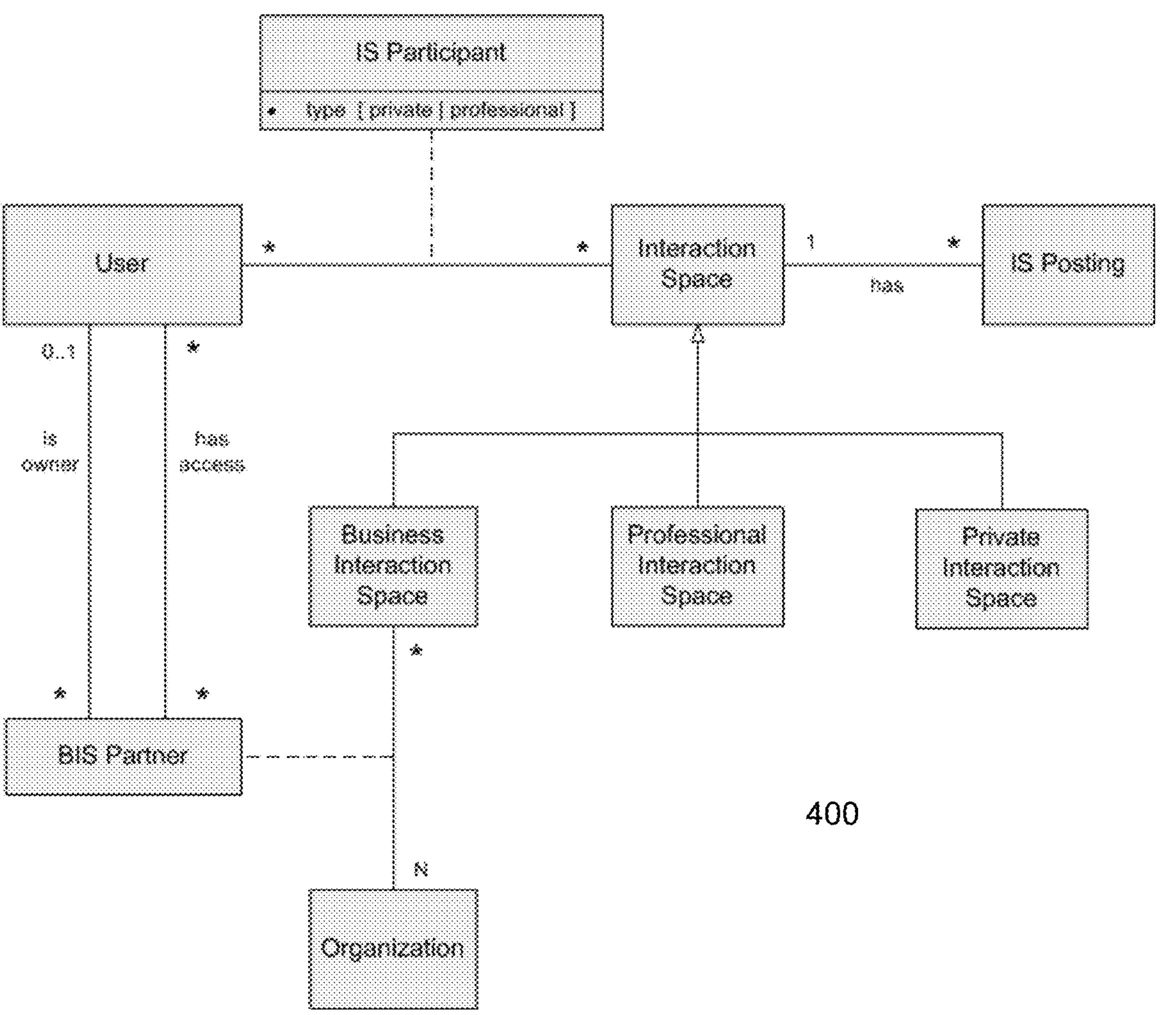
FIG. 4 is a schematic diagram of one data model showing of exemplary relationships with two interaction spaces as implemented by the message platform for an embodiment of FIG. 1.

Referring to FIGS. 1-4, for an embodiment, database 106 contains records and relationships of several entities and accounts (see FIGS. 3 and 4). An embodiment provides definable Spaces for messages that are created and manages how messages in those Spaces are processed.

As noted, a Space has an inherent context (as provided during its definition stage) that is used to reflect relevant organizational, regulatory, or other requirements for electronic messages processed through that Space. The context inherently indicates obligations and expected actions for Messages sent through that Space. For example, messages posted to Professional and Business Interaction Spaces are subject to SEC regulations relating to retention. Each Space operates and exists independently of other Spaces. For example, entering into a Professional IS subject to enterprise-based regulatory governance does not preclude the User from entering a different Private IS. Exemplary IS provided by an embodiment include:

Private Interaction Space

Organizations affiliated with Users have no governance over IS Postings. An IS Participant may freely invite other Users to the Space.

Professional Interaction Space

For an embodiment, a User may participate in a Professional Interaction Space either as: a Private IS Participant acting on his own behalf (e.g., as a "consumer" in a B2C communication); or as a Professional IS Participant acting on behalf of his Organization (e.g. the "business" in a B2C communication. Each Private IS Participant is authorized to invite other Private IS Participants into an existing Professional Interaction Space. Similarly, each Professional IS Participant is authorized to invite other Professional IS Participants into an existing Professional Interaction Space. An Organization has the authority to archive and review posted content if at least one of the IS Participants is participating on behalf of the Organization.

Business Interaction Space

For an embodiment, BIS Partners set access privileges to control which of their Message-entitled Organization Members are entitled to participate in a BIS. A Message-entitled Organization Member may have privileges allowing him to identify a BIS that he has been granted access to, via a search of the Message Directory. For an embodiment, BIS Users are designated to be Professional IS Participants and each BIS Partner is provided with privileges to archive and review content posted to a BIS.

Federated Business Interaction Space

For an embodiment, a Federated Business Interaction Space is a refinement of a Business Interaction Space that deals with the nuances of interfacing with and managing the federated organization and user account of a third-party messaging system as for example WhatsApp Interaction Space. This is sometimes described as a B2B2C relationship. Here the first participant account is a Global Relay Business User (the first "B" as in Business account) and operating the normal Global Relay App client 104/114. They have a second business account that has been authorized (validated and verified?) to a federated third-party system e.g. WhatsApp (the second "B" as a WABA). Finally, WhatsApp platform enables them to communicate with an external consumer using the WhatsApp app (the "C" in B2B2C).

An embodiment provides different categories of message sessions, including: a Social Message Session (where a related process used to activate this Session on device 114 is sometimes referred to herein as "Social Message"), which provides a messaging forum where the User can represent himself in the message communication with other users; and a Professional Message Session (where a related process to activate this Session on device 114 is sometimes referred to herein as simply "Professional Message"), which provides a messaging forum where the User can represent either his Organization in communications or himself. Service sessions are entered by authenticating the User against the appropriate account. Social Message Sessions are established by authenticating against the User's Message Account. Professional Message Sessions are established by authenticating against a Member Account that is federated with the User's Message Account.

In one embodiment, a person's Message Account is deemed to be sufficient for access to Social Message independent of any organization memberships. When a User joins an Organization, he may wish to communicate to others as being a Member from that Organization. In order to communicate on behalf of the Organization, a person must have a Member Account for the Organization and proper privileged and credentials from the Organization. To provide these credentials, an embodiment uses the Calling Card construct with the Account. A Calling Card is akin to a "talking stick"/"speaker's staff" that is awardable to a User by an Organization. For an embodiment, in order for a User to have the privileges to be able to use Professional Message, the User needs (1) to have been assigned an appropriate Calling Card from the Organization; and (2) to be able to securely associate his message identity with his member identity—i.e. prove that he is the person represented in both accounts. Other credentials may be set to a Calling Card as needed by an Organization.

The first time Professional Message is entered on behalf of an Organization, the User must federate his Member Account with his Message Account, thereby verifying that he is the person represented by both accounts. When the User leaves the Organization, his Member Account is deactivated, thereby dissolving that Account Federation. This constitutes a repeatable process whereby a User creates a single Message Account, which may be repeatedly federated and un-federated with member accounts as the User joins and leaves Organizations.

The Tables below provide some exemplary details on fields stored for user account records:

| Message Account | |
|---|---|
| Field | Contents |
| First Name | Bob |
| Last Name | Smith |
| Personal email address | bsmith@email.com |
| Personal phone number | (555) 555-1212 |
| Other data | |

| Member Account | |
|---|---|
| Field | Contents |
| Office Location | Main |
| Title | President |
| Organization email address | Bsmith@company.com |
| Organization phone number | (555) 666-1212 |
| Other data | |

It will be appreciated that other data structures stored, used, and updated by an embodiment track entitlements and statuses of accounts and message systems. Contents of these data structures will be reviewed to determine how account and message requests from users and the system are processed.

Now additional details are provided on actions and events that are conducted on messages and accounts as a User joins and leaves organization(s).

Establishment of a Message Account by a User creates an electronic record of a verifiable, personal identity used by Message Platform to identify and locate the User. When an Account is first established, the User becomes visible in the Message Directory and has access to Social Message.

Figure 5:
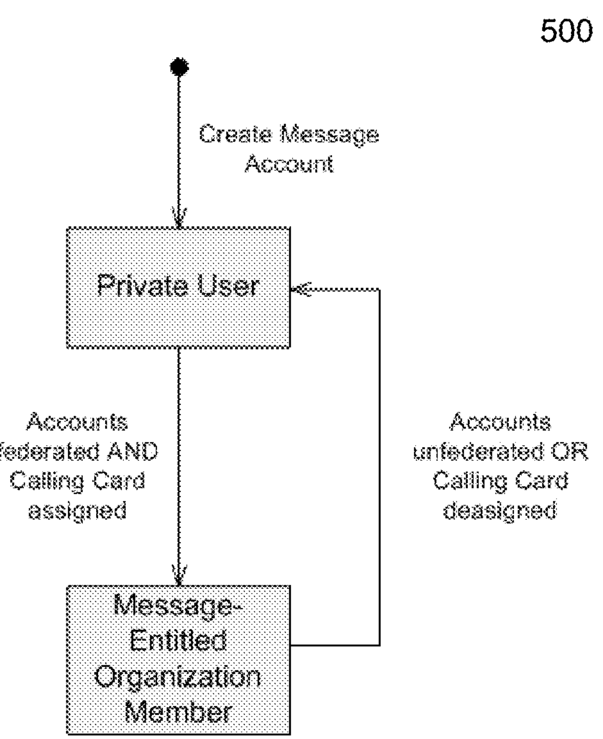
FIG. 5 is a schematic diagram of a state machine illustrating an exemplary life cycle of a user (account) executed by the message platform for an embodiment of FIG. 1.

FIG. 5 shows aspects of a "life cycle" for a User illustrating how a Message Account progresses through various states as his messages are processed by an embodiment. As noted earlier, a User's Message Account may or may not be linked to a Member Account associated with an Organization. This association is determined via a federating process of the User's Accounts. A User is in one of two states as illustrated in state diagram 500, first as a Private User and then as a Message-entitled Organization Member. As a Private User, the User's Message Account is not linked to a Member Account for an Organization. The User may only represent himself in his messages with others. As a Message-entitled Organization Member, the User's Message Account is linked to a Member Account for a particular Organization. In this state, the User is entitled to communicate with others, either as himself or as a designated representative of the related Organization.

Figure 6:
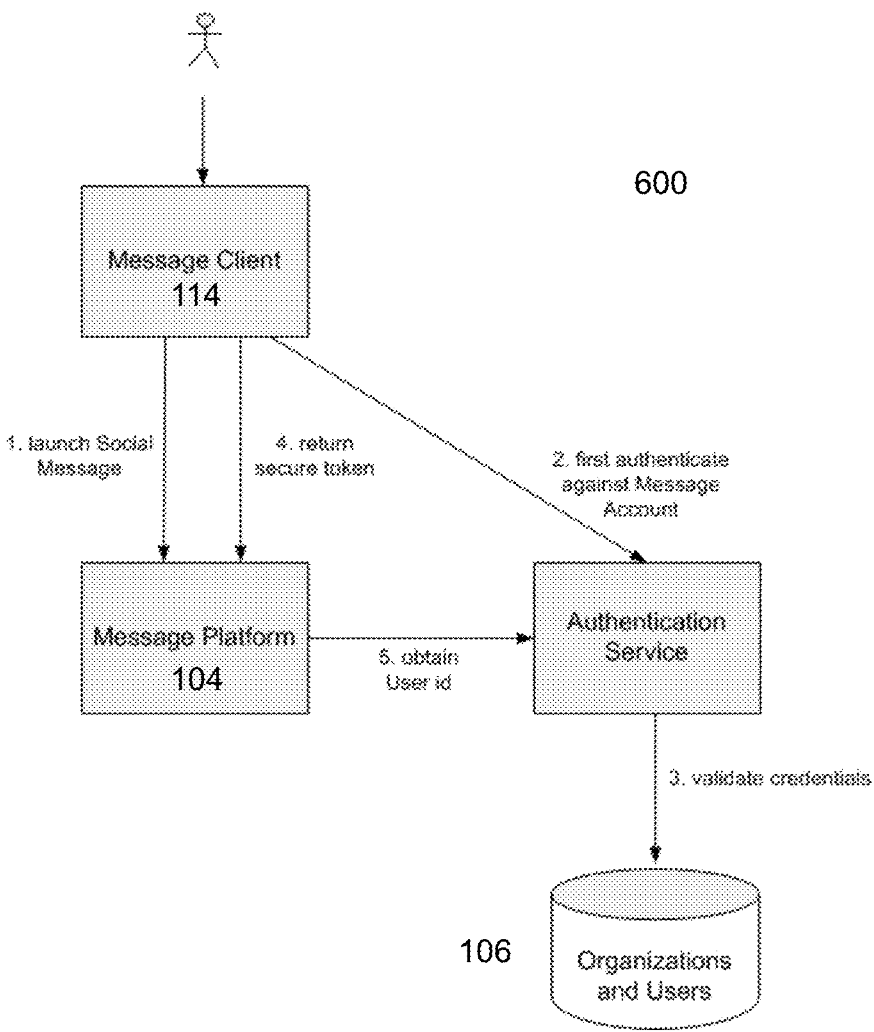
FIG. 6 is a schematic diagram of message account authentication actions executed by the message platform for an embodiment of FIG. 1.

FIG. 6 illustrates User authentication as a side-effect of launching a Social Message Session:

i) launching a Social Message Session by the User on his device;

ii) intercepting the action and redirection of the service request to an authentication service in the message platform;

iii) presenting at the device of credentials to be validated against his Message Account; and iv) returning control of action to the device for entry into a Social Message Session, this time with a secure token.

The secure token is used by an embodiment to obtain a User ID from the authentication service and the ID serves as a messaging address for the User.

Social Message Sessions provide access to one or more of the following additional processes/functions:

- Searching Message Directory for Users and Organizations;
- Initiating Private Interaction Spaces with other Users;
- Responding to Private Interaction Space invitations from other Users;
- Posting to and viewing IS Postings for a Private Interaction Space;
- Inviting additional Private IS Participants into a Private Interaction Space;
- Soliciting advice from a Message-entitled Organization Member by initiating a Professional Interaction Space with that User. This instantiates a B2C Professional Interaction Space where our User is a Private IS Participant and the other, a Professional IS Participant. For instance, a Private IS Participant may use a B2C Interaction Space to solicit advice from a financial consultant;
- Inviting additional Private IS Participants into a Professional Interaction Space. For example, a spouse may be invited into a B2C consultation with a financial advisor. A Private IS Participant cannot invite additional Professional IS Participants as this infringes on the rights of the initial advisor invited into the B2C communication; and/or
- Establishing a personal contact list comprised of Users that are frequently messaged.

Figure 7:
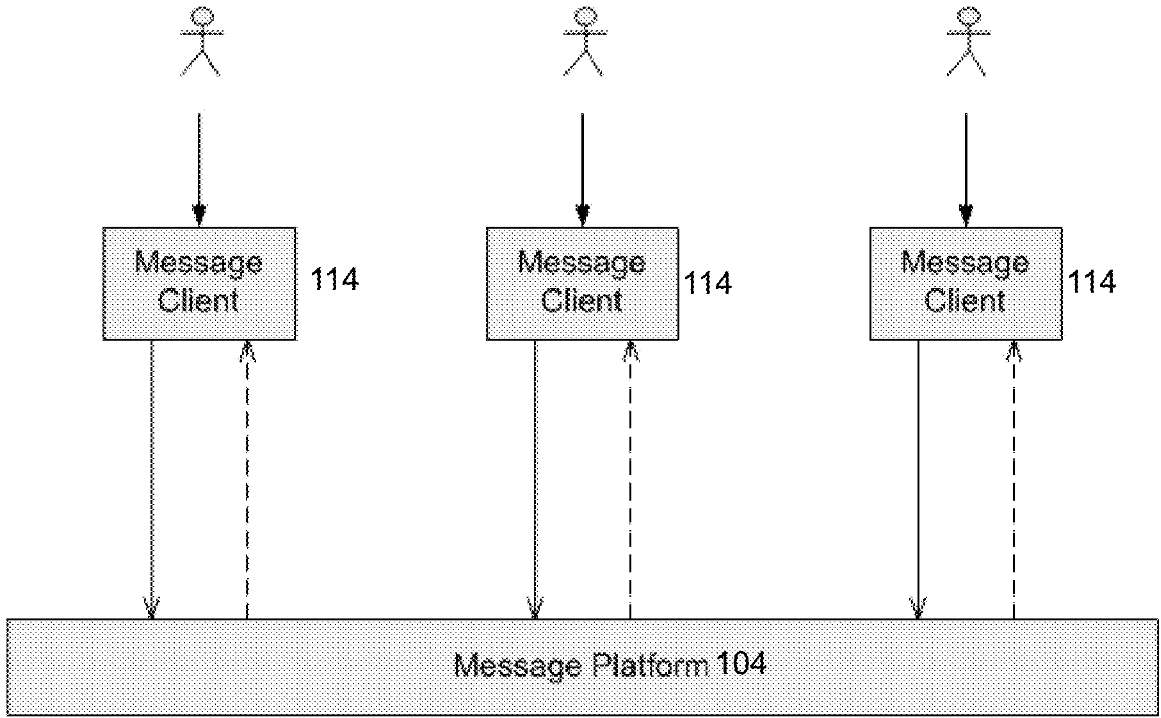
FIG. 7 is a schematic diagram illustrating interactions of users in a private interaction space by the message platform for an embodiment of FIG. 1.

FIG. 7 illustrates relationships of three online Users with platform 104 and database 106 that communicating via a Private Interaction Space. The solid directed lines represent messages submitted by Users to platform 104. The broken directed lines represent real-time messaging events distributed from platform 104 to online Interaction Space participants.

Figure 8:
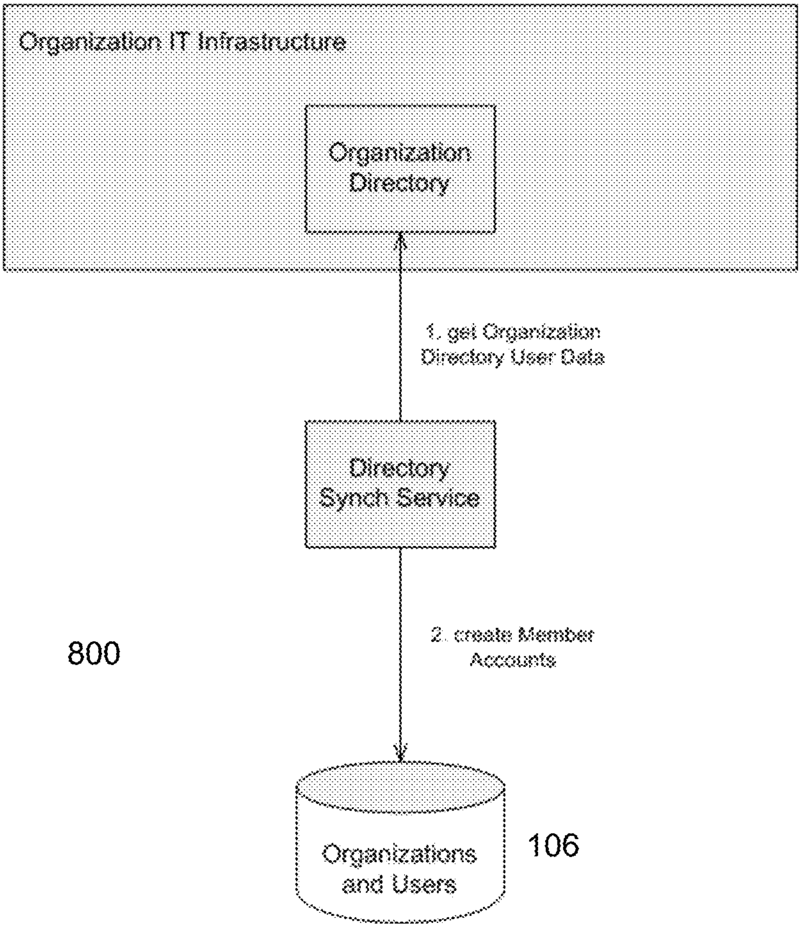
FIG. 8 is a schematic diagram illustrating components of the message platform for an embodiment of FIG. 1 when executing directory synchronization functions.

Referring to FIG. 8, in operation, when an Organization subscribes to enterprise applications available on the Common Platform, including Professional Message, its Member Accounts and entitlements to the Accounts need to be identified and assigned. Such Professional Message entitlements include Calling Cards and BIS Owner Entitlements.

To assist in provisioning member accounts, an embodiment provides a directory synchronization service to enable an Organization to synchronize its Member Accounts with its IT Directory Service information (e.g. data in its Microsoft Active Directory). Directory synchronization ensures that personnel and staffing decisions (e.g. hiring, internal group affiliations, terminations, job titles, seniority, etc.) are coordinated with information in database 106.

An Organization controls visibility of Member Account attributes in the Message Directory Profiles of its Users. An Organization can choose to make more attributes visible to Users in its Organization than to Users not in its Organization. For example, the "job title" attribute of Member Accounts may be visible to Users within the Organization but hidden from Users outside the Organization.

Now, additional details are provided on how an individual, non-affiliated User is incorporated into an Organization by an embodiment. Referring to FIG. 8, consider a situation where a User has just joined an Organization. Initially, the Organization may assign to the User a Calling Card so that he may access the Professional Message service.

When the new Organization Member launches the Professional Message service, the embodiment federates the User's Member Account with the Message Account. Account federation requires the User to verify that he can authenticate against both accounts, thereby establishing the existence of a trust relationship (e.g. an employed-by relationship) with the Organization. A successful federation establishes a persistent representation of the "same person" relationship illustrated in FIG. 3. It will be appreciated that constructs and operations of account federation may operate independently of other features of an embodiment.

Figure 9:
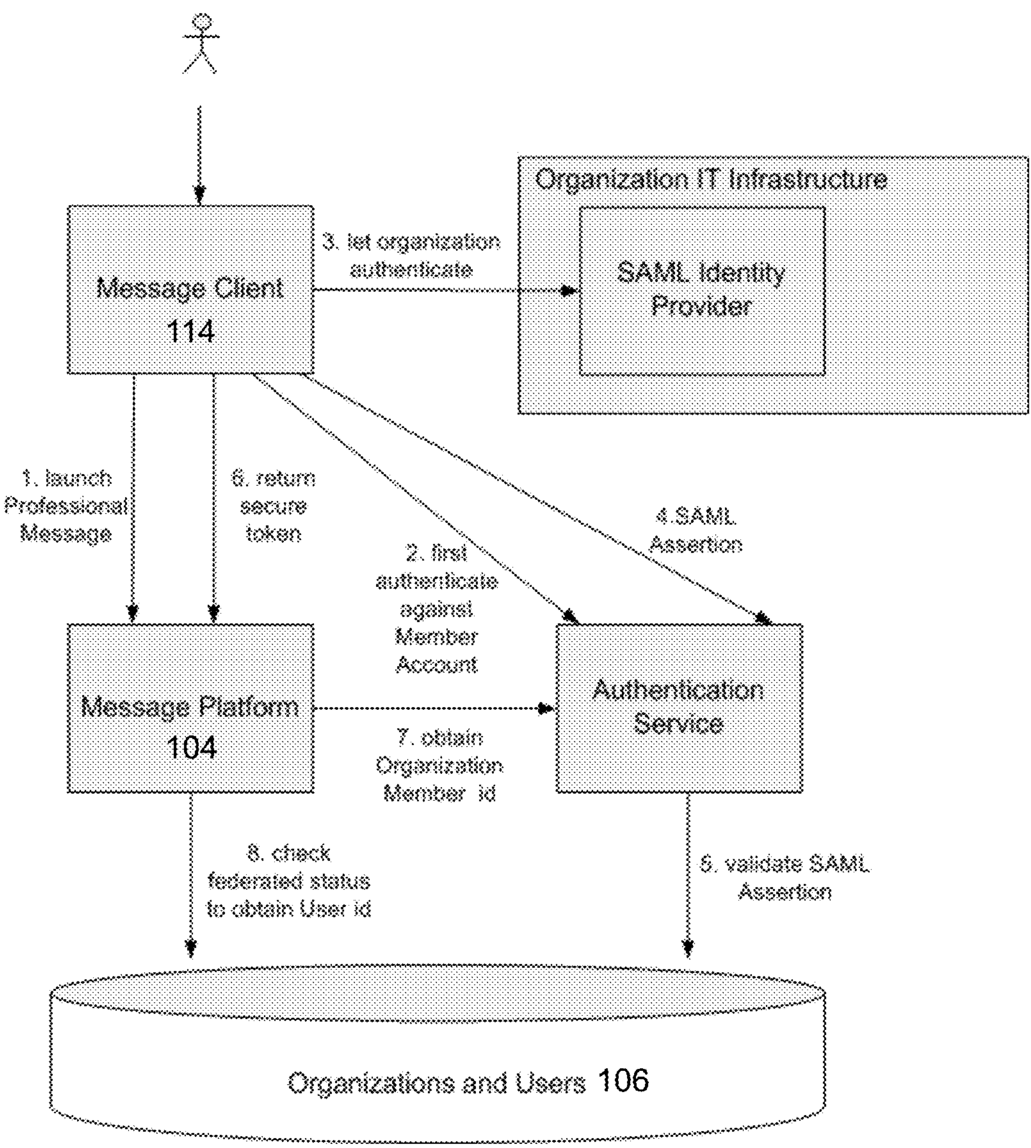
FIG. 9 is a schematic diagram of organization account authentication actions executed by the message platform for an embodiment of FIG. 1.
Figure 10:
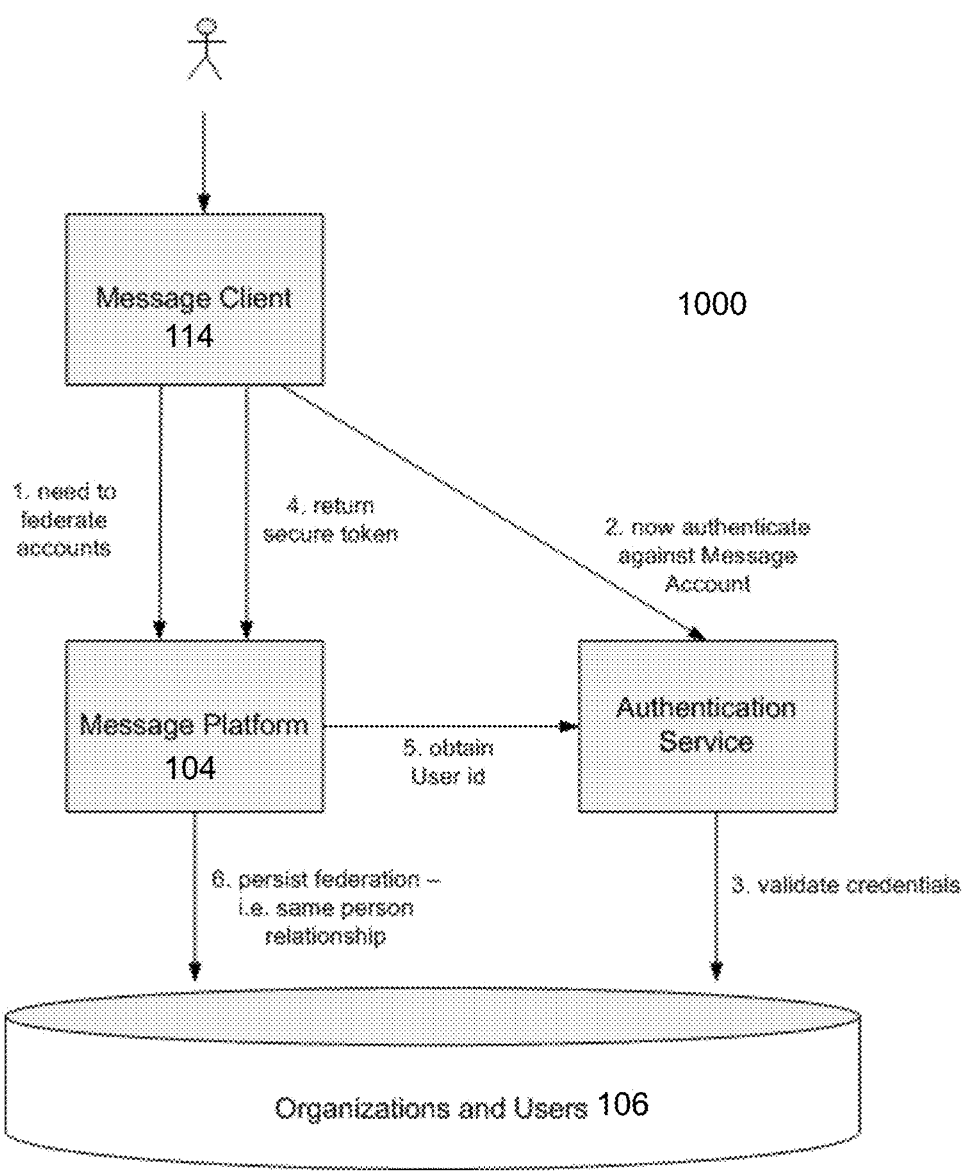
FIG. 10 is a schematic diagram of account federation actions executed by the message platform for an embodiment of FIG. 1.

An exemplary federation process is illustrated in FIGS. 9 and 10. FIG. 9 illustrates processes executed by client 114 on device 108, platform 104 and a general authentication service (GAS) operating at platform 104. After a Professional Message service is launched on device 108, the User is authenticated against his Member Account through the GAS and the Organization's IT infrastructure. Authentication activates a lookup process to identify the User's Member Account and whether it is currently federated with his Message Account. The Organization's authentication services typically support Security Assertion Markup Language (SAML) protocols, which provides an Organization with complete control over how its Members are authenticated. As illustrated in FIG. 9, the User is authenticated via a SAML Identity Provider, which is a part of an Organization's IT infrastructure.

After the User is authenticated against his Member Account, if the Member Account is not currently federated with his Message Account, he is authenticated against his Message Account. After a successful Message Account authentication, a persistent representation of the "same person" relationship illustrated in FIG. 3 is established; the User's Member Account is now persistently federated with his Message Account. On subsequent Professional Message login(s), authentication against the User's Message Account is not needed. It will be seen that under SAML Member Account authentication, avoidance of subsequent Message Account authentication, provides a single sign-on experience for the user.

FIG. 10 illustrates processes executed by client 114, platform 104 and the GAS in federating accounts. In an embodiment, once accounts are federated, platform 104 persists the "same person" link between the User's Member and Message Accounts, which acts as a persistent record of the Account Federation. A successful account federation associates the Message User with an Organization; this association is visible to the general body of the system's Users. This affiliation between the User and the Organization represents an authoritative trust relationship between the User and the Organization. It is authoritative in the sense that both parties contribute to the linkage; an organization establishes Member Accounts and Calling cards; a user establishes that he represents the same person who is able to authenticate to the newly provisioned Member Account as well as his Message Account. The affiliation is first established when the User launches Professional Message service on behalf of his Organization; and it is naturally severed when the User leaves the Organization and his Member Account is deactivated (which invalidates any entitlements assigned by the Organization).

In an embodiment, when a User successfully accesses platform 104 using a Professional Message service entry point, the User is able to communicate with others on behalf of his Organization as governed by entitlements assigned to his Member Account by that Organization. For example, this includes entitlements to be able to:

- Initiate a Professional Interaction Space, as a Professional IS Participant;
- Accept a Professional Interaction Space invitation for participation as a Professional IS Participant and to communicate with other IS Participants in that context;
- Invite additional Professional Participants into a Professional Interaction Space;
- Discover, in the Message Directory, a BIS that he has been granted access to;
- Join a BIS that he has been granted access to and communicate with other BIS Participants in that context;
- Create a new BIS and communicate with other BIS Participants (subject to User having the BIS Owner Entitlement);
- Discover, in the Message Directory, a BIS involving his Organization, which lacks an owner for his Organization (subject to User having the BIS Owner Entitlement); and/or
- Claim a BIS ownership on behalf of his Organization and communicate with other BIS Participants (subject to User having the BIS Owner Entitlement).

Turning now to access and archiving features of an embodiment, IS message archiving is performed on an Organization-centric basis applying rules that navigate potentially contradictory goals involving a user's privacy rights and an organization's requirement to comply with external regulations. An IS Posting may be stored in multiple organization-centric archives as a side-effect of the IS Posting having taken place for either a Professional or Business IS. The IS Posting being archived has a Professional IS Participant acting on behalf of the Organization when the IS Posting was made. Archived IS Postings includes a metadata representation of a context under which data was posted. For example, it is recorded that the posting was made by a private individual in the context of a B2C IS. This ensures that archived content is readily interpreted after-the-fact with regard to an original intent of the posting users.

Figure 11:
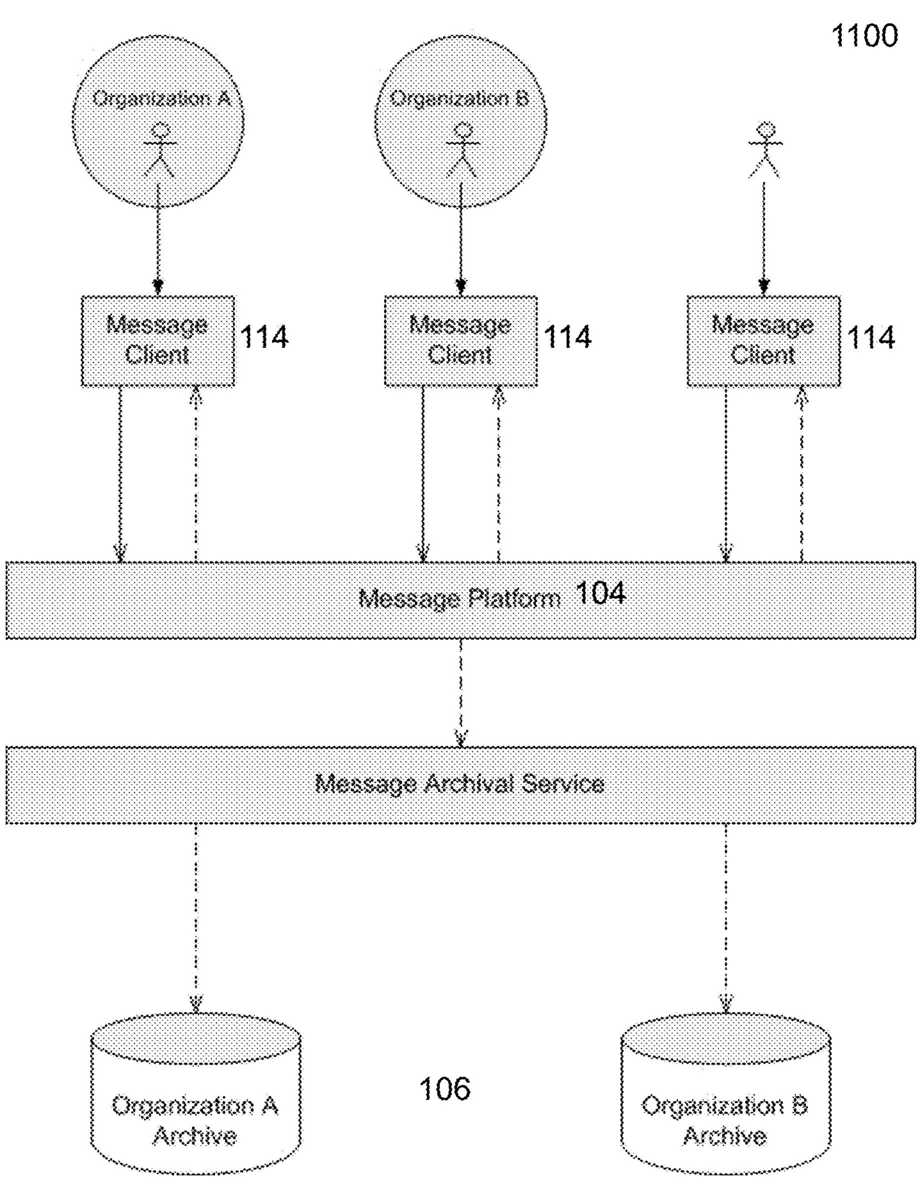
FIG. 11 is a schematic diagram illustrating interactions of users in a professional interaction space by the message platform for an embodiment of FIG. 1.

FIG. 11 diagrammatically illustrates relationships among three exemplary Users to platform 104 and an archiving service. The users are communicating via a Professional Interaction Space. A first User is a Private IS Participant; the second and third are Professional IS Participants with Organizations A and B, respectively. For archiving purposes, the designations of the second and third User as being Professional IS Participants for his Organizations means that platform 104 will archive IS messages by pushing them to an archival service, which causes these messages to be retained in designated archives for Organizations A and B.

For access privileges, a BIS Owner may grant a User access privileges to a particular Business Interaction Space related to the User's function within the Organization. For an embodiment, the access right enables a User to: discover the BIS in the Message Directory; and join the BIS in order to view and post content.

As well, the Organization may grant a User privileges to be a BIS Owner. For an embodiment, a BIS Owner Entitlement enables the User to:

- Create a new BIS spanning one or more Organizations, where upon creation of the new BIS, the user is designated as the BIS Owner of the BIS for his Organization and can communicate with other BIS Participants in that context; and/or
- Claim a vacant BIS Owner role for a BIS and communicate with other BIS Participants in that context. Since Organizations in a BIS are connected in a peer-to-peer control relationship, it is likely that a BIS would be created by another Organization, in which case the BIS Owner role is vacant for all Organizations but for the initiating User. The entitled User may discover BISes with vacant BIS Owners in the Message Directory and claim the role.

Figure 12:
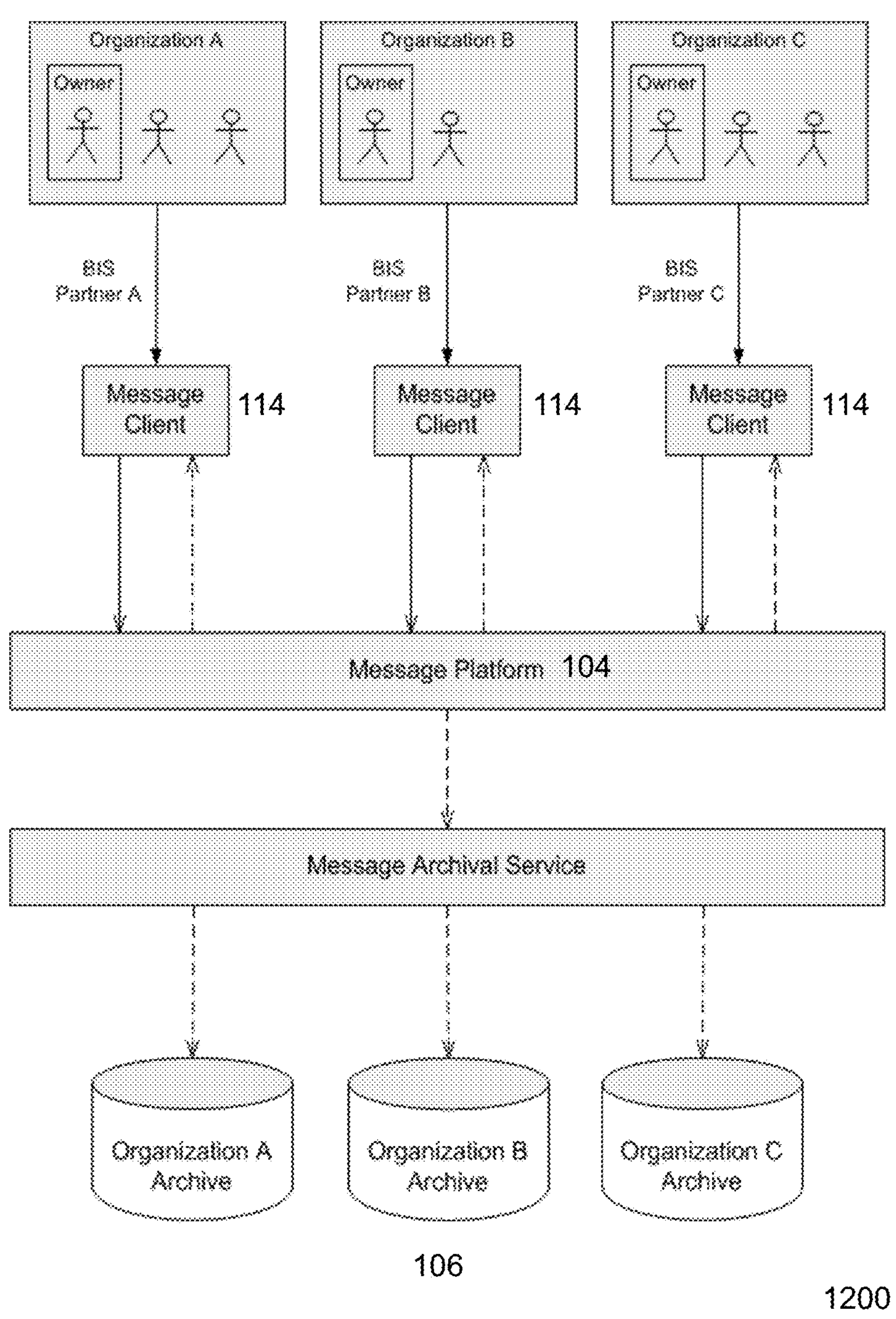
FIG. 12 is a schematic diagram illustrating interactions of users in a business interaction space by the message platform for an embodiment of FIG. 1.

FIG. 12 diagrammatically illustrates relationships among three BIS Partners interacting in a BIS, highlighting that Organizations are direct participants of BISes. Users having a Privileged status associated with the Organizations may claim vacant Ownership roles and may then grant access privileges to other Organization Members to participate. Platform 104 pushes BIS messages to the archiving system to have those messages persisted for each Organization.

It is noted that when a User is newly joined to an Organization, the User gains new privileges as provided for the Organization, but still retains messaging privileges previously ascribed to him as an individual in a Private IS.

Now, further details are provided on actions executed by an embodiment in managing a withdrawal of a user from an Organization. When a User leaves, his Member Account for that Organization needs to be deactivated. Deactivation naturally dissolves the User's Account Federation. This dissolution changes the User's privileges and visibilities to other users in that:

- The larger community of Users in the system have visibility/notifications that the User is now not affiliated with that Organization; and
- The User cannot be authenticated against his Member Account associated with that Organization. Without that authentication, the User cannot launch a Professional Message Session for that Organization. The User loses any associations with: BISes on behalf of the Organization; and Professional Interaction Spaces on behalf of the Organization.

As a corollary, rights and privileges of an Organization may also be affected by the User's deactivation from it. For example, if the User was the last remaining user of the Organization in a Professional Interaction Space acting for the Organization, compliance, archiving, and other related actions and governances for that Professional Interaction Space for that Organization are automatically terminated. This includes rules regarding archiving of messages. As well, if the User had any BIS Owner positions for BISes for the Organization, these positions are vacated for the Organization.

Figure 13:
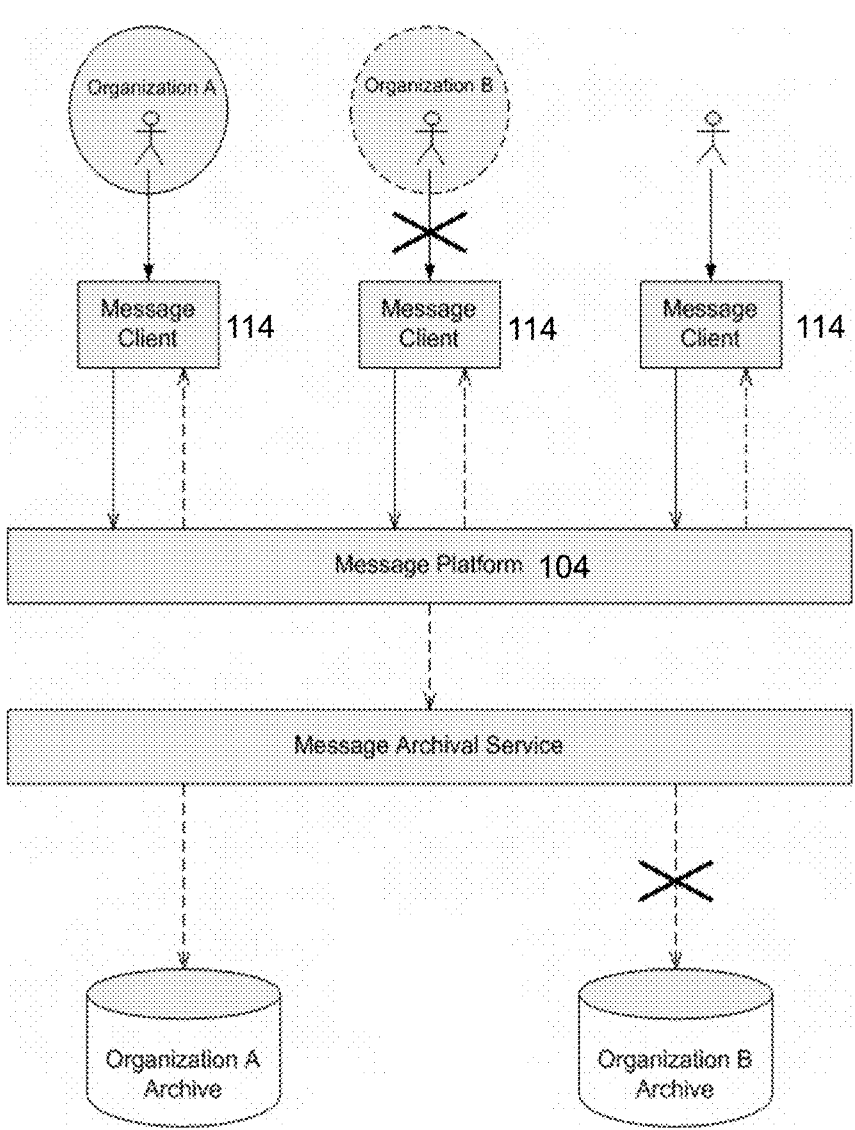
FIG. 13 is a schematic diagram illustrating automatic archival termination by message platform for an embodiment of FIG. 1.

FIG. 13 illustrates effects on the Professional Interaction Space shown in FIG. 11 when a User as the sole IS Participant from Organization B leaves. The User loses access to the Professional Interaction Space. As well, since there is no remaining active IS Participant for Organization B, subsequent messages would not be archived to the Organization B archive.

When a BIS Owner leaves an Organization, the related BIS Owner role is vacated. An Organization's BIS Owner vacancies are visible in the Message Directory to Organization Members, having the BIS Owner Entitlement. As such, a member with such privileges may then claim ownership, thereby providing continuity for Business Interaction Space accountability to an entitled Organization Member. Such a transfer of proxy ownership reflects the direct relationship between BISes and participating Organizations. Notably, while individual Users join and leave an Organization, the direct relationship between an Organization and a BIS remains intact.

Figure 14:
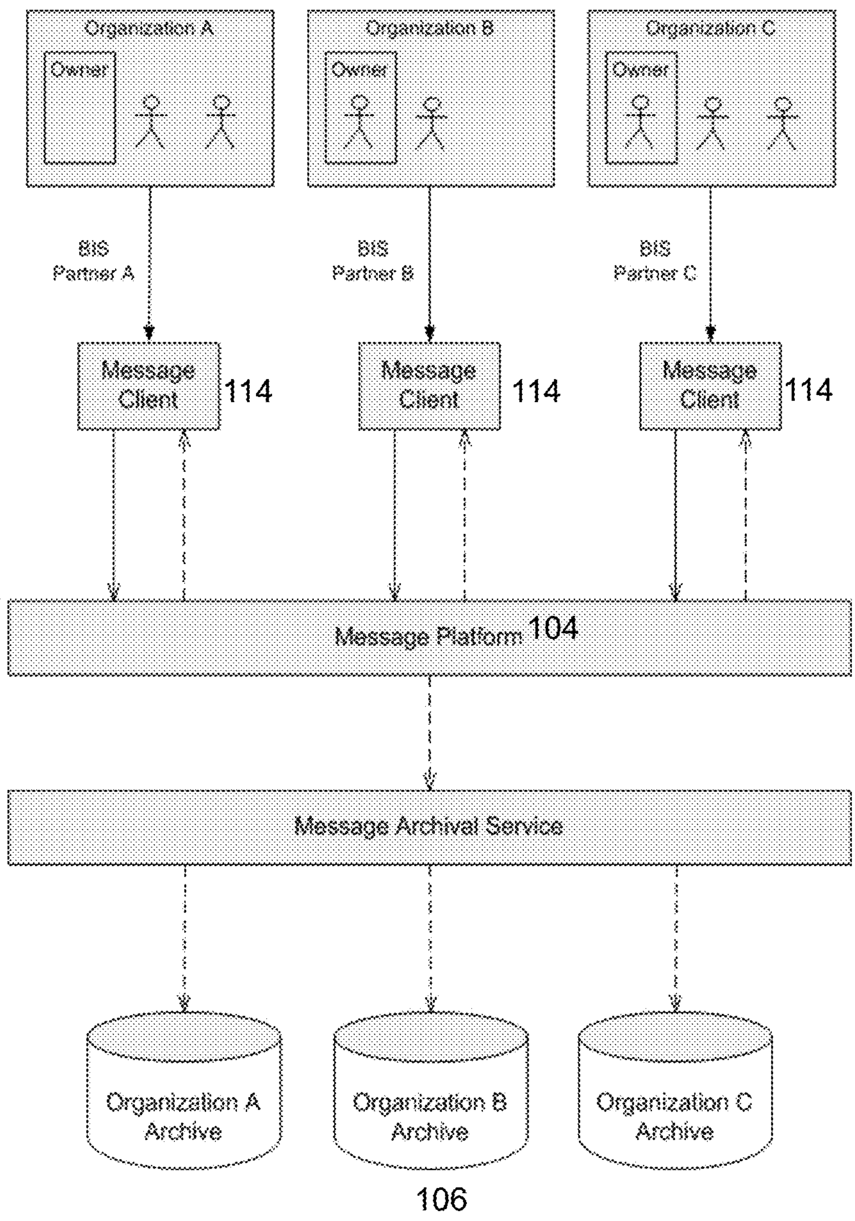
FIG. 14 is a schematic diagram illustrating interactions when an owner leaves an organization as processed by the message platform for an embodiment of FIG. 1.

As illustrated in FIG. 14, relationships among the entities shown in FIG. 12 are changed, where the BIS Owner for Organization A is now vacated (shown by the empty Owner box). At some point, another Member in Organization A having the appropriate entitlements may fill the vacant position.

Leaving an Organization terminates a User's access and privileges to communicate through platform 104 on behalf of the Organization. However, the User's communication access and privileges as a Private Individual typically are not changed. For example, in one embodiment:

- The User's Message Account remains including the User's personal profile;
- The User's participation in any Private Interaction Space(s) remains intact;
- The User's private participation in any Professional Interaction Space(s) remains intact;
- The user may still launch and use Social Message; and/or
- The User's personal contact list that has accumulated while affiliated with the former Organization remains intact. This retention mirrors real-life business norms whereby a person retains and build networks of contacts as he progresses through associations with multiple organizations.

After a User leaves an Organization, his Message Account is no longer federated (linked) with his Member Account. Depending on restrictions imposed by the Organization and the Message Account, when a User subsequently joins a new Organization, he would be entitled initiate communications in the context of this new relationship.

Figure 15:
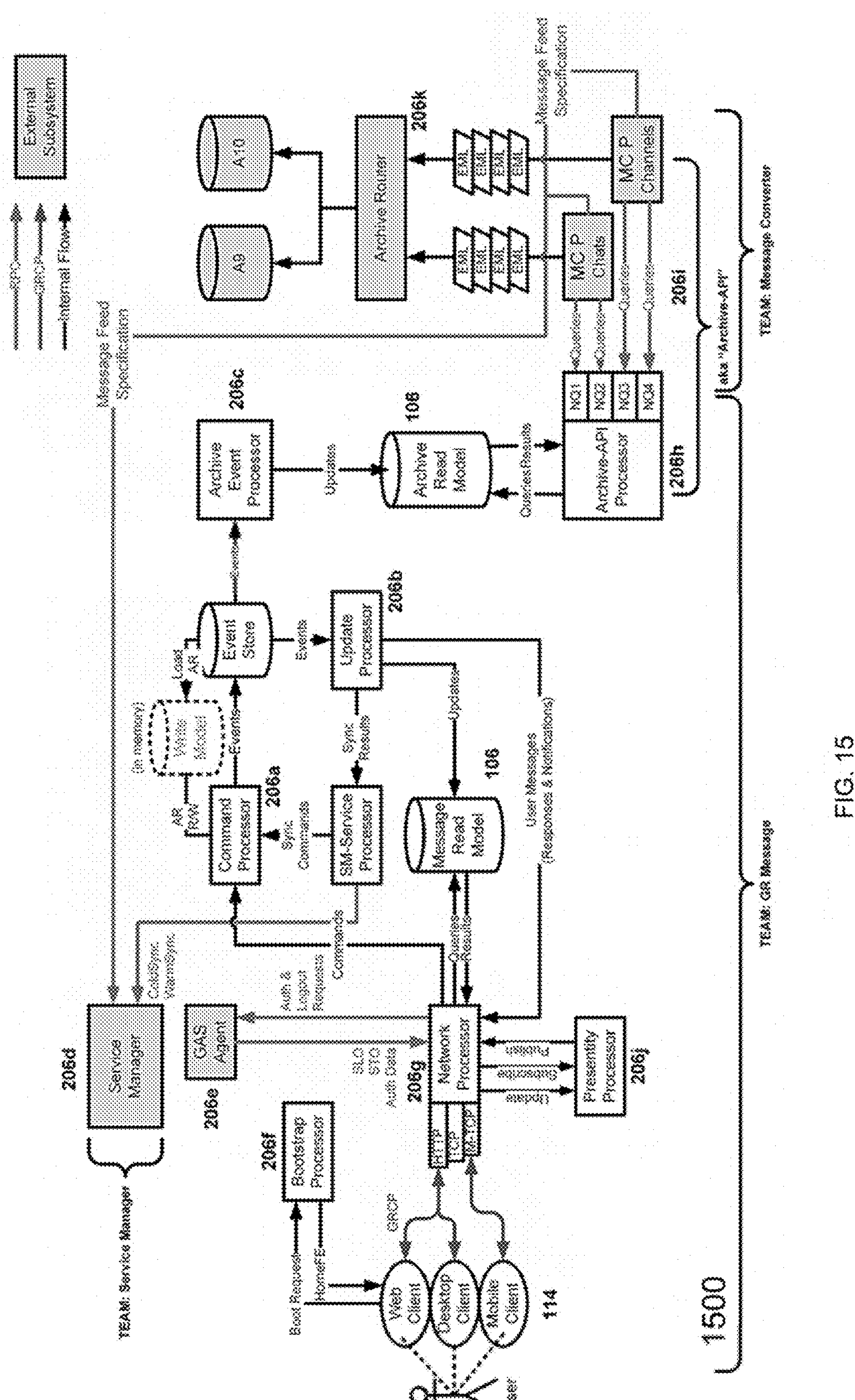
FIG. 15 is a schematic diagram illustrating components of the message platform for an embodiment of FIG. 1.
Figure 16:
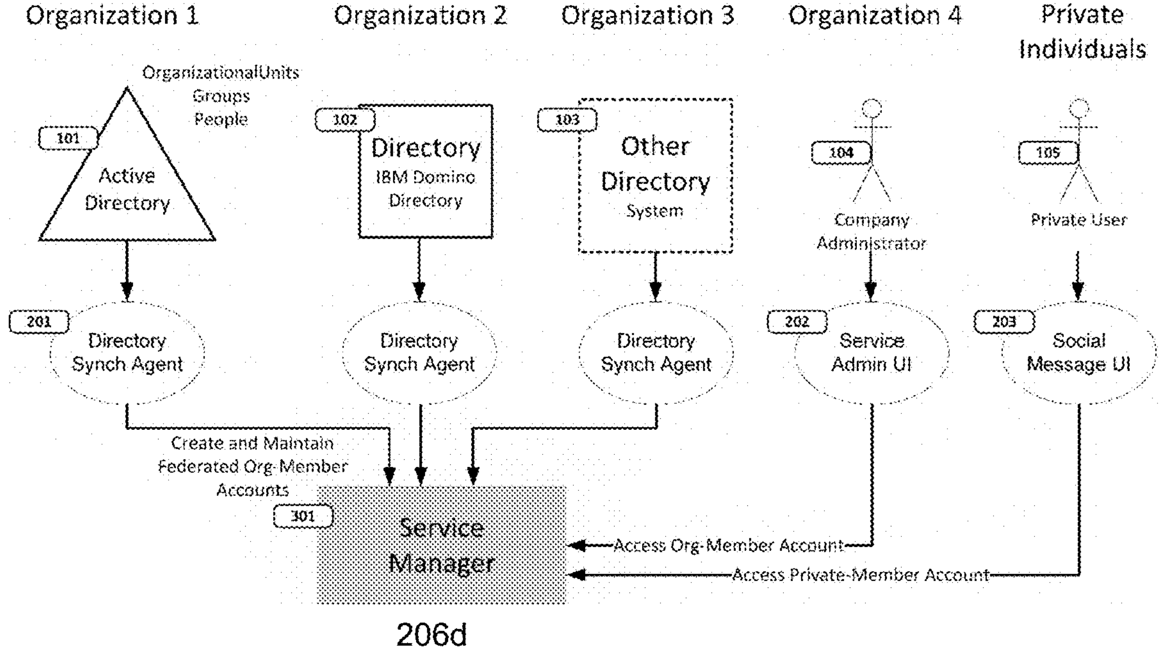
FIG. 16 is a schematic diagram illustrating integration of organizations with a service manager component in the message platform of FIG. 15 according to an embodiment.

Referring to FIGS. 2, 15, and 16, further details are now provided on exemplary computing components and databases executing these functions for an embodiment having regard to aspects of functionalities and relationships among Users, Spaces and Organizations and aspects of exemplary processes executed by a User joining and leaving an Organization described above.

Referring to FIGS. 2 and 15, message platform 104 provides processes that facilitate scaling of scope for processing messages from multiple Users and multiple Organizations and processing commands and queries generated by all of the Message Clients. Further detail is provided for notable components.

Service manager **206*d* is a component supporting directory synchronization features to external account directories for Organizations. The external directories include Microsoft Active Directory, IBM Domino Directory, lightweight directory servers with an LDAP API, and direct administration through a hosted web portal. All Organizations, Organization Members and Users are provisioned in Service Manager 206*d***.

SM Service Processor **206*b* implements cold and warm message synchronization facilities to replicate Organization Members and Users to message platform 104**, which are persisted to the Message Read Model.

In operation, users at devices 108 access message platform 104 via a client application 114 installed on the relevant device, such as a web client, a desktop client, or a mobile client. There are several supported operating systems for these clients including Windows, Linux, MAC OS, iOS, and Android.

Once client 114 is activated and a command is generated to initiate a message request, an authentication process is initiated on platform 104 by the Global Authentication System (GAS) **206*e***, which supports several authentication protocols including Password, 2-Factor, and SAML.

After the User is authenticated, client 114 is directed by bootstrap processor **206*f* and GAS 206*e* to connect to an available network processor 206*g*, using a client-specific protocol and port. Client 114 may use an agreed upon communication protocol (e.g. TCPIP) to maintain connections to the associated network processors 206*g***.

In an embodiment, network processor **206*g* process queries and message commands sent from client 114. Network processor 206*g* interacts with GAS 206*e* to process User authorizations, user logout requests and requests from GAS 206*e*** for a single logout (SLO), a session timeout (STO) and an Activity Check.

Presentity Processor **206*j* (short for "Presence Entity" Processor) has processes interacting with processes on network processor 206g** to manage account presence services, such as subscription requests for an account to be deemed a watcher, requests to publish presence notifications to watchers, and requests to compute aggregate presence status of multiple clients of the same user.

Processor **206*a* has processes to execute commands and record results of a command as one or more events in event store service (that accesses database 106**).

Functions of message platform 104 relating to a Space (such as creating an IS, inviting users to an IS, sending messages to an IS, etc.) are provided as message primitives and executed by the command processor according to any applicable business logic and policy constraints of the Space.

Archive event processor **206*c* reads events from the event store and encodes them into a stream of events in an archive read model (as part of database 106). Processor 206*c*** encode events in the stream in adherence to processing and archiving rules.

Archive API processor **206*h*** is a query engine that translates query remote procedure calls received on an external interface to internal queries on the archive read model and formats results for output.

Message converter processes (MC P) **206*i* obtain message feed specifications from service manager 206*d*. Archive-API 206*h* and MC P 206*i* may be considered as each being separate logical streams of data for the different types of Interaction Spaces supported by platform 104**:

a) "Chats" comprising Private and Professional Interaction Space data; and b) "Channels" comprising Business Interaction Space data.

Message Converter converts results of remote procedure calls to Archive-API 206*h* into Chat or Channel "Transcript EMLs" as appropriate. Email files (e.g., EMLs) are delivered to archive router 206*k* for placement in the database archives of the organization following the related message feed specification.

As well, platform 104 provides an architecture that supports mediation of privacy and control over Social Interactions via business logic found in the following components.

In command processor 206*a*, processes control privileges and actions available to a User. Processor 206*a* evaluates how the client of the User launched the message platform (e.g. either via a Social Message Session or a Professional Message Session). For a Professional Message Session, Organization Member entitlements are evaluated. Processor 206*a* reviews associated privileges and rights to impose related Interaction Space Type distinctions as described earlier. For example, by design, a User operating in a Social Message Session is not allowed to communicate as a Professional in a Professional Interaction Space. By design, in a Professional Interaction Space, only a BIS Owner entitled User is permitted to create Business Interaction Spaces.

In update processor 206*b*, processes control updates to Message Users as a function of how Users are interrelated per Interaction Space participation and contact relationships illustrated in FIG. 3 and FIG. 4. Processor 206*b* evaluates semantics of relationship types among Users to determine which Users are entitled to be informed of what events. For example, a User's IS Posting to an IS, is dispatched to the Interaction Space's participants; when a user joins an Organization, the other Users who have that User in their contact list (i.e. they are "watchers"), are informed. When a BIS Owner gives a User Access to a BIS, that User is informed. Updates are dispatched as messages to online (logged-on) Users in real-time. They are also persisted in Message Read Models. This enables updates to be made available to impacted offline Users as when the offline user next logs onto platform 104; the User's Message Client obtains the latest updates via Message Read Model queries.

In archive event processor 206*c*, processes control Interaction Space archival. Again, distinctions between the various Interaction Space Types are applied. For example, the first time that a User from Organization A joins a Professional IS as a professional, subsequent events for that IS are dispatched to the archive read model for archival by Organization A. Similarly, when the last User from Organization A, participating in a Professional IS as a professional, leaves the IS, archival of subsequent events for that IS by Organization A is terminated.

Network processor 206*g* has processes to control User authentication via GAS 206*e*. A User entering platform 104 via a Social Entry Point is authenticated against his Message Account. A User entering platform 104 via a Message Entry Point is authenticated against his Member Account. The first time that a new Organization Member initiates a Professional Message Entry Point call, his Member Account is not yet federated with his Message Account. Processor 206*g* requires that the User be authenticated (via GAS 206*e*) a second time, against his personal Message Account. This successful double authentication results in a persisted "same-person" link between the two Accounts, thereby establishing that the two Accounts are now federated. The next time the User launches a Professional Message Session, the User only need be authenticated against his Member Account. This authentication may be via SAML, which gives an Organization control over how its members are authenticated. The persisted federation status ensures that a second authentication against the User's Message Account is only needed for the User's first Professional Message Session launched for a particular Organization. This preserves a feature of Organization Member authentication by SAML, namely, a single sign-on (SSO) experience. Once a User's Accounts have been federated, whenever an Organization Member enters Professional Message with an existing security context, the SAML-based authentication is transparent to the User.

Referring to FIGS. 16 and 8, further detail is now provided on an aspect of service manager 206*d*. Service manager 206*d* provides processes relating to long-term management of Member Accounts in platform 104.

An Organization typically maintains a directory of its employees and consultants, contractors or professionals having a role with the organization. A directory account is created when a person joins the Organization. The account is deactivated or deleted when the person leaves. Existing directories include Microsoft Active Directory (trademark), IBM Domino Directory (trademark), and other directory systems based on LDAP or SQL databases.

In service manager 206*d*, component 301 provides directory synch agent 201 that can be deployed to an Organization's site, shown as Organization 1, 2 and 3. Synch agent 201 provides processes to synchronize identified portions of the Organization's directory information to service manager 206*d*. All accounts created by Directory Synch automatically become Member Accounts linked to their respective Organization(s) as illustrated in FIG. 3. By definition new Member Accounts are not yet federated.

Directory Synch may also detect deleted or deactivated Directory Accounts. Deletion of an account triggers deactivation of any corresponding Member Account. If the Account was federated, the federation is dissolved. A User loses his privileges to access Professional Message on behalf of his former Organization.

Execution of a Directory Synch Agent is optional, and an organization may elect to create and manage its Member Accounts manually as shown by Company Administrator 104 interacting with Service Admin GUI component 202 to provide comparable information for Organization 4.

Service Admin GUI component 202 may be made available to all organizations for use by administrators to provide access their Member accounts of their users.

A private individual may establish and manage his Message Accounts by interacting with service manager 206*d* via Social Message GUI 203.

Figure 17:
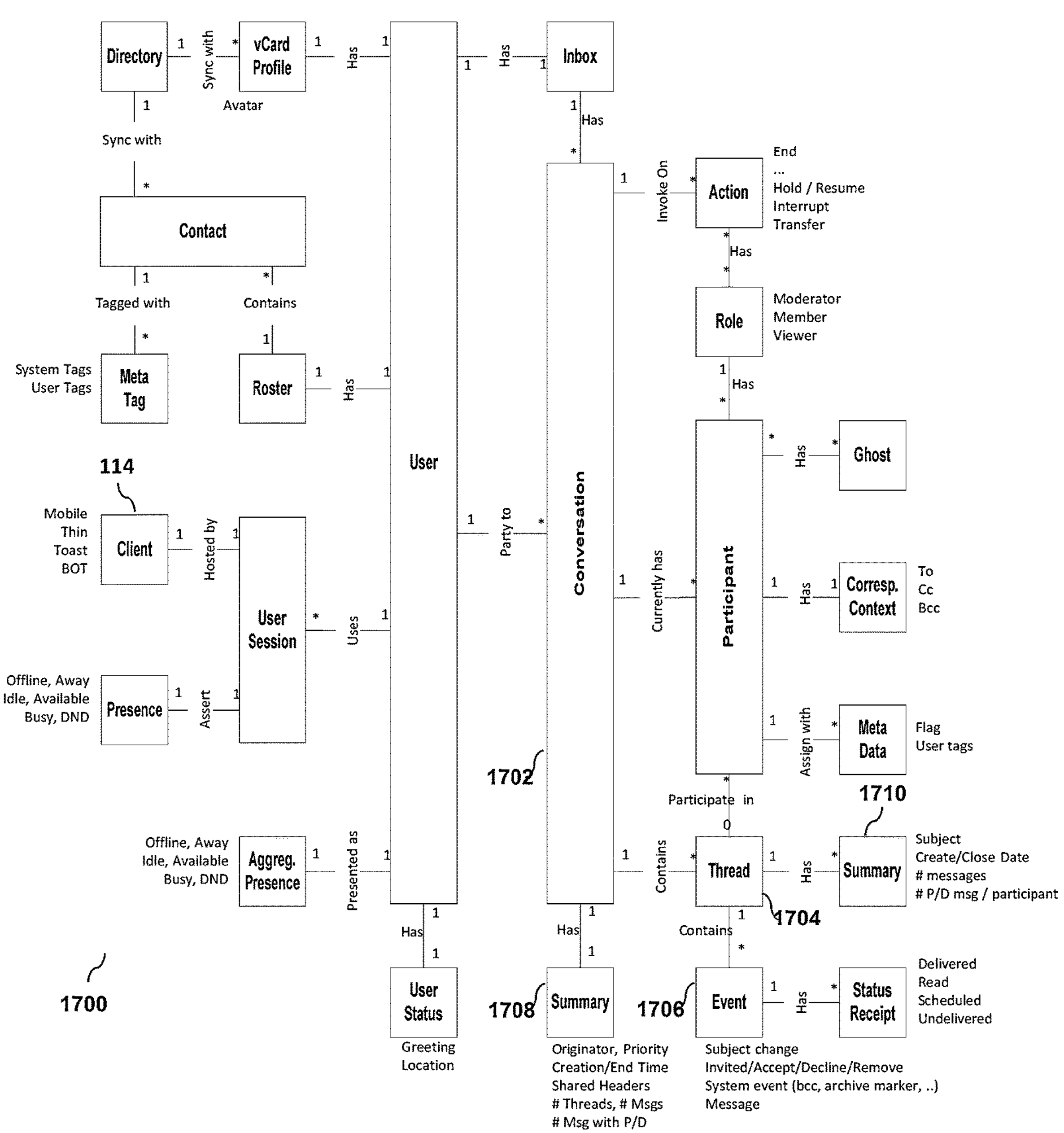
FIG. 17 is a user data model diagram showing exemplary relationships among users, a conversation, threads, and messages according to an embodiment of FIG. 1.

Having described various functional and structural elements of a conversation user data model for messages used in an embodiment are now described. Exemplary components for a conversation are described in U.S. Pat. No. 8,738,715 and US patent publication no. 2014/0310365, the contents of both of which are incorporated herein by reference. However, for an exemplary model, FIG. 17 shows data model 1700 that include a user participates in a conversation 1702, which contains threads 1704, each thread containing a series of messages which may be encapsulated as events 1706. Each conversation 1702 has summary data 1708 that may contain the conversation originator, conversation priority, conversation creation and end date and information, such as the number of threads 1704 and number of messages in the conversation. In one embodiment, a conversation 1702 consists of a series of one or more linked message threads 1704. A thread 1704 is a series of one or more messages sent amongst existing (and added) users, which may share the same subject for the messages. A thread may be demarcated by user, by subject changes or other criteria.

Each thread 1704 represents one segment of conversation 1702. A thread has a number of users and summary 1710 containing data elements, such as subject, thread creation and close date and number of messages in the thread. Threads and parts thereof may be archived to database 106.

Each thread 1704 may contain events 1706 relating to the message, such as a subject change, an invitation of additional participants, notification of participants accepting or declining invitation, removal of participants from a conversation, or participants leaving a conversation and messages. For each message, receipts may be generated at various points during creation, transmission, delivery and reading of a message by users. The receipts show a progression of processing of the message from the originating participant/user to platform 104 to the recipient participants/users.

In one embodiment, a conversation for a message 1702 starts with one user with an open message thread 1704 with at least one message. While a thread is open, any number of serialized messages may be added to the thread. If the current thread is closed, and if the conversation has not yet ended, a new message thread 1704 starts on the next message sent into that conversation 1702. If the list of users for that conversation becomes empty (e.g. all users either left the conversation or were removed from it), the thread closes.

As noted earlier, an aspect of platform 104 provides retention of business-related electronic messages per regulatory requirements.

Referring generally to FIGS. 1-3 and 27-36, and having regard to previously discussed functional and structural elements of platform 104 and user accounts, details are provided of another aspect of an embodiment that provides facilities to integrate communications with third-party communication systems by platform 104, so that messages from such third-party systems may also be delivered to and from users on platform 104 and also be retained in compliance with applicable regulatory requirements. In particular, an embodiment provides facilities integrate communications with third-party communication systems that have utilized end-to-end encryption of their messages, such as on the WhatsApp platform. Here, the disclosure utilizes the label convention of "internal" users and their devices 108 to refer to users belonging to an organization that manages accounts for platform 104 and the label convention of "external" users with their (external) devices 108 that do not belong to that organization. For this feature, external users may connect to platform 104 through an external organizations/platform/communication system, which for the sake of labelling for this example may be noted as organization 112*b*, using FIG. 1 with modified reference numbers as stated as noted for this feature.

For an embodiment, an exemplary third-party communication system/platform (with external users) that is interfaced with platform 104 so that such third-party communications can be communicated to users of platform 104 is the WhatsApp (trademark) communication system with its peer-to-peer encrypted communication. As such, for the purpose of this disclosure, it will be understood that any reference to a WhatsApp communication, WhatsApp Account, WhatsApp platform, WhatsApp APIs, or any other WhatsApp entity, process, or data element is exemplary for features and details relating to integration of a third-party communication system for an embodiment, unless otherwise noted. It will be appreciated other embodiments may be deployed for other third-party communication systems that provide net end-to-end encryption of their messages (e.g., Signal messaging, encoded SMS messaging, Telegram messaging, PIN messaging, Discord, etc.).

Continuing with exemplary features of an embodiment that integrates communication of WhatsApp messages by platform 104, it is noted that when an internal user of platform 104 creates and posts WhatsApp messages, certain regulatory policy rules and regulations relating to retention of such messages may be applicable to the user and/or the user's organization.

For example, a regulatory policy may obligate an organization to manage, store, and/or archive all messages processed by the organization's platform 104. Ordinarily, WhatsApp messages exchanged between two WhatsApp users are end-to-end encrypted. As such, the only two WhatsApp users have technical and administrative clearances and keys to decrypt received WhatsApp messages (i.e. the WhatsApp users have the private keys needed to decrypt the message contents received from by the other WhatsApp users). WhatsApp servers which are used to facilitate the transport of messages between WhatsApp users cannot decrypt the message contents.

However, a message interfacing feature of an embodiment, provided through process 206I, enables an embodiment to access un-encrypted WhatsApp messages sent between an internal user on platform 104 that has established a vetted local WhatsApp Business Account (WABA). Process 206I includes an Onboarding Process which has facilities to onboard new internal WABAs for platform 104 and WhatsApp Business Account Management (WABAM) process for managing such WABAs and related messages by platform 104.

Process 206I processes onboarding of WABAs to platform 104, where external WhatsApp messages exchanged through process 206I are not fully end-to-end encrypted. An embodiment of platform 104 accesses this exposure to receive and process WhatsApp messages received and processed by platform 104 for its approved users. When such WhatsApp messages are received, as they are not encrypted, platform 104 can process additional functions on such WhatsApp messages, including archiving. As such, when platform 104 archives such WhatsApp messages, such messages may be compliant with the organization's message archiving policy.

As well, an organization's policy of an internal user of platform 104 may require a certain notices or actions be provided/added to WhatsApp messages, such as text relating to disclaimers and disclosures and actions relating to opt-out provisions, formats for messages, temporal restrictions (e.g. time limits for responses), notices regarding recordal, and other restrictions or notices. Additionally, there may be regulatory or platform provider obligations applicable to the organization to properly accept and process an individual's requests pertaining to the organization, e.g. a request to opt-out, or opt-in, etc.

Other features previously described herein, e.g. federating of accounts, channels, interaction spaces, etc. may be applied to third-party communication system accounts processed by platform 104 when implementing related aspects as previously described.

Some features of an embodiment include:

1) Platform 104 provides a trusted and secure location for managing and processing messages in interaction spaces between a user in an organization and an external user in a federated system, in this example an individual WhatsApp User;

2) Internal users on platform 104 access WhatsApp in its native interface, providing unified access to their interaction spaces;

3) Integration with the third-party federated platform uses an official, vendor-supported API, in this example the WhatsApp Business API, avoiding account interfacing issues such as screen-scraping, reverse-engineering of client-side interfaces, etc.;

4) Platform 104 may perform organizational policy enforcement and compliance archiving of messages. Independently and concurrently the WhatsApp system is able to authenticate WhatsApp business accounts and enforce its WABA policies, as well as use the Signal Protocol to provide compatibility and security with its large base of existing WhatsApp users;

5) Messages exchanged in the Interaction Space are encrypted while in transit between components; and 6) Participants of the Interaction Space are authenticated by their respective vendors and participant identities are mapped across the federation boundaries.

Before additional features of an embodiment are described, some additional processes are identified and defined below that are implemented as part of process 206I and which provide various operational, functional, and structural features managing, implementing, and processing of logical records, spaces, entities, accounts, and processes for WhatsApp messages and WABA processed by an embodiment:

"WhatsApp Gateway" is a process that manages chat message flows between platform 104 and an external WhatsApp Business API via WhatsApp system.

"Broadcast API" is a process that exposes an API suitable for external application providers to send/receive chat messages. This API is suited for sending/receiving both a large volume of messages and a large number of external WhatsApp or SMS users. Typically, such bulk messages are not suitable for human users to manage so organizations may provide applications for same.

"(Compliant) Archiving" is a process that receives a copy of chat messages processed by platform 104, which sorts, aggregates, and formats the messages received into an archival format suitable for sending to an organization's archive.

"WhatsApp Business Account Manager (WABAM)" is a process that manages WhatsApp business account and administrative aspects of an organization's relationship with WhatsApp system. This includes provisioning and deprovisioning of WhatsApp business accounts, user groups, users, phone numbers, message templates, disclaimer messages, messaging policies, and related activities. This process also communicates with the Onboarding Process.

"Onboarding Process" is a process that manages WhatsApp business account onboarding activities that interface with the WhatsApp system. This includes provisioning and deprovisioning of WhatsApp business accounts. As the WhatsApp system portal is a web-based facility primarily designed to be accessed by human users, this process automates activities that would ordinarily be executed manually.

Aspects of an embodiment as described herein facilitate integration of WhatsApp messaging and compliance to such policies when WhatsApp messages are processed by platform 104.

Figure 27:
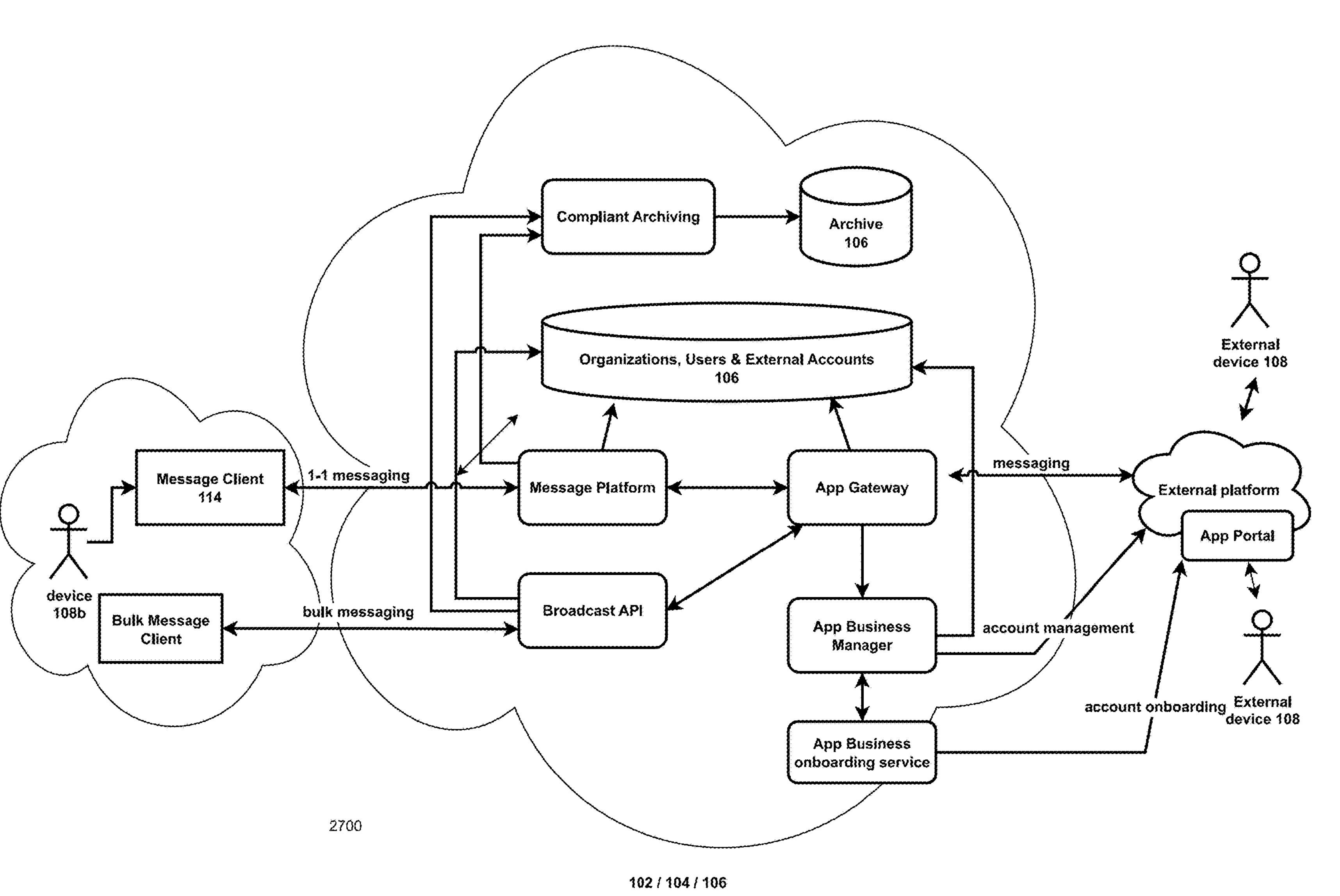
FIG. 27 is a schematic diagram of a message platform for an embodiment of FIG. 1 further interfacing with a third-party communication system.

FIG. 27 show in schematic block diagram 2700 aspects of platform 104, process 206I and database 106 providing user 108 having a Message Account on platform 104. Platform 104 provides 1:1 WhatsApp messaging with an external WhatsApp user to the organization. Additional facilities may be provided to facilitate WhatsApp messages to be sent in bulk to multiple external WhatsApp users.

Figure 28:
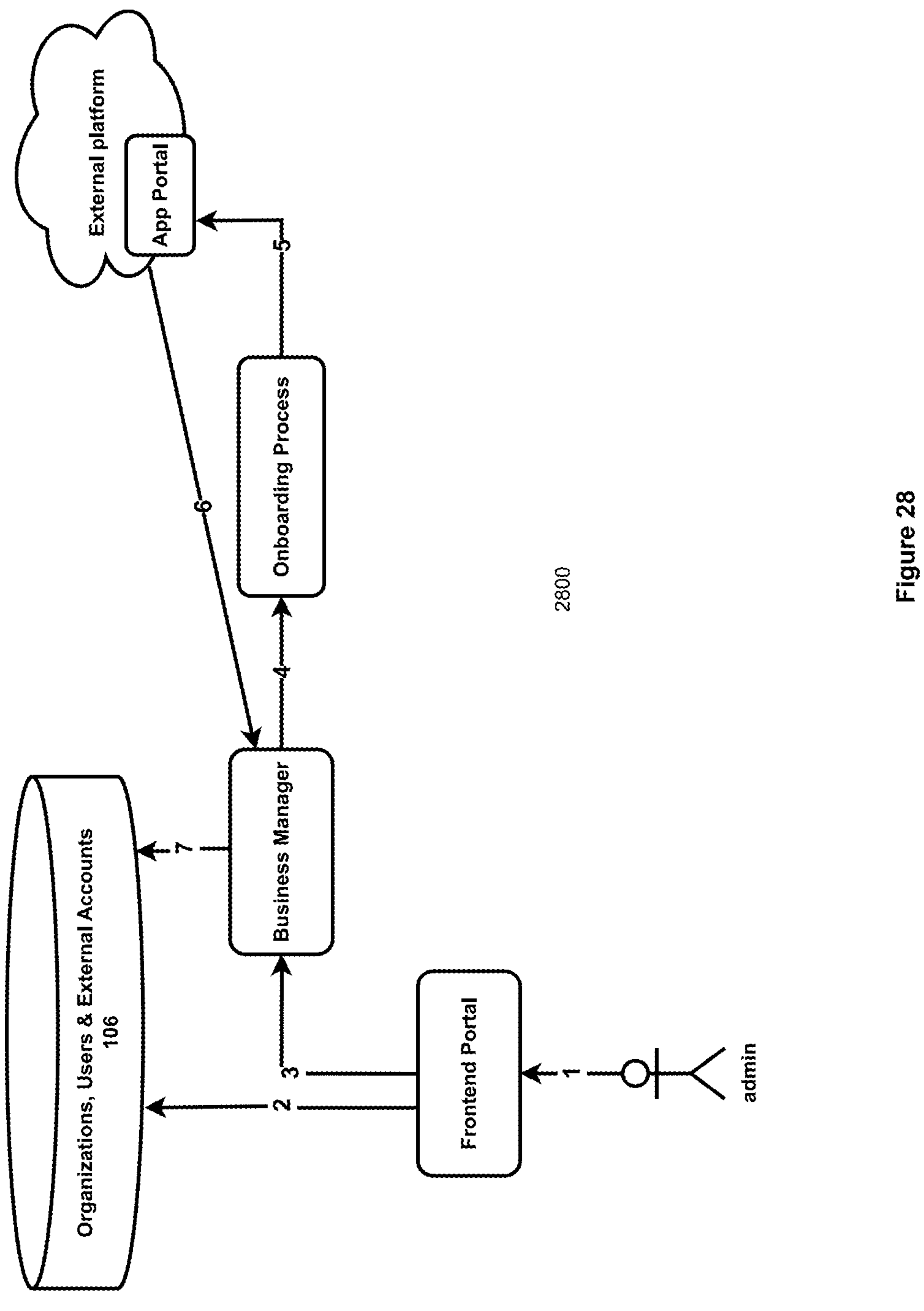
FIG. 28 is a schematic diagram of an onboarding process for a third-party communication system of a message platform for an embodiment of FIG. 27.

FIG. 28 illustrates in block diagram 2800 exemplary stages and actions for process 206I's Onboarding Process for onboarding a user in an organization to "onboard" (i.e. create and authorize) a user to have a WABA managed through the organization which is then integrated to interface with the external WhatsApp platform and related external WhatsApp messaging. As part of this integration, the WABA and its messages are compliant with the organization's policies when utilizing WhatsApp messaging.

Per Action 1, Onboarding Process executes initial onboarding administrative actions conducted for the organization and the user's account so that the user's account is validated by the WhatsApp system to receive and send WhatsApp messages. An administrator for the organization for platform 104 through an administrator's graphical user interface (GUI) is provided with a selection of organizations that may be onboarded. The administrator would provide the WhatsApp Business ID for the organization to be onboarded. The administrator selects a target user in the organization for which to add a compliant business WhatsApp number which is used as an identification number for the WhatsApp account. The WhatsApp number may be a real telephone/MSISDN number associated with a physical device 108 (e.g. to its SIM card) or may be a virtual telephone/MSISDN number, which may not be associated with a specific physical device. Optionally, the administrator may also create or specify user groups (e.g. "trading" group, "finance" group, "sales" group, etc.) to organize its business users connected to WhatsApp business account access. It will be appreciated that implementation and management of such groups, especially when such membership in such groups is large in number (e.g. over, say, 10, 20, 30, or more members) in a classic WhatsApp system is not currently being provided.

For validation and verification purposes, each user's validated account is that is authorized for WhatsApp business account access is also associated with a virtual or real telephone/MSISDN/mobile number capable of receiving validation/verification messages, such as SMS text messages. Correspondingly, in the GUI, administrator executes two account administrative actions:

1) select a pre-provisioned virtual number to be that user's WhatsApp business number, and/or 2) provide an existing real mobile phone number to be that user's WhatsApp business number.

Per Action 2, Onboarding Process creates or associates a WhatsApp business account (WABA) linked to the user with the specified phone number in the organization in a "pending-verification" state.

Per Action 3, through Onboarding Process, the administrator may initiate a request for a WhatsApp number to be registered to the WhatsApp system with any information/characteristics needed, such as a WhatsApp Business ID, phone number contact, any group identification information for the organization, etc. Onboarding Process and its WABAM process calculates how many WABAs need to be created for the WhatsApp Business identifications and assigns WABAs to groups.

Per Action 4, process 206I's WABAM sends a request to the Onboarding Process to create any necessary WABAs and accounts within the WABAs.

Per Action 5, the Onboarding Process communicates with the WhatsApp system to authenticate platform 104 as a valid administrator account to the WhatsApp System and then creates WABAs and Accounts on behalf of the organization using their WhatsApp business ID so platform 104 can manage the accounts. The WhatsApp System provides a central API (the WhatsApp API) and application portal (WhatsApp Business App) to manage its interfacing of WhatsApp accounts with its external platforms (such as platform 104).

Per Action 6, the WhatsApp system approves creation of business accounts and/or WABAs and updates WABM via a callback mechanism, such as through a webhook.

Per Action 7, process 206I's WABAM verifies the accounts with the WhatsApp system to prove number ownership, and registers the account and updates the accounts in database 106 to an active state. Verified users may then use messaging under platform 104 to communicate with external WhatsApp users via the WhatsApp business API, while also being compliant with the organization's policies.

Once onboarded, the WhatsApp System will send WhatsApp messages that are destined to the onboarded accounts for the organization to platform 104 for eventual forwarding to the addressed onboarded accounts. As such, with this communication interaction protocol, the WhatsApp system is configured to send WhatsApp messages from external users that are addressed to (internal) WhatsApp users for the organization to platform 104 (and platform 104 is configured to receive these inbound WhatsApp messages for the internal WhatsApp users) as an intermediary to ultimately forward such messages to such internal WhatsApp users. Similarly, for an onboarded WhatsApp user in the organization that sends an outbound WhatsApp message to an external WhatsApp user, with this communication interaction protocol that outbound message is sent from the internal user's device to platform 104, which then processes the outbound WhatsApp message, and then, platform 104 sends the outbound message to the WhatsApp system, for eventual transmission to the external user. While interacting with and processing such inbound or outbound WhatsApp messages, platform 104 may also conduct archiving actions on such messages, per the organization's compliance requirements as previously described herein.

WABAs belong to an organization and may be associated with multiple phone numbers. The WABAM process does not expose features of management of WABAs to the WhatsApp platform. The user groups may be associated with one or more WABAs. As well, the size of groups are not necessarily restricted. As such, setup and usage of communication templates of the WABAs within the same group may be reused with minimal administrative effort.

Figure 29:
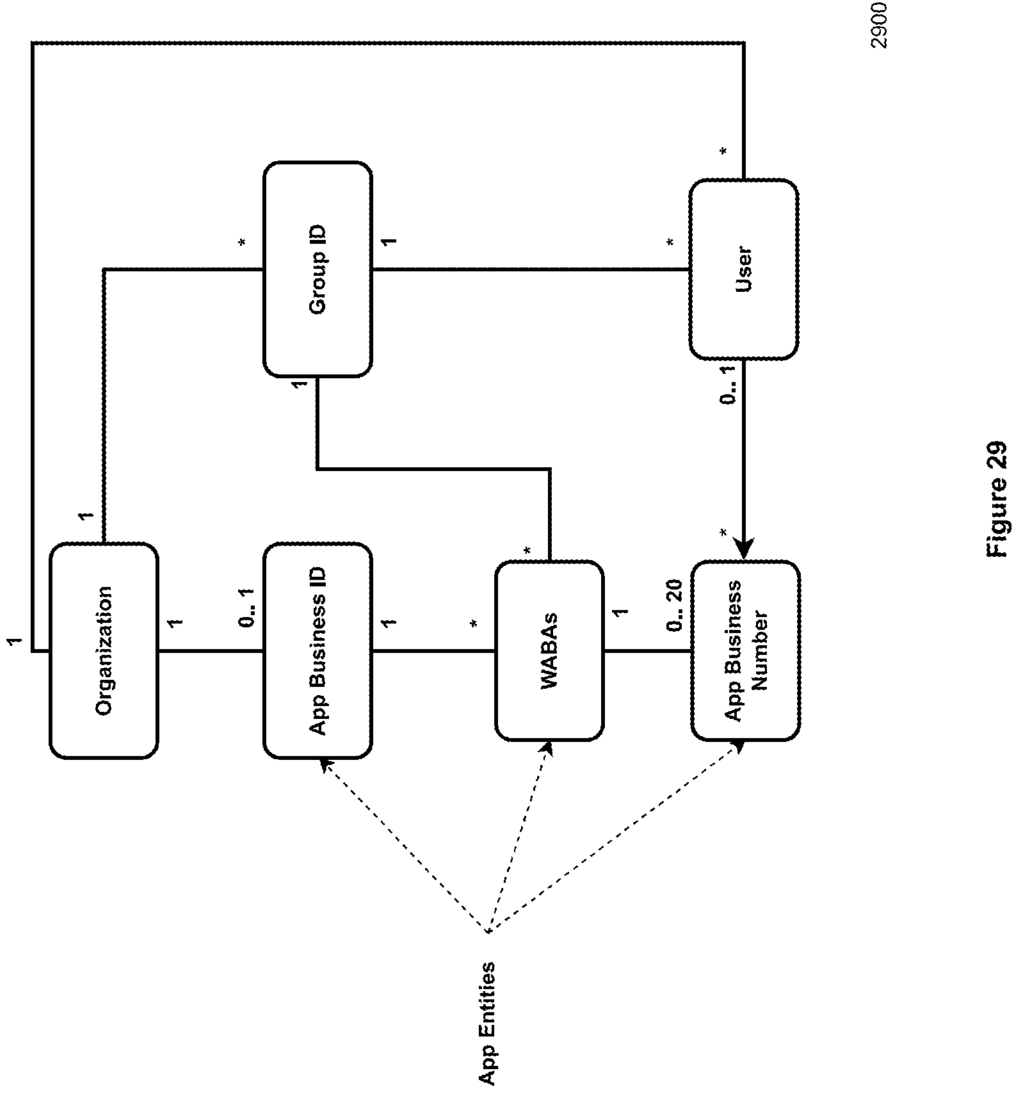
FIG. 29 is a schematic diagram of a data model showing exemplary data relationships among a user (account) and third-party communication accounts as implemented by the message platform for an embodiment of FIG. 27.

FIG. 29 shows as block diagram 2900 aspects of an entity relationship data model of platform 104 for WABAs, illustrating data entities, accounts, and their relationships in platform 104 which maintain relationships between WhatsApp business objects supplied by the WhatsApp system and platform 104's system objects. Generally, an entity using platform 104 is noted as an Organization. Each organization has many business Users. Each organization has many Group IDs and each Group ID may have a relationship to many business Users. At the Organization level, an organization may have minimum of zero (0) or maximum of one (1) WhatsApp Business IDs. The existence of a WhatsApp Business ID in association with an Organization object indicates that the user account has successfully onboarded to WhatsApp Business services. As shown in diagram 2900, each Group ID associated to an Organization has zero to many (0:*) WABAs, representing a collection of client business users that have successfully authorized their phone number using the platform 104's WhatsApp number verification process. The WhatsApp system typically set limits on the maximum number of phone numbers (currently twenty) that can be associated with a given WABA. An embodiment's Onboarding Process will create a sufficient number of WABAs to accommodate the number of client business users that have been authorized for WhatsApp business services. Each WABA is also associated to the WhatsApp Business ID and Organization entity to which it belongs.

Figure 30:
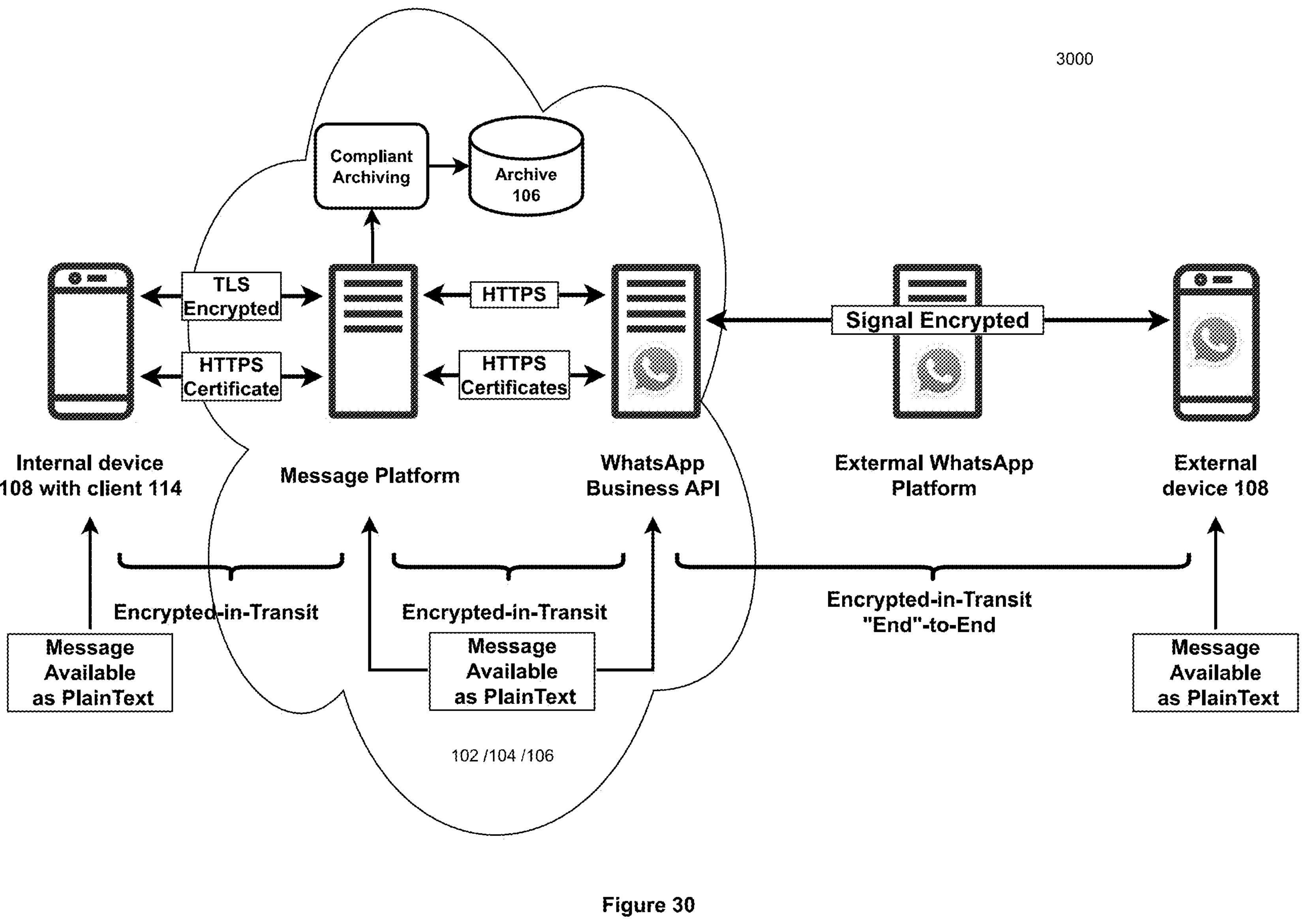
FIG. 30 is a schematic diagram illustrating actions performed in relation to encryption and decryption of message contents by platforms and components for an embodiment of FIG. 27.

FIG. 30 shows layout 3000 illustrating exemplary actions performed by an embodiment in relation to encryption and decryption of message contents by platform 104 as shown in FIG. 27. For this example, platform 104 interacts with a WhatsApp system as an exemplary third-party communication system. A WhatsApp message utilizes its secure messaging protocol known as "Signal Protocol" to provide end-to-end authentication and encryption of the WhatsApp message contents sent between WhatsApp users. Details of internal operations of the Signal Protocol are known in the prior art and are incorporated herein in this disclosure by reference.

In the context of FIG. 30, an embodiment for platform 104 with its process 206I and other processes 206 provide an interface to a WhatsApp communication system, so that internal users on platform 104 can establish WhatsApp-compliant accounts through their organizations on platform 104. As such, internal users on platform 104 can receive and transmit WhatsApp messages to internal and external users on platform 104, where such messages still have sender-to-receiver encryption, but also where such WhatsApp messages may also be further processed by platform 104 per its compliance facilities. For an embodiment the Signal Protocol secures a portion of the message path when messages are exchanged between an external WhatsApp user to platform 104 and an internal user of platform 104, through WhatsApp Business API Server acting on behalf of the internal (WABA) user. Of note, contents of a WhatsApp message processed through platform 104 are temporarily available as plaintext inside the WhatsApp Business API server and also inside platform 104. At all other points where the WhatsApp message is in transit between components between platform 104 to its internal users and the external WhatsApp platform to its external users, such messages are authenticated and encrypted, e.g. through HTTPS and Transport Layer Security (TLS) protocols.

An embodiment provides facilities to interface with an external communication platform (e.g. WhatsApp) and to communicate and interface with the external platform to process normally "end-to-end encrypted" communications for messages processed by the external platform, so that mid-stream, platform 104 has facilities to intercept/receive WhatsApp messages and their contents as plaintext, unencrypted items, thereby permitting application of applicable document management policy actions, such as identifying and archiving the messages and their contents. Details of inbound and outbound WhatsApp message interceptions/processing are provided below.

For an exemplary WhatsApp message originating from an internal user with an internal device 114 on platform 104 that is destined for an external user/account to platform 104, the following actions are conducted:

1) Device 114 of an internal user validates a HTTPS certificate to authenticate the server's identity and establish a secure connection using Transport Layer Security (TLS), so that the outbound WhatsApp message sent from device 114 to platform 104 over this connection is encrypted;
2) On receipt by process 206I of the message, the message is decrypted back to plaintext where it may be used for policy enforcement and it may be sent to process 206I for archiving (e.g. through Compliant Archiving process);
3) Process 206I uses the certificate of the WhatsApp Business API server to establish an HTTPS connection to the WhatsApp system (and its WhatsApp Business API server), so that a message sent over this connection is encrypted;
4) On receipt by WhatsApp Business API server, the message is decrypted back to plaintext;
5) WhatsApp Business API server encrypts the message contents using the Signal Protocol. This makes the remaining journey of the message content through the WhatsApp platform authenticated and encrypted; and
6) On arrival at the external user the message is decrypted to plaintext using the Signal Protocol and processed or displayed to the external user as a typical WhatsApp message.

For an inbound WhatsApp message originating from external user destined to an internal user having device 114 tracked by an organization in platform 104, the following actions are conducted:

1) The external WhatsApp user encrypts an inbound WhatsApp message using the Signal Protocol, thereby making the message authenticated and encrypted;
2) On arrival at the WhatsApp system (at its WhatsApp Business API server), the message is decrypted to plaintext;
3) The WhatsApp system determines that the message is destined for the internal user of the organization to be routed to platform 104;
4) The WhatsApp system (through its WhatsApp Business API server), uses the HTTPS certificate of platform 104 to establish an HTTPS connection to platform 104, and the message is encrypted while in transit over this connection;
5) On arrival at platform 104, the message is decrypted to plaintext where it may be used for policy enforcement and may be sent to process 206I for archiving (via Compliant Archiving);
6) Process 206I uses an existing TLS connection in system 102 to deliver the message to device 114, where the message is encrypted while in transit over this connection; and
7) On arrival at device 114 of the internal user, the message is again decrypted to plaintext and processed or displayed to the user as a WhatsApp message.

Figure 31:
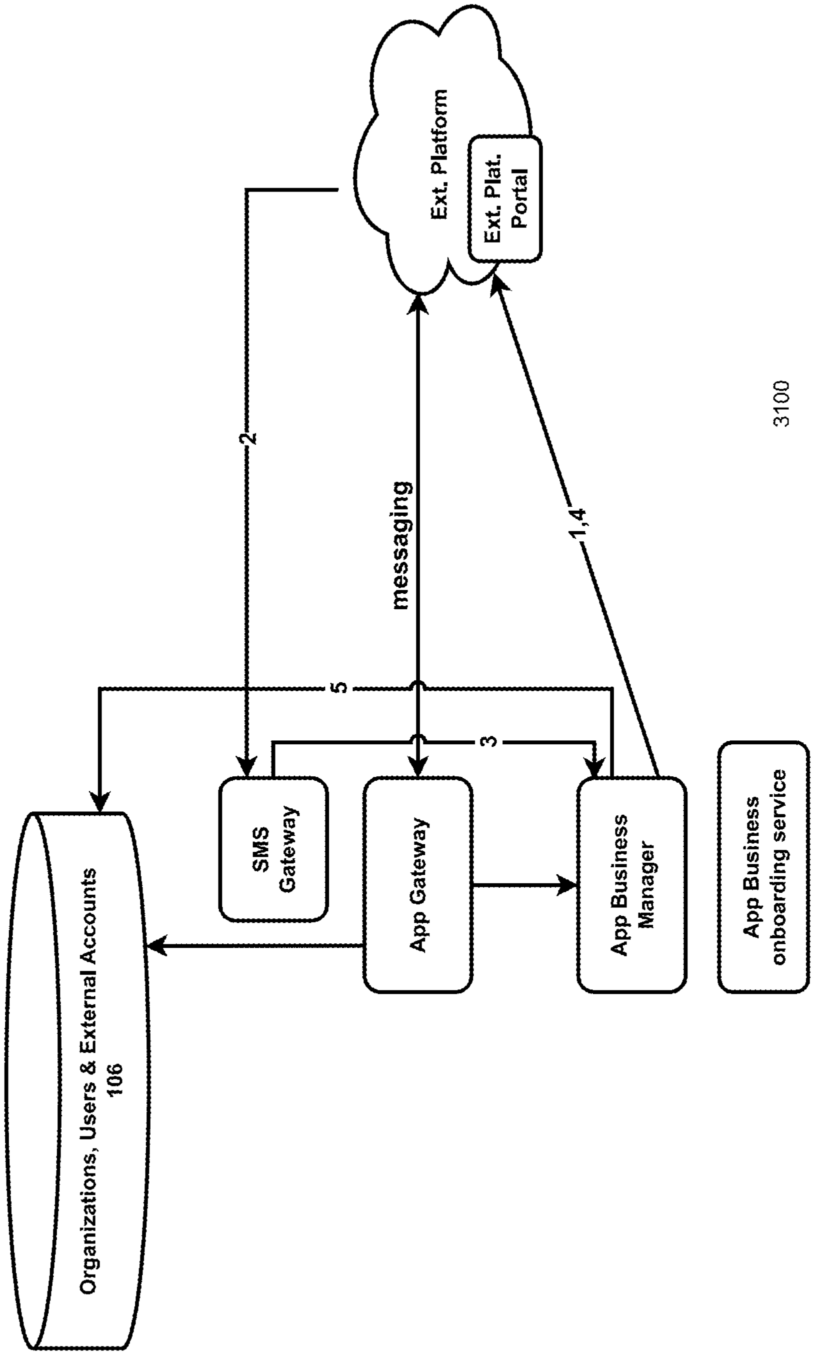

With further details on specific features of onboarding WhatsApp Business Users by an embodiment, FIG. 31 in its block diagram 3100 illustrates exemplary actions for verification processes that occur for an internal user on platform 104 having been assigned a virtual phone number.

Virtual phone numbers are different than real phone numbers in that they are acquired on behalf of the organization for platform 104. Virtual phone numbers are not assigned to a particular mobile phone or hardware device, and they exist as virtual identification numbers only. In order that WhatsApp System and the organization of platform 104 trust that the Onboarding Process with the WhatsApp System have been performed successfully the following verification actions are performed for each WhatsApp-enabled virtual number:

Action 1: WABAM requests a specific (virtual) identification number (such as a virtual telephone number) to be verified using the WhatsApp Business API to the WhatsApp system.

Action 2: WhatsApp system sends a One-Time-Password (OTP) code via SMS to the number. As the virtual number is hosted by platform 104, the SMS arrives to platform 104's SMS gateway.

Action 3: Platform 104's SMS gateway identifies the incoming message as a WhatsApp OTP message due to the specific content and originating numbers. SMS gateway provides the code to WABAM.

Action 4: WABAM verifies the number to the WhatsApp system using the OTP.

Action 5: WABAM updates the WhatsApp Business Account in database 106 as being active.

Once activated, the WhatsApp business virtual phone number may be used to communicate with other users using either platform 104's messaging process or by organization's other systems using platform 104's Broadcast API. As the OTP interaction using the virtual number was managed entirely within platform 104 messaging system the organization's (business) user was unaware and uninvolved with the verification activities, facilitating a smooth onboarding experience for the user.

For an embodiment, FIG. 32 illustrates actions of a phone number verification process for a user been assigned a real (or corporate) phone number.

Real or corporate phone numbers are preexisting numbers acquired by the client organization without control or administration by platform 104. They may or may not be assigned to a particular mobile phone or hardware device or land line. In order that WhatsApp system and platform 104 trust that the onboarding actions previously described have been performed successfully the real phone number must be capable of receiving a Voice call or SMS (text) message from WhatsApp system. The following verification actions are performed by the user and/or platform 104:

Action 1: Upon logging in to platform 104, the user is prompted in the app to verify the number to be used as a WhatsApp Business number. The user selects whether verification is provided via voice call or SMS (text) verification.

Actions 2, 3, and 4: The Message client transmits the verification request to WABAM to the WhatsApp system.

Action 5: The WhatsApp system sends a One-Time-Password (OTP) code via SMS or voice call to the number. As the number is owned/controlled by the user, the user will receive the SMS or answer the voice call on the associated device.

Actions: 6, 7, 8, and 9: The user enters the OTP code into the Message Client that transmits it to the WABAM process to verify the number to the WhatsApp system.

Action 10: WABAM sets the WhatsApp account in database 106 as being active.

At this point, the WhatsApp business real or corporate number is active and the user is verified to send communications through the main messaging process of platform 104 or through other communication systems through platform 104's broadcast API.

Now, FIGS. 33-36 illustrate exemplary message sequences exchanged between platform 104 and the WhatsApp system in different workflow scenarios.

FIG. 33 in its block diagram 3300 illustrates exemplary actions for executing an outbound WhatsApp message send command for an outbound WhatsApp message by a user on platform 104, per the following actions:

Action 1: A User creates an outbound WhatsApp message for sending to one of its external WhatsApp user contacts through the messaging process on platform 104.

Action 2: The Message Client sends the outbound WhatsApp message to Message Platform.

Action 3: The Message Platform checks permissions for the outbound WhatsApp message and the user for message types, organizational policies (e.g. WhatsApp messaging entitlement, file attachments approved, etc.).

Actions 4 and 5: The outbound WhatsApp message is sent for archiving, which may follow archiving features described herein.

Actions 6, 7, and 8: The outbound WhatsApp message is sent to WhatsApp system via the WhatsApp Gateway.

Action 7: The organization policies pertaining to sender and recipient are checked for compliance. For example, message templates are applied, disclaimers are added, opt-in/opt-out setting of recipient(s) is checked.

Action 9: The WhatsApp system may provide a Message Sent receipt to indicate its acceptance.

Action 10: The outbound WhatsApp message is delivered to external WhatsApp user.

Actions 11 and 12: The WhatsApp system may provide Message Delivered and Message Read receipts to indicate successful delivery and reading by the external WhatsApp user.

Action 13: The Message Platform may generate and send Message Sent/Delivered/Read receipt(s).

Actions 14 and 15: Message receipt(s) are sent for archiving, which may follow archiving features described herein.

Action 16: Message receipt(s) are sent to Message Platform for UI visualization.

Figure 34:
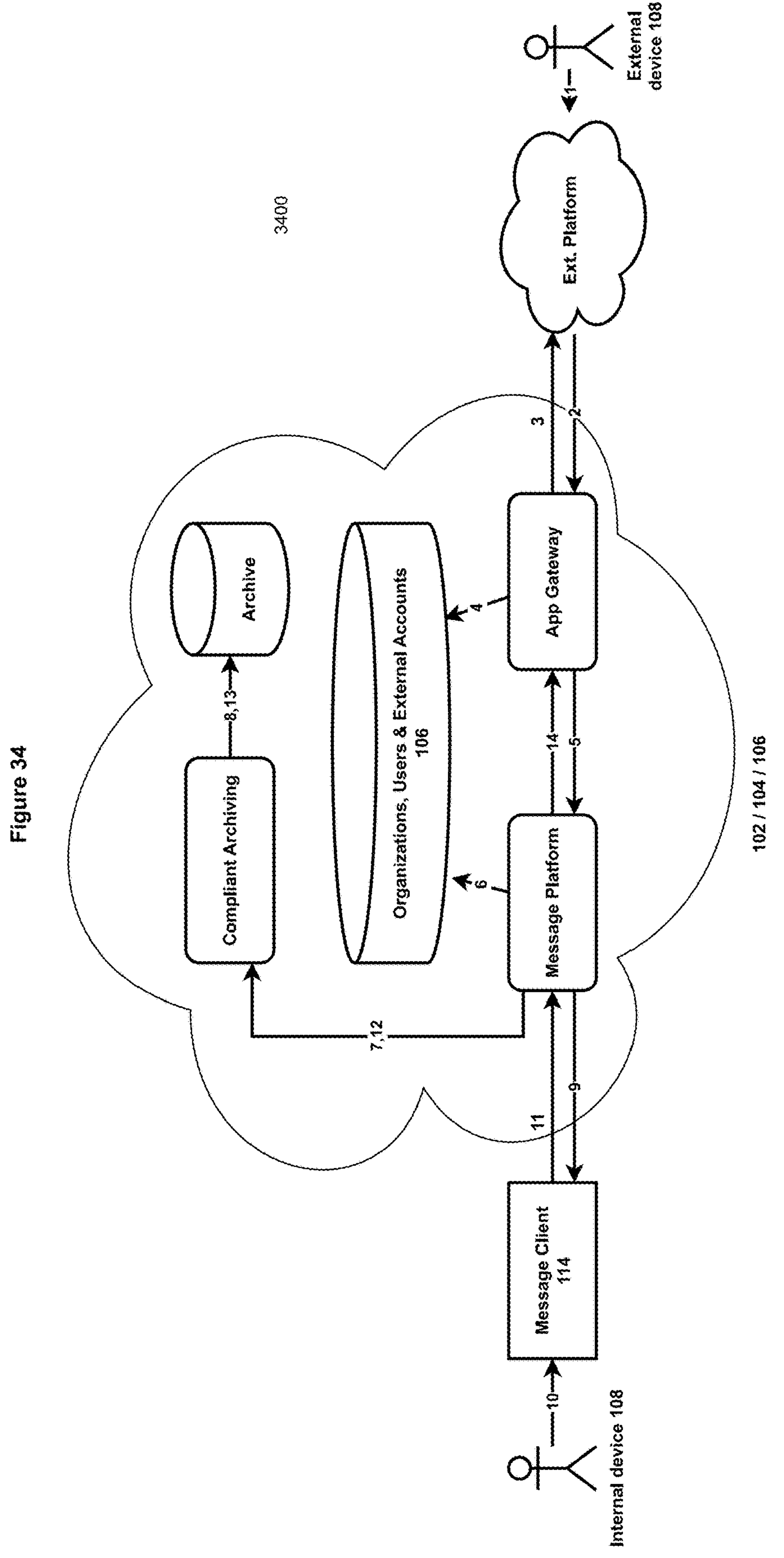

FIG. 34 in its block diagram 3400 illustrates exemplary actions in processing inbound (received) WhatsApp messages by a user on platform 104 from external WhatsApp users, per the following Actions:

Action 1: An external WhatsApp User generates an external WhatsApp message to/intended for an internal user on platform 104.

Action 2: The WhatsApp system receives the external WhatsApp message from the external user and sends it to platform 104's WhatsApp Gateway.

Action 3: The WhatsApp Gateway responds to WhatsApp system with a Message Sent receipt.

Action 4: The WhatsApp Gateway validates whether the external WhatsApp message is for a valid internal user on platform 104.

Action 5: The WhatsApp Gateway sends the external WhatsApp message to the Message Platform.

Action 6: The Message Platform verifies whether the external WhatsApp message complies with organization's policies (attachment type, etc.)

Actions 7 and 8: The external WhatsApp message is sent for archiving which may follow archiving features described herein.

Action 9: The external WhatsApp message is sent to the internal user.

Action 10: The internal user accesses and reads the external WhatsApp message.

Action 11: The Message Platform sends Message Delivered/Read receipt(s).

Actions 12 and 13: Message Delivered/Read receipt(s) are sent for archiving which may follow archiving features described herein.

Action 14: Message Delivered/Read receipt(s) are sent to the WhatsApp system.

Figure 35:
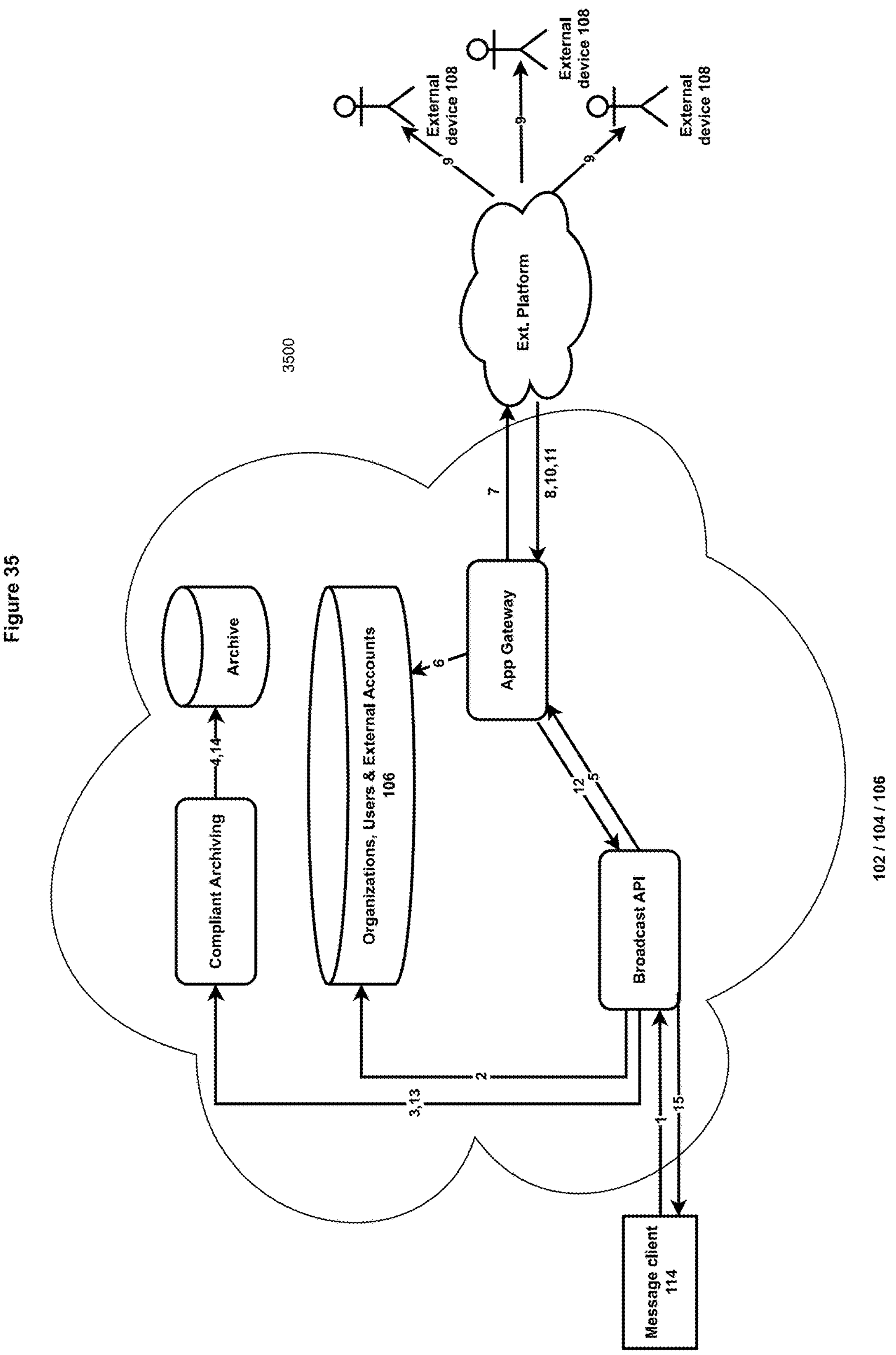

FIG. 35 in its block diagram 3500 illustrates exemplary actions of platform 104's processing of an outbound broadcast WhatsApp message to external WhatsApp user(s).

In Action 1, an organization on platform 104 sends an external outbound broadcast WhatsApp message that is directed to multiple WhatsApp contacts. The external outbound broadcast WhatsApp message may contain personalization or placeholder fields which may be updated later.

In Action 2, in platform 104, Broadcast API verifies whether the organization is permitted to send the external outbound broadcast WhatsApp message to those contacts and are within the organization's agreed limits and policies.

In Actions 3 and 4, the external outbound broadcast WhatsApp message is sent for archiving which may follow archiving features described herein. Bulk messages containing personalization or placeholder fields or a single message sent to a large number of contacts may be restructured for efficiency of archiving. For example a template of the bulk message may be archived with a list of placeholder fields for addressees for the bulk message.

In Actions 5, 6, and 7, the external outbound broadcast WhatsApp message that are sent to the WhatsApp System via the WhatsApp Gateway which checks sender and recipient(s) for compliance with organizational policies (e.g. WhatsApp messaging entitlement, file attachments approved, etc.). Messages containing personalization or placeholder fields are expanded and placeholders are filled in. In Action 6, organization policies pertaining to sender and recipient are checked for compliance. For example, message templates may be applied, disclaimer text may be added, opt-in/opt-out setting of the recipient(s) is checked. For any opt-in/opt-out preferences for a given message, actions and information relating to the external sender may still be tracked and recorded (even if the message is opted to not be received by the internal user) and such related data may be collected and reviewed by the organization upon appropriate queries to platform 104 and database 106.

In Action 8, the WhatsApp system may provide a Message Sent receipt to indicate acceptance.

In Action 9, the WhatsApp system delivers the external outbound broadcast WhatsApp message to the designated external WhatsApp users.

In Actions 10 and 11, the WhatsApp system may provide Message Delivered and Message Read receipts to indicate successful delivery and reading by the external WhatsApp user(s).

In Action 12, the Message Sent/Delivered/Read receipt(s) are sent to Broadcast API.

In Actions 13 and 14, the Message receipt(s) are sent for archiving which may follow archiving features described herein.

In Action 15, message receipt(s) are sent to client processes 114 on internal devices 108 for logging.

Figure 36:
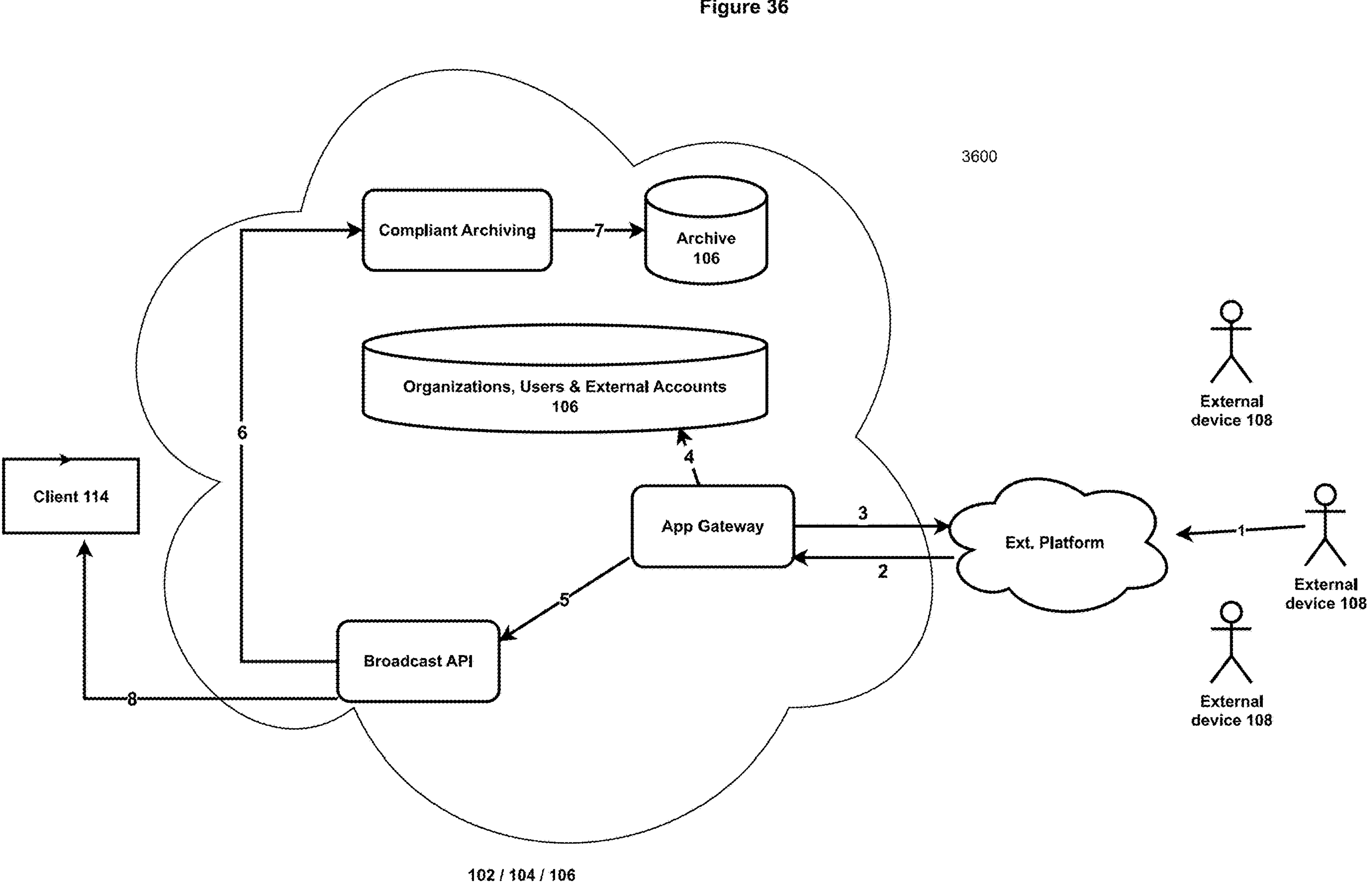

FIG. 36 in its block diagram 3600 illustrates exemplary actions of client processes 114's processing of inbound WhatsApp broadcast messages. It will be appreciated that inbound messages from external WhatsApp users to processes 114 are sent individually but may still be delivered to the Broadcast API because as the internal recipient is identified as one of the Broadcast API accounts managed by processes 114.

In Action 1, an external WhatsApp User creates a message to one of the WhatsApp Broadcast API accounts ("inbound broadcast WhatsApp message").

In Action 2, the WhatsApp system receives the inbound broadcast WhatsApp message and sends it to WhatsApp Gateway.

In Action 3, the WhatsApp Gateway responds to WhatsApp system with a Message Delivered receipt.

In Action 4, the WhatsApp Gateway validates whether the inbound broadcast WhatsApp message is for a valid Business Broadcast API account by process 114.

In Action 5, the WhatsApp Gateway sends the inbound broadcast WhatsApp message to the Broadcast API.

In Actions 6 and 7, the Broadcast API process sends the inbound broadcast WhatsApp message for archiving which may follow archiving features described herein.

In Action 8, the Broadcast API process sends the inbound broadcast WhatsApp message to client process 114.

An embodiment also provides for an "opt-out" function that enables an external WhatsApp User to indicate to platform 104 and its User(s) of the organization that the external user no longer wishes to receive messages from the organization or the business user(s).

For an embodiment, activation of an "opt-out" command by an external WhatsApp user is initiated by the external user sending a predetermined WhatsApp message to one or more WABA accounts in platform 104. The predetermined message contains a predetermined keyword, such as "OPTOUT" or "STOPALL", depending on the scope of the request. Platform 104 receives the message and detects the presence of opt-out keyword. At that time, database 106 is updated for the affected organization(s), user(s) and external accounts to reflect the opt-out action. As such, subsequent transmission of messages (1-1 or broadcast) messages to the external WhatsApp User from the User or organization's systems will be omitted as the flags in database 106 will be checked for any opt-out restrictions.

The user(s) and organization(s) may be sent an "opt-out" status message by platform 104. Also, upon submitting account status inquiries to platform 104, resulting replies may show any such "opt-out" statuses.

When an external WhatsApp User wishes to receive messages from the User(s) or associated organization(s), a second predetermined WhatsApp message may be sent to one or more WABA accounts in platform 104. When platform 104 receives these messages and detects the presence of the opt-in keyword which then updates the entries in database 106 for Organization, and Users and External Accounts to reflect the opt-in action.

Notably, the currently WhatsApp system does not provide an express "opt-out" feature, as it only currently provides a facility where one WhatsApp user can block messages from a second WhatsApp user. The current WhatsApp system does not inform the second user that the first user has blocked the second user. This may cause confusion since the second user account may continue to send messages to the first user account unaware that the first user no longer wishes to receive them.

Pivoting, having regard to functional and structural elements of platform 104 and the related data model for a conversation used in an embodiment, details are provided of exemplary UIs generated on a User's device 108 as an exemplary Company Channel is created. A Company Channel is a type of Business IS which, by a configuration setting, is limited to membership by members from a single organization. A Company Channel has a single BIS Owner and that owner determines access to the BIS within that company.

Figure 18A:
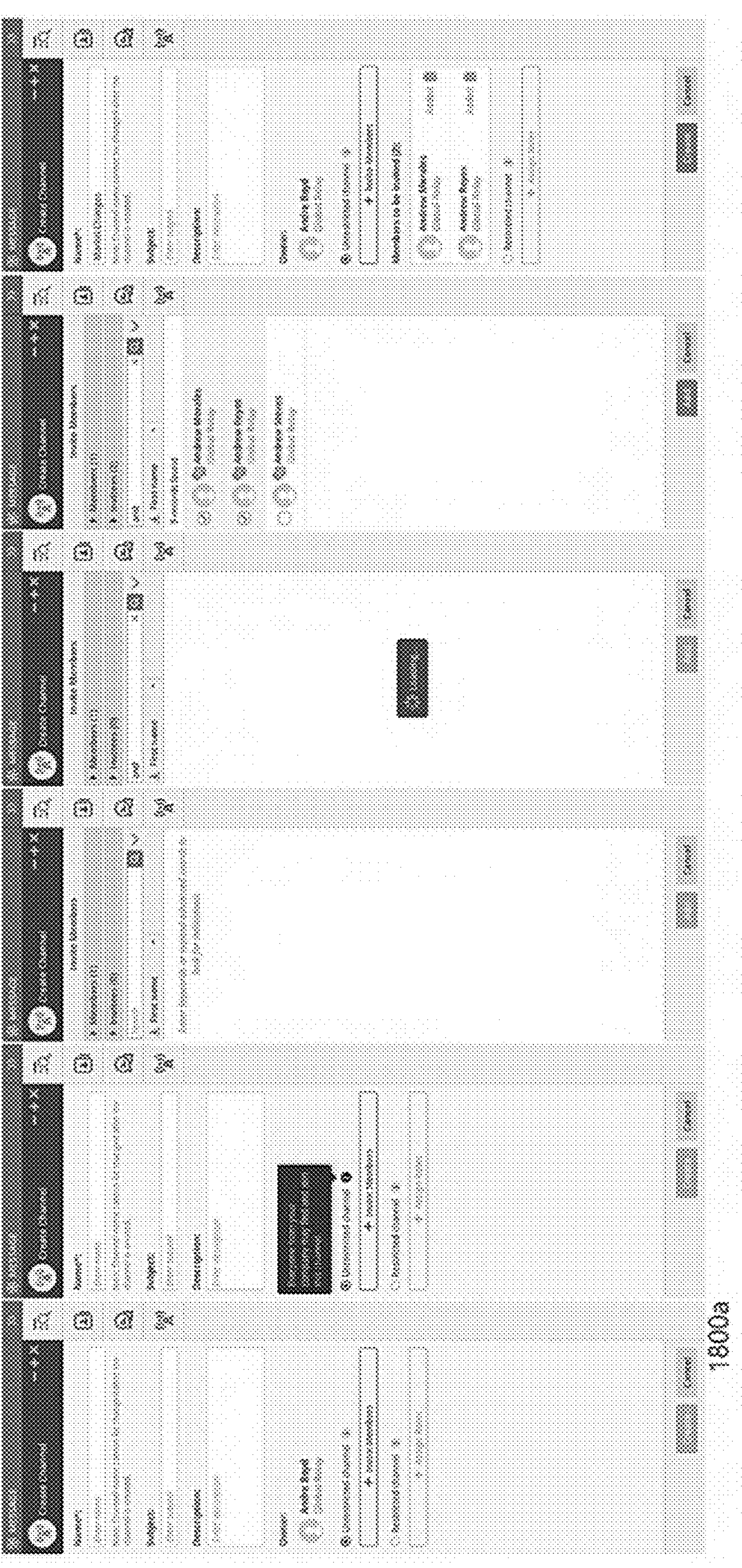
FIG. 18*a* is a schematic diagram illustrating exemplary user interface screens generated on a user's device when an interaction space is being created by the message platform for an embodiment of FIG. 1.

Referring to FIG. 18*a*, six screens 1800*a* are generated in sequence on device 108 via client 114 and illustrate an exemplary workflow of actions executed to create a company channel using platform 104. In the first screen, the user, who becomes the owner of the channel, initiates creation of a Company Channel. Fields are available to set the channel's Name, Subject, and Description. It is also possible to select between a further subtype of:

"Unrestricted channel", which provides membership to all Message Users within the channel owner's Company; or "Restricted channel", which provides membership that is restricted to a list of specifically identified Message Users within the channel owner's Company.

In the second screen, the owner has hovered over the "Unrestricted channel" help icon, and the application has displayed a pre-set membership policy for this subtype of IS: "Everyone from your company may find and join this channel". In the third screen, the owner selects an optional feature to send "invitations" to particular Organization Members. In the fourth screen the owner enters user search criteria "and" and waits for results to be returned. In the fifth screen, platform 104 has returned a search result set of three records and the owner has selected the first two sets. In the sixth screen, the owner is ready to create the channel and send the invitations to the selected invitees.

Figure 18B:
FIG. 18*b* is a schematic diagram illustrating exemplary user interface screens generated on a user's device when assigning roles in a company channel as processed by the message platform for an embodiment of FIG. 1.

Referring to FIG. 18*b*, a workflow for creating a company "Restricted channel" is similar to creating an "Unrestricted channel", except that instead of the fourth and fifth screens of FIG. 18*a*, screens 1800*b* in FIG. 18*b* are generated. For creation of an Unrestricted channel, the chosen users may be provided with non-default role assignments with respect to this IS.

Next, an example of what a User would see on his device 108 as an exemplary Business Channel is created. A Business Channel is a Business Interaction Space with two or more BIS Partners. By design for this example, the creator of the Business Channel has the authority to set the (businesses) organizations that are entitled to join; each designated organization must assign a co-owner within that organization who carries responsibility for determining access to Organization Members within that Organization.

Figure 19:
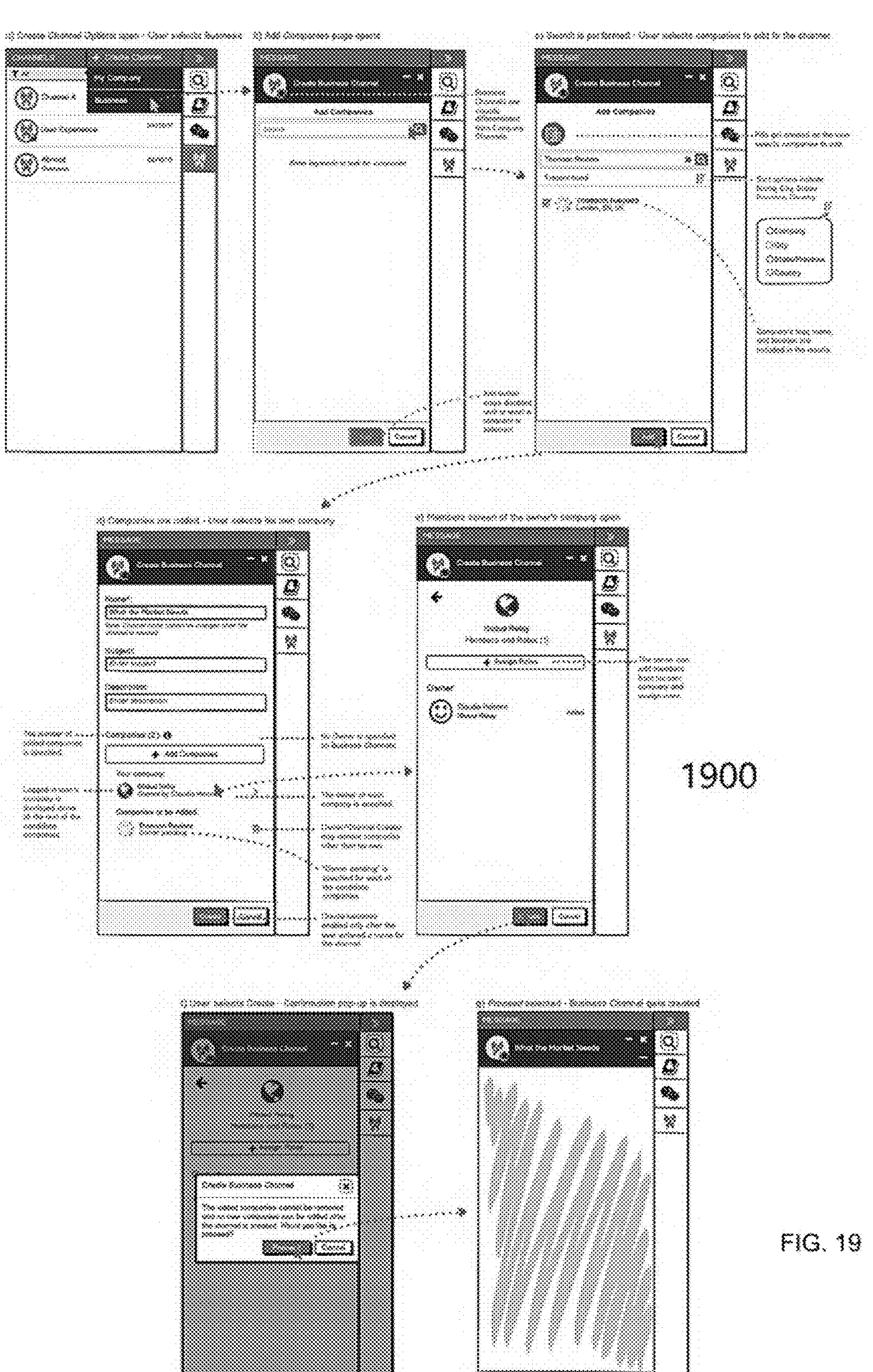
FIG. 19 is a schematic diagram illustrating exemplary user interface screens generated on a user's device when an interaction space is being created by the message platform for an embodiment of FIG. 1.

Referring to FIG. 19, seven screens 1900 are generated in sequence on client 114 on device 108 that illustrate an exemplary workflow of actions executed when creating a business channel using platform 104. In the first screen, the user, who is the owner of the channel initiates creation of a Business Channel. In the second screen, platform 104 generates a GUI presenting an offer with options to search by keyword(s) for organizations to be added as authorized member organizations. In the third screen, after the owner searched for an organization named "Thomson Reuters", platform 104 has retrieved data from the search results and generates the result set. The channel owner selects that organization for addition. In the fourth screen, the owner has entered additional information about the channel such as the channel's Name, Subject, and Description. The GUI also shows a list of organizations that include the Owner's organization and previously selected organizations. In the fifth screen, platform 104 provides a GUI with an invitation allowing the user to add Organization Members from his Organization as members of the business channel and to assign roles. In the sixth screen, the owner is ready to create the channel. In the seventh screen, the channel has been created.

Figure 20:
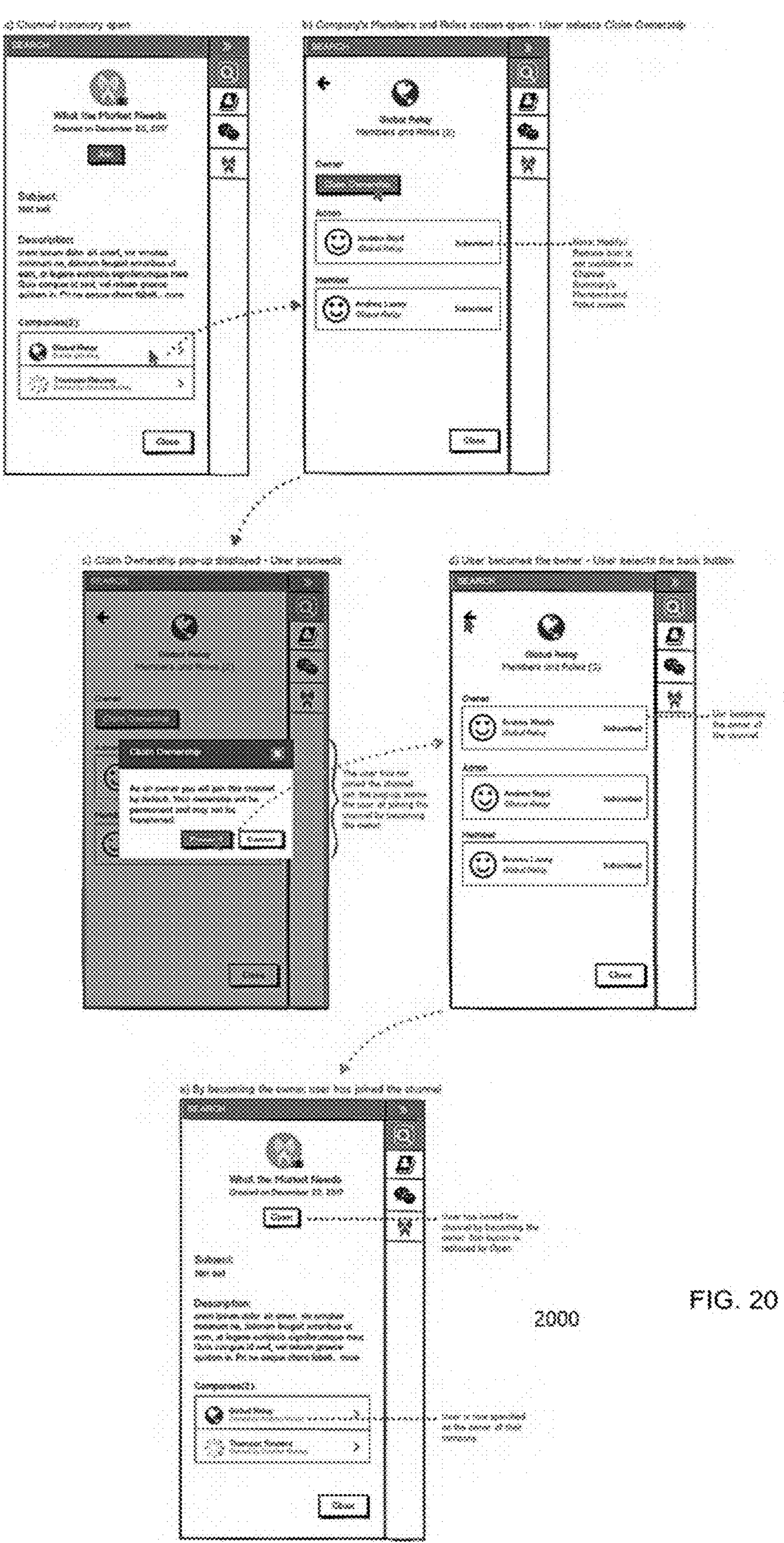
FIG. 20 is a schematic diagram illustrating exemplary user interface screens generated on a user's device when ownership of an interaction space is claimed by the message platform for an embodiment of FIG. 1.

Now referring to FIG. 20, screens 2000 are generated on device 108 by client 114 as an exemplary ownership claim is created for a Business Channel, where an exemplary workflow is described for a BIS Owner Entitled Organization Member in a counterparty organization of a business channel claiming co-ownership of a business channel for his organization.

For this example, the following constructs and privileges are in place by definition. A BIS Owner Entitled User may make a Business Channel ownership claim for his organization. For the related screens, a "Claim Ownership" button is accessed from the Owner section on a Company's Members and Roles screen. The button is not visible to a user who does not have a BIS Owner Entitlement. In such a case, the Owner section is not visible to the user, unless there already is an owner. Screens 2000 illustrate an exemplary workflow when a User is claiming ownership of a business channel in platform 104. In the first screen, the BIS Owner Entitled User has located an Un-Owned Business Channel and the results are shown. The previous Channel Search screen has not been shown. In the screen, in the Business Channel description's list of companies the "Global Relay" company is listed with the added notation of "Owner Pending". In the second screen, client 114 on device 108 generates an offer to "Claim Ownership". In the third screen, the GUI displays a pop-up notification indicating the consequences and responsibilities of "Claim Owner" function. In the fourth screen, the display shows that the user has been granted the "owner" role for the business channel for his organization. In the fifth screen, platform 104 displays the business channel's summary information. Note in the Business Channel description's list of organizations the example "Global Relay" organization is listed with the added notation of "Owned by <user name>".

Now, referring to FIGS. 21-26, several exemplary User Interfaces (UIs) that are generated on various devices 108 are shown and described. These UIs are generated during selection of an IS by a user and conversation streams between the user sending the message from a first device 108 and a second user receiving the message on a second device 108. It will be appreciated that processes relating to operation and management of spaces, accounts, privileges, Calling Cards and other features as described herein that underlie data and information shown for spaces and accounts shown in FIGS. 21-26 are generated by appropriate processes and functions described for embodiments.

One UI paradigm is use of a message "inbox" user interface to manage messages processed on device 108, having graphical features and information similar to electronic text message conversations. An inbox user interface may show active conversations for a user. There may be provided graphical/text indications of the number of active conversations and the number of conversations with unread messages. The inbox may also present active conversations and conversation invitations with filtered views. Any conversation in the Inbox may be marked with tags, such as a favorite. The inbox may also show indications as to selected statuses or characteristics of the message or any users.

Figure 21:
FIG. 21 is a schematic diagram illustrating an exemplary user interface screen generated on a user's device showing a selection of interaction spaces used by the message platform for an embodiment of FIG. 1.

In FIG. 21, different types of icons are created in UI 2100 on user's device 108 that is about to initiate a message conversation through an embodiment are shown. UI 2100 shows several of types of available ISes in a header of UI 2100, using multiple icons and metadata descriptions as shown. For example in a one-to-one conversation space, an avatar image of a counterparty is shown along with the "firstname" and "lastname" of the participant and most recent subject of the conversation (if set). In a multi-party conversation space, an icon with three stylized participants is shown in upper left corner along with a subject of the conversation and a list of participants. In company channels of different types a unique stylized icon is shown along with the channel name and channel subject. For a selected space, features and restrictions for messages generated in that space are governed by the underlying previously defined attributes and constructs for that space. Those attributes and constructs are typically not displayed in a conversation. For one embodiment, it is presumed that a user selecting a given space is familiar with these attributes and constructs. However, an embodiment may generate and display selected information regarding these attributes and constructs to a UI (e.g. in a pop-up window) or by clicking on attributes, icons and symbols shown in the UI to navigate to related information.

Figure 22:
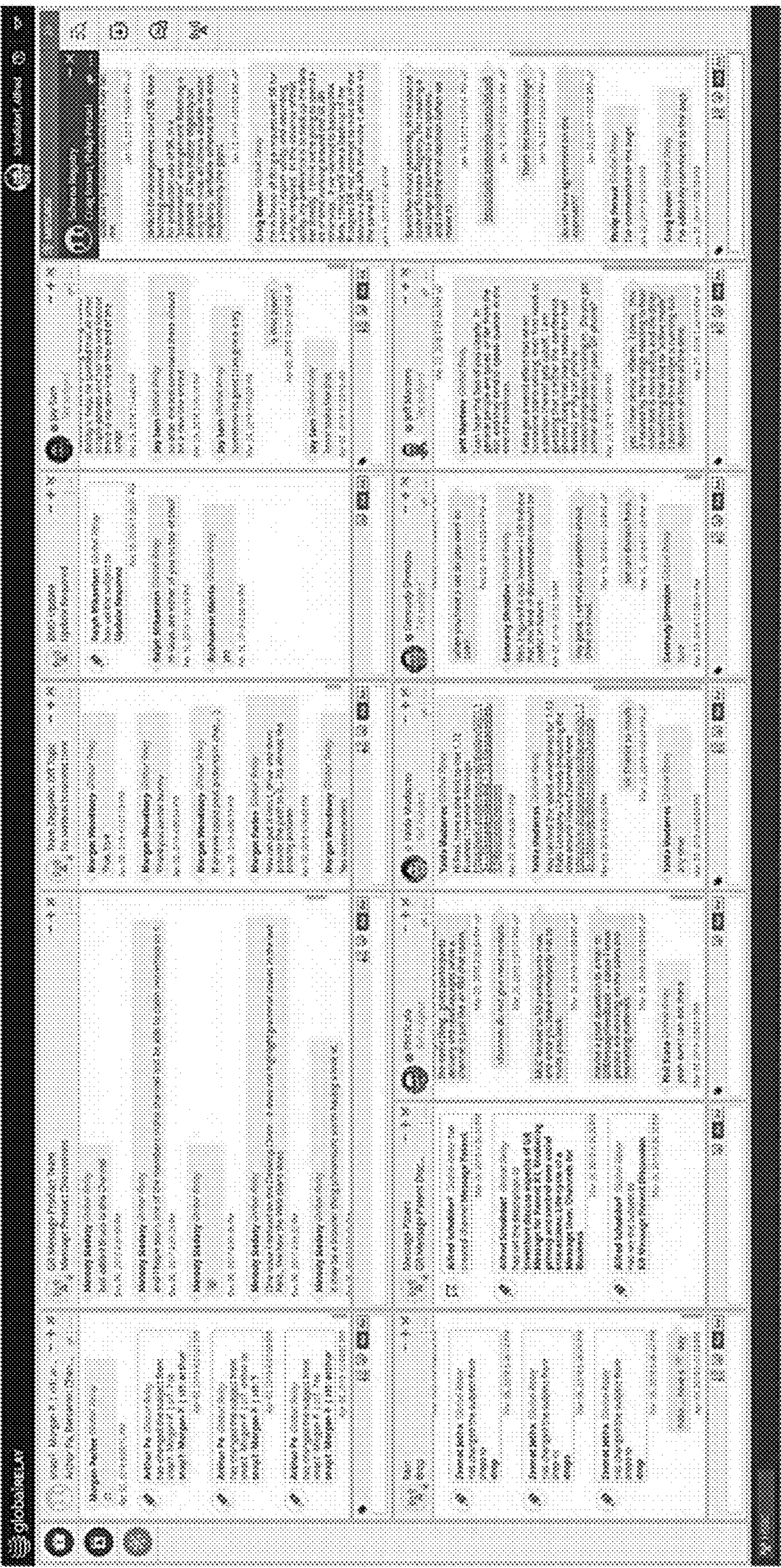
FIG. 22 is a schematic diagram illustrating an exemplary user interface screen of layout of several interaction spaces used by the message platform for an embodiment of FIG. 1.

Referring to FIG. 22, UI 2200 is generated showing a layout of several Interaction Spaces. Each rectangular block shows contents of an IS and provides sections for header, body content and an editor area for new messages being composed. Displayed element of an IS may be arranged in a grid layout creating a tiled appearance (as shown below) or may be arranged as free-floating, overlapping windows.

Figure 23:
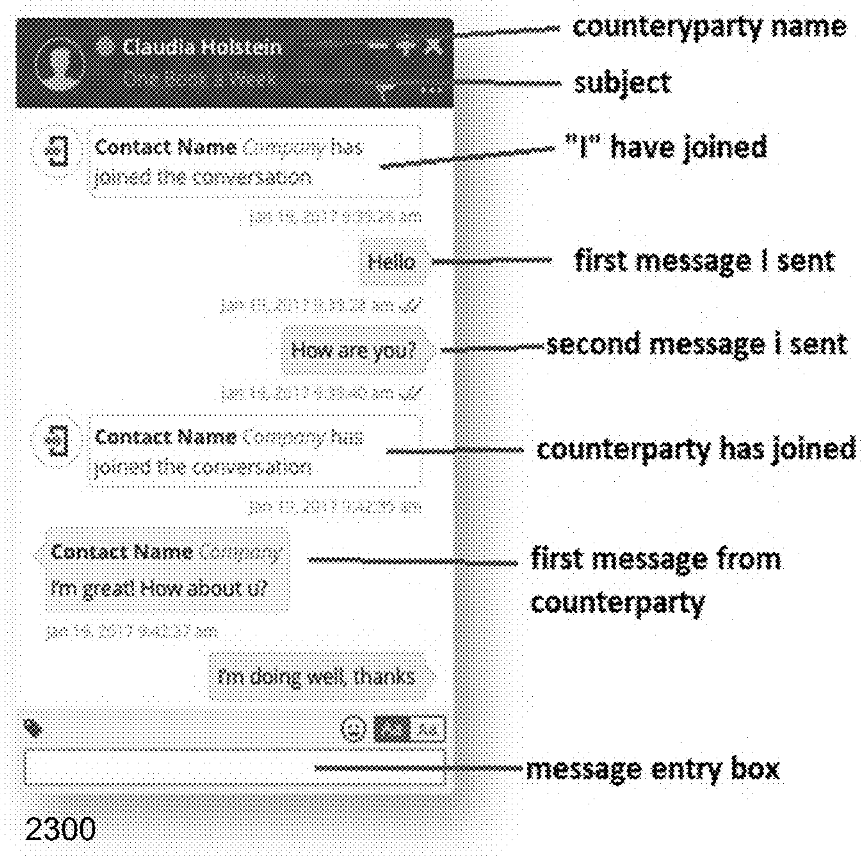
FIG. 23 is a schematic diagram illustrating an exemplary user interface screen of a conversation in progress on a device as processed by the message platform for an embodiment of FIG. 1.

Referring to FIG. 23, UI 2300 is generated showing a snapshot of a private (one-to-one) conversation in progress between a user of device 108 and another user with another device 108.

Referring to FIG. 24, UIs 2400*a* and 2400*b* are sequentially generated showing additional data may be shown such as the sent timestamp and the read timestamps (the time at which the other participant of the conversation "read" the message). This optional data may be hidden or displayed by clicking, touching or otherwise activating a graphic element with the corresponding human-interaction device(s).

Figure 25:
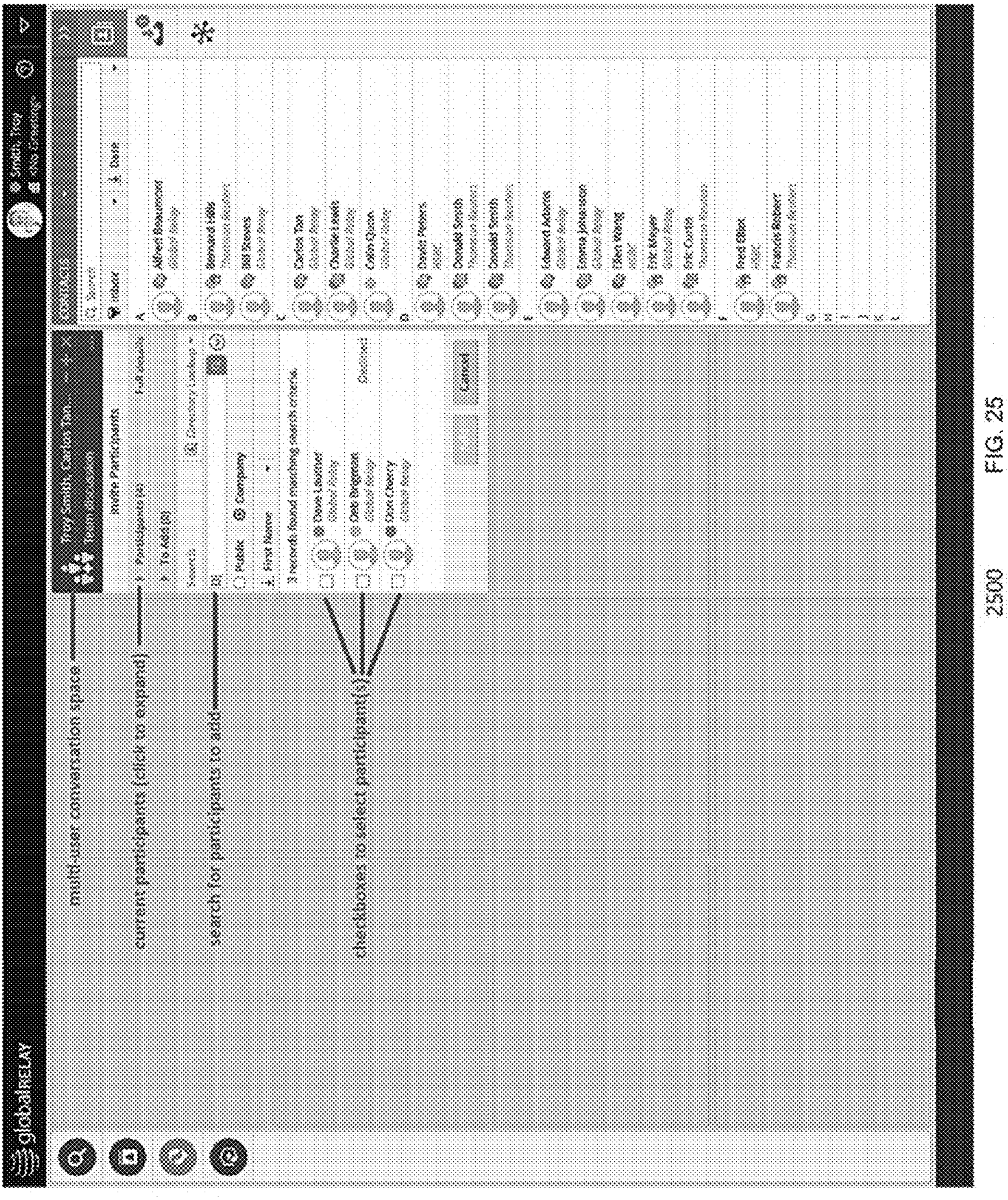
FIG. 25 is a schematic diagram illustrating an exemplary user interface screen of a multi-party conversation in progress on a device as processed by the message platform for an embodiment of FIG. 1.

Referring to FIG. 25, UI 2500 shows a multi-user conversation space in progress and illustrates execution of additional controls to add and remove participants from the space, as shown.

Figure 26:
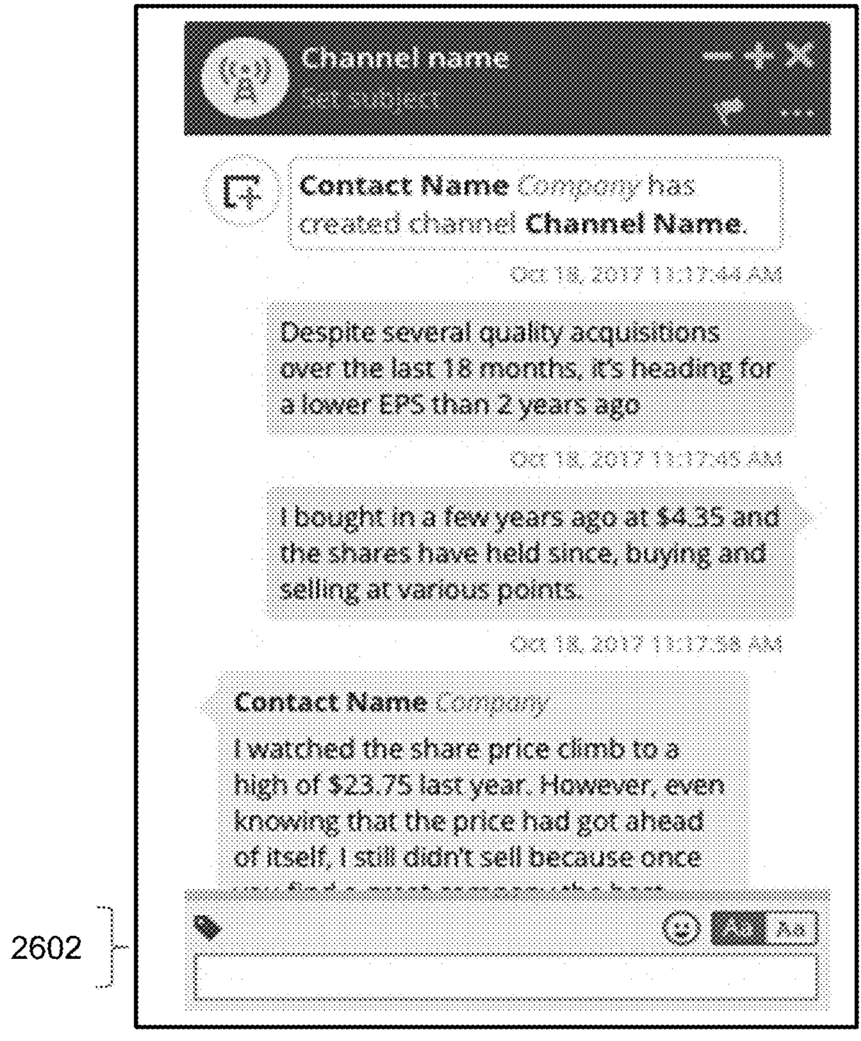
FIG. 26 is a schematic diagram illustrating an exemplary user interface screen of a conversation in progress with a calling card credentials presented for an account on a device as processed by the message platform for an embodiment of FIG. 1.

Referring to FIG. 26, in a BIS context it is often helpful to identify not only the name of an individual with his messages, but also to identify the company and other relevant details about the counterparty. As noted earlier, an embodiment's Calling Card construct provides this facility. UI 2600 shows a stream of messages where data from a pop up Calling Card 2602 associated with a user (such as contact name, company name, phone number, and other details) are selectively displayed (here the contents are empty).

Having regard to the above description of functions, structures and examples of execution of various processes for platform 104, database 106 and client 114, it will be appreciated that platform 104 enables mediation of multiple points of control corresponding to multiple different Accounts for a person. The described embodiment relates to two control points, although other embodiments may have more than two.

A first control point is via management and use of a Message Account. The Message Account is controlled by a User and provides the identity used by the Message Platform for messaging. This is akin to providing and showing an email address of a user in a message distributed in an email platform. The information associated with a message Account represents personal information—e.g. personal profile attributes as well as a user's list of contacts. This information is persistent and long-lasting; it is not affected when the User leaves a particular Organization.

A second control point is via management and use of a Member Account associated with an Organization. Rights, privileges and archiving parameters for a Member Account is set and controlled by the Organization. The Member Account provides an identity used for managing an Organization Member's access to Enterprise Applications subscribed to by the Organization. For example, an Organization may subscribe to an enterprise application supporting compliance monitoring of archived messages. It will be appreciated that messaging is an exemplary enterprise application that can be provided to an Organization Member through his Member Account. The information associated with a Member Account represents contextualized information about the User as an Organization Member (for example, organization member profile attributes and entitlements). Member Account information is linked to a person's status in the Organization; it disappears when the person leaves the Organization.

A single person may have both a Message Account and a Member Account representing his role as a Message User and as an Organization Member, respectively. As a Message User, a person can initiate a Social Message Session and authenticate against his Message Account identity. In an embodiment, a User's messaging entitlements and capabilities may be defined by verification and linkage of his identity against a personally managed account rather than an account controlled by his associated organization. Meanwhile, a Professional Message Session operates behalf of an Organization and typically requires verification of the user's identity against an organization-managed member account. A person cannot initiate a Professional Message Session on behalf of the Organization until it is established that his Member Account is for the same person that already has an established Message Account identity. It will be seen that Account Federation by an embodiment establishes that both Accounts are for the same person. A person that can demonstrate that he is able to be authenticated against both accounts will enable an embodiment to link the two accounts together, thereby "federating" the two accounts. The person may now be referred to as a message user: a user that is entitled to initiate either a Social Message Session or Professional Message Session on behalf of the organization. A Professional Message Session authenticates a user against his Member Account and treats the two linked accounts as one. Therein, account profile attributes are aggregated into a single user profile; member account entitlements govern the extent that a user may leverage messaging features on behalf of the organization. This aggregated identity enables a user to participate in different Spaces as either an individual or as an entitled member of an organization. As such, the message platform acts as both a social media platform as well as an enterprise application.

Account Federation is established the first time that a User attempts to use Message on behalf of the Organization. The federation is dismantled when the User leaves that Organization. This provides an authoritative representation of who is empowered to communicate on behalf of an Organization and who is not. It is authoritative in the sense that both parties to the trust relationship must be in agreement. Accordingly, organizations must establish active Member Accounts and provide Calling Cards. A User needs to federate his long-lasting messaging identity with his more ephemeral identity as an organization member. Only then is the trust relationship fully established.

The embodiments provide flexibility in how Interaction Space Types can be designed to identify and manage control and access privileges between Users and Organizations. In Private Interaction Spaces, control resides with individuals. When a User communicates on behalf of his Organization, control inherently shifts to the Organization. For Professional Interaction Spaces, a User makes decisions as to whom to invite, and whether to join. However, the Organization retain control over IS archival and regulatory compliance review. With Business Interaction Spaces, control resides fully with partner Organizations. BIS Partners control not only IS archival, but which members can join. The relationship between BIS Partners reflects a natural peer-to-peer relationship of Organizations in the "real" world.

The above-noted three Space types support transitions of private communications to professional communications to business communications. This represents a continuum ranging from Interaction Spaces that emphasize end-user flexibility on the one hand, to Business Interaction Spaces emphasizing organization-centered structure and control on the other. Users may communicate as individuals in order to find Organizations to join. An organization may subsequently provide privileges to its members to participate in Interaction Spaces as professionals. Professional Interaction Space communications may foster business decisions to establish business partnerships, which may be represented as structured Business Interaction Spaces. In these transitions, simple bootstrapping actions enable Users to move from one context to the other.

In another aspect, an embodiment provides facilities for processing and linking two or more Organizations to an account for an individual. The Message Platform States may be augmented to permit additional possibilities, such as:

- Linking a User to more than one Organization Member via the "same-person" relationship as shown in FIG. 3; and
- Permitting an IS Participant of a Professional Interaction Space to act on behalf of one of the Organizations to which he is a member. The identification of the selected Organization being represented may be stored with the IS Participant entity as illustrated in FIG. 4, illustrating a specific context under which the User was invited into (and joined) a Professional Interaction Space.

A User may be limited to representing only one Organization in an Interaction Space. Message Platform workflow may be modified so that:

- A User is visible in the Message Directory to other Users as having zero, one or more Organization memberships;
- An invitation to join a Professional Interaction Spaces as a professional is subject to membership with a particular Organization;
- Any of a User's Member Accounts may federated with the User's Message Account. A User participates in an Interaction Space on behalf of a particular Organization by initiating a Professional Message Session for that Organization; and/or
- When a User leaves an Organization, he loses access to Interaction Spaces where participation was subject to membership in the Organization that the User is leaving. Professional participation in Interaction Spaces on behalf of the User's other Organizations are unaffected.

Features of an embodiment facilitate a User to communicate with other individuals as an individual through creation and use of a Message Account.

Features of an embodiment facilitate an Organization to control and grant access and communication privileges to a User to interact with others on behalf of the Organization through creation and design of a Member Account for the User and a Calling Card. The first time the User launches Professional Message, his Accounts are federated, and the User's Calling Card status is visible to the community at large. The User may then participate as a Professional IS Participant in Professional Interaction Spaces. These communications may encourage partnership-level business decisions. A User may invite a suitably privileged User into the Interaction Space, or solicit the entitlement for themselves.

Features of an embodiment facilitate an Organization to control and grant access for a restricted number of Users to make partnership level business decisions through creation and design of BIS Owner Entitlements to designated Users. Such Users may then establish and manage Business Interaction Spaces on behalf of the Organization. The real control of Business Interaction Spaces resides with Organizations rather than individuals. While an existing or original participant may leave an Organization, in an embodiment, others in the Organization may be entitled to simply step in and take that place.

Features of an embodiment facilitate a User with a both a personal message account and a member account provided by an organization, to federate these accounts thereby allowing them to act as a single enterprise application account for the duration of a User's membership with an Organization. This provides a user with an up-to-date, contextualized identity visible to the community at large. It promotes growth of communities found in social media while allowing for enterprise-level control by an Organization relating to regulatory, legal or compliance requirements.

The various features described above may be implemented in, and fully automated by processes executed by general-purpose computing devices, including but not limited to data center servers, PCs, tablets, laptops and mobile phones. The processes may be stored in any type or types of computer storage device or memory. It should be understood that the various actions and/or steps may alternatively be implemented in-whole or in-part within specially designed hardware.

It will be appreciated that all processes, servers, managers, agents, and modules described herein for platform 104, database 106, client applications 114 on devices 108 and other sessions, processes, actions, steps, or functions in embodiments may be implemented using known programming techniques, languages and algorithms, such as Java, C++, and others. Although the processes, services and modules described are implemented in applications 114 on devices 108 and in platform 104, it will be appreciated that some functions of the processes may be provided in a separate server that is in communication with devices 108 and/or platform 104. The titles of processes and platforms are provided as a convenience to provide labels and assign functions to certain processes. It is not required that a process perform only its functions as described above. As such, specific functionalities for each application or process may be moved between processes or separated into different processes. Processes may be contained within other processes. Different signaling techniques may be used to communicate information between applications using known programming techniques. Known data storage, access and update algorithms allow data to be shared between applications. It will further be appreciated that other applications and systems on platform 104 and device 108 may be executing concurrently with other processes. As such, any of modules (or parts thereof) may be structured to operate in as a "background" application on device 108 and platform 104, respectively, using programming techniques known in the art.

It will be appreciated that the embodiments relating to clients, servers, services, state machines and systems may be implemented in a combination of electronic hardware, firmware, and software. The firmware and software may be implemented as a series of processes, applications and/or modules that provide the functionalities described herein. The algorithms and processes described herein may be executed in different order(s). Interrupt routines may be used. Data may be stored in volatile and non-volatile devices described herein and may be updated by the hardware, firmware and/or software.

As used herein, the wording "and/or" is intended to represent an inclusive-or. That is, "X and/or Y" is intended to mean X or Y or both.

In this disclosure, where a threshold or measured value is provided as an approximate value (for example, when the threshold is qualified with the word "about"), a range of values will be understood to be valid for that value. For example, for a threshold stated as an approximate value, a range of about 25% larger and 25% smaller than the stated value may be used. Thresholds, values, measurements, and dimensions of features are illustrative of embodiments and are not limiting unless noted. Further, as an example, a "sufficient" match with a given threshold may be a value that is within the provided threshold, having regard to the approximate value applicable to the threshold and the understood range of values (over and under) that may be applied for that threshold.

Although this disclosure has been described in terms of certain embodiments and applications, other embodiments and applications that are apparent to those of ordinary skill in the art, including embodiments which do not provide all of the features and advantages set forth herein, are also within the scope of this disclosure. Accordingly, the scope of the present disclosure is intended to be defined only by reference to the following claims.

The invention claimed is:

1. A method for managing encrypted third-party electronic messages for an organization having a regulatory requirement to retain business-related electronic messages, the method comprising executing instructions on a processor at a server that:

for a first user account for a first user associated to the organization, define a first message space accessible through electronic devices in communication with the server, the first message space accommodating peer-to-peer administration by users in the organization, the first message space providing facilities for identifying an owner for the first message space;

retaining and preserving messages in a manner based on retention parameters associated with the organization; and creating a message channel in the first message space for messages between one or more users in the organization and one or more additional organizations;

for a third-party communication system accessed by the server for communications with the first user, create for the first user a third-party user account for the third-party communication system; and for a validated the third-party user account for the first user, process a third-party communication system message sent between the first user and an external user of the third-party communication system;

decrypt the message;

archive contents of the message; and then encrypt again the message, wherein account privileges of the owner follow an organization policy for the organization and provide the first user with privileges in managing the first message space reflecting the organization policy; and the additional organizations associated with the first message space are peers with respect to the first organization and to each other.

2. The method for managing encrypted third-party electronic messages for an organization having a regulatory requirement to retain business-related electronic messages as claimed in claim 1, further comprising executing further instructions on the processor that:

upon receipt of the third-party communication system message, archive the third-party communication system message, wherein the third-party communication system message received by the processor is not encrypted.

3. The method for managing encrypted third-party electronic messages for an organization having a regulatory requirement to retain business-related electronic messages as claimed in claim 2, wherein the third-party communication system is a WhatsApp communication system.

4. The method for managing encrypted third-party electronic messages for an organization having a regulatory requirement to retain business-related electronic messages as claimed in claim 3, wherein:

the third-party communication system message is an outbound message from the first user account being sent to the third-party communication system that is first encrypted at the first device; and after archiving contents of the outbound message, the method further comprises executing further instructions on the processor that send the outbound message to the third-party communication system.

5. The method for managing encrypted third-party electronic messages for an organization having a regulatory requirement to retain business-related electronic messages as claimed in claim 4, wherein the outbound message is a bulk message addressed to multiple user accounts of the third-party communication system.

6. The method for managing encrypted third-party electronic messages for an organization having a regulatory requirement to retain business-related electronic messages as claimed in claim 5, wherein archiving the bulk message utilizes a template of the bulk message and a list of placeholder fields for addressees.

7. The method for managing encrypted third-party electronic messages for an organization having a regulatory requirement to retain business-related electronic messages as claimed in claim 3, wherein:

the third-party communication system message is an inbound message being sent to the first account from the third-party communication system; and the method further comprises executing further instructions on the processor that:

decrypt the inbound message;

archive contents of the inbound message;

then encrypt the inbound message again; and send the inbound message the first user account.

8. The method for managing encrypted third-party electronic messages for an organization having a regulatory requirement to retain business-related electronic messages as claimed in claim 7, the method further comprising executing instructions on the processor that:

check for an opt-out status for messages sent from the external user to the third-party user account; and send a message to the first user account about the inbound message from the external user.

9. The method for managing encrypted third-party electronic messages for an organization having a regulatory requirement to retain business-related electronic messages as claimed in claim 7, the method further comprising executing instructions on the processor that:

check for an opt-out status for messages sent from the external user to the third-party user account; and record data about the inbound message from the external user and the opt-out status of the third-party user account.

10. The method for managing encrypted third-party electronic messages for an organization having a regulatory requirement to retain business-related electronic messages as claimed in claim 7, wherein for third-party user account and the inbound message, the method comprises executing instructions on the processor that:

check for an opt-out status for messages sent from the external user to the third-party user account; and do not send the inbound message to the first user account if the opt-out status indicates that the first user account opts-out from receiving messages from the external user.

11. The method for managing encrypted third-party electronic messages for an organization having a regulatory requirement to retain business-related electronic messages as claimed in claim 2, wherein the first user account is part of a group of accounts for the organization for the third-party communication system.

12. The method for managing encrypted third-party electronic messages for an organization having a regulatory requirement to retain business-related electronic messages as claimed in claim 2, wherein a virtual phone number is associated with the third-party user account, which is used to validate the third-party user account.

13. The method for managing encrypted third-party electronic messages for an organization having a regulatory requirement to retain business-related electronic messages as claimed in claim 2, wherein a real phone number is associated with the third-party user account, which is used to validate the third-party user account.

14. A server for managing electronic messages associated with an organization having a regulatory requirement to retain business-related electronic messages, the server comprising:

a memory storage device;

a communication link to an electronic device; and a processor executing instructions from the memory storage device that:

for a first user account for a first user associated to the organization, define a first message space accessible through electronic devices in communication with the server, the first message space accommodating peer-to-peer administration by users in the organization, the first message space providing facilities for identifying an owner for the first message space;

retaining and preserving messages in a manner based on retention parameters associated with the organization; and creating a message channel in the first message space for messages between one or more users in the organization and one or more additional organizations; and for a third-party communication system accessed by the server for communications with the first user, create for the first user a third-party user account for the third-party communication system; and for a validated the third-party user account for the first user, process a third-party communication system message sent between the first user and an external user of the third-party communication system, wherein account privileges of the owner follow an organization policy for the organization and provide the first user with privileges in managing the first message space reflecting the organization policy; and the additional organizations associated with the first message space are peers with respect to the first organization and to each other.

15. The server as claimed in claim 14, the processor further executes instructions that:

upon receipt of the third-party communication system message, archive the third-party communication system message, wherein the third-party communication system message received by the processor is not encrypted.

16. The server as claimed in claim 15, wherein the third-party communication system is a WhatsApp communication system.

17. The server as claimed in claim 16, wherein:

the third-party communication system message is an outbound message from the first user account being sent to the third-party communication system that is first encrypted at the first device; and the processor further executes instructions that:

decrypt the outbound message;

archive contents of the outbound message;

encrypt again the outbound message; and then send the outbound message to the third-party communication system.

18. The server as claimed in claim 17, wherein the outbound message is a bulk message addressed to multiple user accounts of the third-party communication system.

* * * * *